(12) United States Patent
Masuda et al.

(10) Patent No.: US 8,491,991 B2
(45) Date of Patent: Jul. 23, 2013

(54) MICROPOROUS POLYPROPYLENE FILM AND PROCESS FOR PRODUCING THE SAME

(75) Inventors: Jun'ichi Masuda, Kyoto (JP); Masatoshi Ohkura, Otsu (JP); Shigeru Tanaka, Yasu (JP); Reiko Morita, Kusatsu (JP); Hajime Fukushima, Kyoto (JP)

(73) Assignee: Toray Industries, Inc. (JP)

( * ) Notice: Subject to any disclaimer, the term of this patent is extended or adjusted under 35 U.S.C. 154(b) by 1019 days.

(21) Appl. No.: 11/578,884

(22) PCT Filed: Apr. 21, 2005

(86) PCT No.: PCT/JP2005/007585
§ 371 (c)(1),
(2), (4) Date: Oct. 19, 2006

(87) PCT Pub. No.: WO2005/103127
PCT Pub. Date: Nov. 3, 2005

(65) Prior Publication Data
US 2007/0178324 A1    Aug. 2, 2007

(30) Foreign Application Priority Data

Apr. 22, 2004 (JP) .................. 2004-126571
Apr. 22, 2004 (JP) .................. 2004-126572

(51) Int. Cl.
*B32B 5/22* (2006.01)
*B32B 27/00* (2006.01)
*B32B 3/26* (2006.01)
*C08J 5/18* (2006.01)

(52) U.S. Cl.
USPC ............... 428/304.4; 428/308.4; 428/317.9; 428/500

(58) Field of Classification Search
USPC ............. 521/143; 428/317.9, 500, 304.4
See application file for complete search history.

(56) References Cited

U.S. PATENT DOCUMENTS

| | | | |
|---|---|---|---|
| 3,679,538 A | 7/1972 | Druin et al. | |
| 4,386,129 A | 5/1983 | Jacoby | |
| 5,416,169 A | 5/1995 | Saito et al. | |
| 5,491,188 A | 2/1996 | Ikeda et al. | |
| 6,235,823 B1 | 5/2001 | Ikeda et al. | |
| 6,596,814 B2 | 7/2003 | Kim et al. | |
| 6,861,132 B2 * | 3/2005 | Ikeda et al. | 428/317.9 |
| 2002/0137851 A1 | 9/2002 | Kim et al. | |
| 2003/0148091 A1 | 8/2003 | Ikeda et al. | |
| 2004/0053064 A1 * | 3/2004 | Masuda et al. | 428/500 |

FOREIGN PATENT DOCUMENTS

| | | |
|---|---|---|
| CN | 1034375 A | 8/1989 |
| DE | 36 10 644 A1 | 10/1986 |
| DE | 43 40 194 A1 | 6/1994 |
| EP | 0 190 889 A2 | 8/1986 |
| EP | 0 547 237 | 7/1992 |
| EP | 0 547 237 | 6/1993 |
| EP | 0 547 237 A1 | 6/1993 |
| EP | 0 632 095 A2 | 1/1995 |
| EP | 1 369 221 A1 | 12/2003 |
| GB | 2 251 205 A | 7/1992 |
| JP | 55-32531 B | 8/1980 |
| JP | 57-203520 | 12/1982 |
| JP | 60-129240 A | 7/1985 |
| JP | 62-121704 | 6/1987 |
| JP | 62-195030 | 8/1987 |
| JP | 1-299979 A | 12/1989 |
| JP | 3-258737 A | 11/1991 |
| JP | 6157666 | 6/1994 |
| JP | 6-157666 | 7/1994 |
| JP | 7-5780 B | 1/1995 |
| JP | 7-118429 A | 5/1995 |
| JP | 7-84502 B | 9/1995 |
| JP | 2509030 B | 6/1996 |
| JP | 2611392 | 5/1997 |
| JP | 9-176352 A | 7/1997 |
| JP | 2000 169608 | 6/2000 |
| JP | 2000-169608 A | 6/2000 |
| JP | 2001-114950 A | 4/2001 |
| JP | 2001 342272 | 12/2001 |
| JP | 2001-342272 A | 12/2001 |
| JP | 3243835 B | 1/2002 |
| JP | 3341358 B | 11/2002 |
| JP | 3374419 | 2/2003 |
| JP | 2003-64193 A | 3/2003 |
| JP | 3443934 | 9/2003 |
| JP | 3523404 B | 4/2004 |
| JP | 2004-142321 A | 5/2004 |
| JP | 2004-160689 A | 6/2004 |
| JP | 2004-161799 A | 6/2004 |
| WO | WO 01/92386 A1 | 12/2001 |
| WO | WO 02/066233 A1 | 8/2002 |

OTHER PUBLICATIONS

Fujiyama, "Polymer Processing", 1989, vol. 38, pp. 35-41.
Wei Zhu et al., "A Novel Polypropylene Microporous Film", Polymer for Advanced Technologies, 1996, vol. 7, pp. 743-748.
Robert M. Spotnitz et al., "Characterization of Separations for Lithium Ion Batteries—A Review—", Chemical Industry, 1997, pp. 47-52.

* cited by examiner

Primary Examiner — Randy Gulakowski
Assistant Examiner — Kara Boyle
(74) Attorney, Agent, or Firm — DLA Piper LLP (US)

(57) ABSTRACT

A microporous polypropylene film where film formability is improved in accordance with a β-crystal technique which allows microporous films to be continuously manufactured at low cost is disclosed. In addition, a microporous polypropylene film of which the specific gravity is further reduced is provided. Furthermore, a microporous polypropylene film with a significantly high permeability is provided. In addition, manufacturing methods for these microporous polypropylene films are provided.

12 Claims, 5 Drawing Sheets

MICROPOROUS POLYPROPYLENE FILM AND PROCESS FOR PRODUCING THE SAME

RELATED APPLICATION

This is a §371 of International Application No. PCT/JP2005/007585, with an international filing date of Apr. 21, 2005 (WO 2005/103127 A1, published Nov. 3, 2005), which is based on Japanese Patent Application Nos. 2004-126571, filed Apr. 22, 2004, and 2004-126572, filed Apr. 22, 2004.

TECHNICAL FIELD

This disclosure relates to a microporous polypropylene film appropriate for a wide range of applications such as a packaging application and an industrial application, more particularly, to a microporous polypropylene film that is excellent in the film formability and productivity in comparison with microporous films obtained by a conventional β-crystal technique, and where the specific gravity can be reduced or the porosity can be increased and the permeability of a variety of permeable media can be extremely improved.

BACKGROUND TECHNOLOGY

Microporous films are characterized by having excellent permeability and low specific gravity, etc., and thus, the applications thereof cover a wide range including mainly a variety of separators for batteries and electrolytic capacitors, a variety of separation membranes (filters), absorbing articles such as diapers and sanitary products, moisture permeable waterproof materials for clothing and medical purposes, elements for receiving sheet for thermal transfer recording, elements for ink receiving sheets, and polyolefin based microporous films made of such as polypropylene and polyethylene are mainly used.

In general, manufacturing methods for a microporous polyolefin film are roughly divided into a wet process and a dry process. The wet process includes an extraction technique having the processes of adding and dispersing uniformly a material to be extracted into a polyolefin, which is then formed into a sheet, and after that, extracting the material to be extracted with a solvent so that pores are generated in the sheet, and, if necessary, carrying out a stretching process before and/or after the extraction (see, for example, Japanese Patent Nos. 1-299979 A (claim 1) and 3-258737 A (claim 1, page 3, paragraph 2, lines 8 to 20)). The dry process includes a lamellae stretching technique according to which an unstretched sheet with a special lamellar crystalline structure is produced by using special conditions of the crystallization from melt, such as an extrusion at a low temperature and high drafting at the time of sheet formation through the melt-extrusion, and this sheet is stretched mainly uniaxially so that the lamellae interfaces are cleaved and pores are generated (see, for example, Japanese Patent No. 1046436 (claim 1) and Adachi et al., "Chemical Industry," Volume 47, 1997, pp. 47-52). The dry process also includes an inorganic particle technique according to which an unstretched sheet, where a large amount of incompatible particles such as inorganic particles has been added to a polyolefin, is stretched, and thereby, interfaces between different types of materials are separated so that pores are generated (see, for example, Japanese Patent No. 1638935 (claims 1 to 7) and Japanese Unexamined Patent Publication S60 (1985)-129240 (claims 1 to 4)). Furthermore, there is a β-crystal technique where a β-crystal with a low crystal density (crystal density: 0.922 $g/cm^3$) is generated at the process producing an unstretched sheet through the melt-extrusion of polypropylene, this sheet is stretched so that the crystal is transformed to an α-crystal with a high crystal density (crystal density: 0.936 $g/cm^3$), and pores are generated due to the difference in the crystal density between the two (see, for example, Japanese Patent Nos. 1953202 (claim 1), 1974511 (claim 1), 2509030 (claims 1 to 8), 3341358 (claims 1 to 3) and 3443934 (claims 1 to 5), Japanese Unexamined Patent Publication Nos. H7 (1995)-118429 (claims 1 to 3) and H9 (1997)-176352 (claim 1), Japanese Patent No. 3523404 (claim 1), International Patent Publication Nos. WO 01/92386 (claims 1 to 13) and WO 02/66233 (claims 1 to 11) and M. Xu et al., "Polymers for Advanced Technolgoies," Volume 7, 1996, pp. 743-748).

According to the above-described β-crystal technique, to generate a large amount of pores in a film after stretching, it is necessary to selectively generate a large amount of β-crystals in the unstretched sheet before stretching. Therefore, it is important in the β-crystal technique that β-crystals are formed under specific conditions of crystallization from the melt using a β-crystal nucleating agent. In recent years, a material having a higher β-crystal forming ability, in comparison with a quinacridone based chemical compound that has been used for a long time (see, for example, Fujiyama, "Polymer Processing," Volume 38, 1989, pp. 35-41), has been proposed as the β-crystal nucleating agent (see, for example, Patent Documents 16 to 18), and thus, various microporous polypropylene films have been proposed.

For example, manufacturing methods for a resin composition, a film and a porous film, which comprise 0.01 wt % to 10 wt % of ultra-high molecular weight polyethylene or polytetrafluoroethylene and have a β-crystal content (K value) measured by X-rays of not less than 0.5 and a melt tension (MS) measured at 230° C. of no greater than 5 cN for the purpose of improving the film formability at a low temperature and the thickness uniformity of a microporous polypropylene film obtained by a β-crystal technique not less than have been proposed (see U.S. Pat. No. 6,596,814 (claims 1 to 31, page 2, paragraph 1, lines 18 to 50, Examples 1 to 3, Comparative Example 4)).

Alternatively, it has been already known that the β-crystal technique is excellent in comparison among other techniques for lowering the specific gravity of polypropylene through the generation of voids or pores. A method for generating so-called isolated voids, in which neighboring voids are not connected each other, by adding inorganic particles or organic particles or resins immiscible with polypropylene into a polypropylene so that an unstretched sheet is produced, and stretching this sheet so that the interfaces between different types of materials are separated is known as a technique for lowering the specific gravity of polypropylene in addition to the β-crystal technique (see, for example, Japanese Patent No. 2611392 (claims 1 and 2, page 4, paragraph 1, line 40 to page 5, paragraph 2, line 5)). The specific gravity of cavitated films obtained by these other techniques as described above is approximately 0.6 to 0.8 at the lowest while the film with the specific gravity of approximately 0.3 to 0.4 could be obtained by the β-crystal technique without using particles or immiscible resins, depending on its manufacturing conditions (film forming conditions). A white biaxially stretched polypropylene film with the specific gravity of 0.6 to 0.76 has been proposed, which consists of a polypropylene satisfying a specific relationship between the melt strength (hereinafter, referred to as MS) and the melt flow rate (hereinafter, referred to as MFR) and has a layer consisting of a polyolefin based resin (layer B) laminated on at least one side of a cavitated layer (layer A) for the purpose of generating a large amount of the above-described isolated voids uniformly (see Japanese Unexamined Patent Publication No. 2004-160689 (claims 1 to 16, Examples 1 to 10)). In this patent, examples are disclosed where white biaxially stretched polypropylene films with a specific gravity of 0.6 to 0.76 are manufactured by adding a void initiator such as inorganic particles or organic particles or immiscible resins into the layer A with the above-described embodiments and adding optionally a β-crystal nucleating agent so as to generate voids.

However, microporous films obtained by the conventional β-crystal technique are inferior to those obtained by so-called extraction technique and lamellae stretching technique in the permeating performance (hereinafter sometimes simply referred to as "permeability") of a variety of media. That is to say, microporous films using an highly active β-crystal nucleating agent as shown in Japanese Patent Nos. 2055797 (claims 1 to 8), 3243835 (claims 1) and 3374419 (claims 1 to 4), and those obtained by a β-crystal technique as proposed in Japanese Patent Nos. 1953202 (claim 1), 1974511 (claim 1), 2509030 (claims 1 to 8), 3341358 (claims 1 to 3) and 3443934 (claims 1 to 5), Japanese Unexamined Patent Publication Nos. H7 (1995)-118429 (claims 1 to 3) and H9 (1997)-176352 (claim 1), Japanese Patent No. 3523404 (claim 1), International Patent Publication Nos. WO 01/92386 (claims 1 to 13) and WO 02/66233 (claims 1 to 11) and M. Xu et a., "Polymers for Advanced Technolgoies," Volume 7, 1996, pp. 743-748 are inferior to microporous films obtained by a extraction technique and a lamellae stretching technique. Therefore, it has been said that microporous film obtained by a β-crystal technique is difficult to expand its application to a high-value added field represented by applications such as a filter or a battery separator or the like where a high permeating performance is required.

In addition, microporous polypropylene films obtained by the conventional β-crystal technique are equal to or slightly superior to those obtained by an inorganic particle technique in the permeating performance and are not significantly characterized as compared to those obtained by an inorganic particle technique, which has excellent cost competitiveness though having disadvantages such as the contamination of the manufacturing process due to dropping off of the particles.

There is also a problem with the β-crystal technique where the productivity is low due to its specific conditions of crystallization from melting at the casting process, where an unstretched sheet is produced. More concretely, in the β-crystal technique, to form a large amount of β-crystals in an unstretched sheet so as to obtain a highly permeable microporous film, polypropylene comprising a β-crystal nucleating agent is used, and in addition, preferably, this is solidified in an atmosphere at a high temperature exceeding 100° C. to obtain a sheet (see for example, International Patent Publication No. WO 02/66233 (claims 1 to 11)). Moreover, there is a report that the lower the melt-extruding temperature is; the greater the amount of β-crystals can be formed (see Fujiyama, "Polymer Processing," Volume 38, 1989,pp. 35-41). Therefore, the line speed to produce a microporous film is determined by the state of solidification and crystallization of melted polypropylene at the casting process. That is to say, a problem arises where it is difficult to take the sheet off from the metal drum when high speed casting is carried out for a high speed film formation because the sheet in an unsolidified state is sticky. Even in the case where the sheet can be taken off from the drum, the sheet is sometimes elongated at the subsequent process carrying the sheet under tension, and therefore, the casting speed, and thus, the line speed (that is to say, the film formation speed) inevitably decreases and the productivity deteriorates. In addition, in order to make the film exhibit a permeating performance, it is necessary to produce the film by stretching at a temperature lower than that in the conventional stretching conditions for a general-purpose polypropylene film with no permeability in the subsequent stretching process. A problem arises in this stretching process depending on the conditions where the film breaks sporadically, and thus, the production cost further increases.

Furthermore, since an ultra-high molecular weight component of polyethylene or polytetrafluoroethylene sometimes separates out as a coarse gelled substance at the melt-extruding process in the microporous film obtained by the β-crystal technique disclosed in U.S. Pat. No. 6,596,814 (claims 1 to 31, page 2, paragraph 1, lines 18 to 50, Examples 1 to 3, Comparative Example 4 and significantly deteriorates the film formability, it is extremely difficult to realize a low specific gravity and a excellent permeability due to a high β-crystal content and to improve the film formability and the thickness uniformity at the same time.

Moreover, since a void initiator is substantially added to the white biaxially stretched polypropylene film disclosed in Japanese Patent No. 2611392 (claims 1 and 2, page 4, paragraph 1, line 40 to page 5, paragraph 2, line 5 and the temperature of the metal drum to solidify an unstretched sheet at the casting process is low, it is difficult to further lower the specific gravity.

In addition, a polypropylene film with a further lower specific gravity or higher permeability is required and there is a limit in the range of the specific gravity that can be controlled in accordance with the conventional β-crystal technique. Meanwhile, physical properties of the film represented by the Young's modulus and the strength are substantially impaired even if the specific gravity can further be reduced, and therefore, a problem arises where the film get elongated due to the processing tension during the subsequent converting process.

It would therefore be helpful to provide a microporous polypropylene film with a low specific gravity and an excellent productivity, where the permeating performance can be optionally and extremely improved and the physical properties and the dimensional stability are excellent. It would also be helpful to provide a manufacturing method of a microporous polypropylene film with a low specific gravity and an excellent productivity, where the permeating performance can be optionally and extremely improved and the physical properties and the dimensional stability are excellent.

SUMMARY

We provide a polypropylene film characterized by the specific Trouton ratio of polypropylene or polypropylene comprising of the film itself, a β-crystal activity and a specific gravity of the film, as well as a manufacturing method for the same.

An embodiment A is characterized by a microporous polypropylene film comprising a polypropylene, said polypropylene having the Trouton ratio of not less than 6, said film having a β-crystal activity and a specific gravity of 0.1 to 0.6. An embodiment B is characterized by a microporous polypropylene film having the Trouton ratio of not less than 6, a β-crystal activity and a specific gravity of 0.1 to 0.6. An embodiment C is characterized by a microporous polypropylene film comprising a polypropylene, said polypropylene having a long chain branch in a main chain, said film having a β-crystal activity and a specific gravity of 0.1 to 0.6.

Furthermore, the preferable embodiment of the embodiments A to C is characterized in that the Gurley air permeability of the microporous polypropylene film is 10 sec/100 ml to 1000 sec/100 ml. In addition, an embodiment D is characterized by a manufacturing method for a microporous polypropylene film which comprises the steps of:
melt-extruding a resin composition, a main component of said resin composition being a polypropylene with a β-crystal activity, said the polypropylene comprising a polypropylene with a Trouton ratio of not less than 30;
casting the sheet onto a drum to obtain an unstretched sheet; and
stretching the obtained sheet biaxially in longitudinal and transverse direction with a longitudinal stretching ratio of 5 to 10.

An embodiment E is characterized by a manufacturing method for a microporous polypropylene film which comprises the steps of:
melt-extruding a resin composition, a main component of said resin composition being a polypropylene;
casting the resin composition onto a drum to obtain an unstretched sheet, said sheet having the Trouton ratio of not less than 6 and a β-crystal activity; and
stretching the sheet biaxially in longitudinal and transverse direction with a longitudinal stretching ratio of 5 to 10.

In addition, an embodiment F is characterized by a manufacturing method for a microporous polypropylene film comprising the steps of:
melt-extruding a resin composition, a main component of the resin composition being a polypropylene with a β-crystal activity, said the polypropylene comprising a polypropylene having a long chain branch in a main chain;
casting the sheet onto a drum to obtain an unstretched sheet; and
stretching the obtained sheet biaxially in longitudinal and transverse direction with a longitudinal stretching ratio of 5 to 10.

Also disclosed are polypropylene films having a specific relationship between the melt strength (MS) and the melt flow rate (MFR) of polypropylene or polypropylene comprising the film itself, a β-crystal activity and the porosity of a film as well as a manufacturing method for the same.

An embodiment A is characterized by a microporous polypropylene film comprising a polypropylene, wherein the relationship between the melt strength (MS) and the melt flow rate (MFR), measured at 230° C. of the polypropylene is represented by the following formula (1), said film having a β-crystal activity and a porosity of 30% to 95%:

$$\log (MS) > -0.61 \log (MFR) + 0.82 \quad (1).$$

An embodiment B is characterized by a microporous polypropylene film, wherein the melt tension strength (MS) of the film, measured at 230° C. is less than 5 cN measured at 230° C., and a relationship between the MS and the melt flow rate (MFR) of the film is represented by the following formula (2), and the film having a β-crystal activity and a porosity of 30% to 95%:

$$\log (MS) > -0.9 \log (MFR) + 0.6 \quad (2).$$

Furthermore, the preferable embodiment of the embodiments A and B are characterized by that a microporous polypropylene film has an isotactic pentad fraction (mmmm) of 90% to 99.5%. In addition, an embodiment C provides a manufacturing method for a microporous polypropylene film comprising the steps of:
melt-extruding a resin composition into a sheet, said the composition comprises a polypropylene having a β-crystal activity as a main component, said polypropylene comprises a polypropylene having a relationship between the melt strength (MS) and the melt flow rate (MFR) of the polypropylene, measured at 230° C. represented by the following formula (1);
casting the sheet onto a drum to obtain an unstretched sheet; and
stretching the obtained sheet biaxially in longitudinal and transverse direction with a longitudinal stretching ratio of 5 to 10:

$$\log (MS) > -0.61 \log (MFR) + 0.82 \quad (1).$$

In addition, an embodiment D provides a manufacturing method for a microporous polypropylene film comprising the steps of:
melt-extruding a resin composition into a sheet, said the composition comprises a polypropylene having a β-crystal activity as a main component, wherein the melt strength (MS), measured at 230° C. of the polypropylene, is less than 5 cN, and the polypropylene has a relationship between the MS and the melt flow rate (MFR) represented by the following formula (2);and
casting the sheet onto a drum to obtain an unstretched sheet; and
stretching the obtained sheet biaxially in longitudinal and transverse direction with a longitudinal stretching ratio of 5 to 10:

$$\log (MS) > -0.9 \log (MFR) + 0.6 \quad (2).$$

Further, disclosed is a polypropylene film focusing to a degree of an orientation of a crystal chain of longitudinal and transverse direction of the film and a β-crystal activity and a specific gravity of the film. An embodiment provides a microporous polypropylene film which is characterized in that the microporous polypropylene film satisfies the following formula (3) in the azimuthal intensity distribution profile for the (−113) plane within the film plane measured by an X-ray diffraction method and has a β-crystal activity and a specific gravity of 0.1 to 0.6:

$$0.5 \leq I(MD)/I(TD) \leq 8 \quad (3)$$

(where I (MD) is the integrated intensity in the longitudinal direction and I (TD) is the integrated intensity in the transverse direction).

In addition, the preferable embodiments are commonly characterized in that a microporous polypropylene film has a Gurley air permeability of 10 second/100 ml to 1000 second/100 ml.

The microporous polypropylene films and manufacturing methods are excellent in the film formability with little film breakage at the stretching process in comparison with microporous polypropylene films obtained by the conventional β-crystal technique. Furthermore, films can be formed by stretching, for example, in the longitudinal direction at a low temperature and to a high ratio without breakage during the transversely stretching process. As a result, the line speed can be increased in comparison with that in the conventional β-crystal technique, which leads to the excellent productivity. In addition, the sheet can be stretched to a high ratio in the longitudinal direction, and thereby, the specific gravity can be reduced and the strength in the longitudinal direction can be increased in comparison with those in the conventional β-crystal technique. At the same time, the permeability can be significantly improved.

A microporous polypropylene film has high longitudinal orientation of the crystalline molecular chains of the film as compared to the microporous polypropylene films obtained by the conventional β-crystal technique. As a result, the physical properties in the longitudinal direction become excellent, which leads to excellent handling properties at the converting process. Furthermore, the physical properties in the longitudinal direction are excellent even if the specific gravity of the film is lowered, which leads to the highly improved permeability without impairing handling properties.

The microporous polypropylene films are also excellent in dimensional stability, and therefore, can exhibit excellent properties in a variety of fields of application including, for example, synthetic paper, receiving sheet for thermal transfer recording, optical elements, building materials, separation membranes (filters), moisture permeable waterproof elements, such as wound dressing materials and the like, moisture permeable waterproof materials for clothing and the like, absorbing articles, such as for diapers and sanitary goods and the like, separators for batteries and electrolytic capacitors and the like, ink receiving sheets, oil or fat absorbing materials, blood sugar test kit and protein separating membranes.

DETAILED DESCRIPTION

Explanation of Symbols

Figure 1:
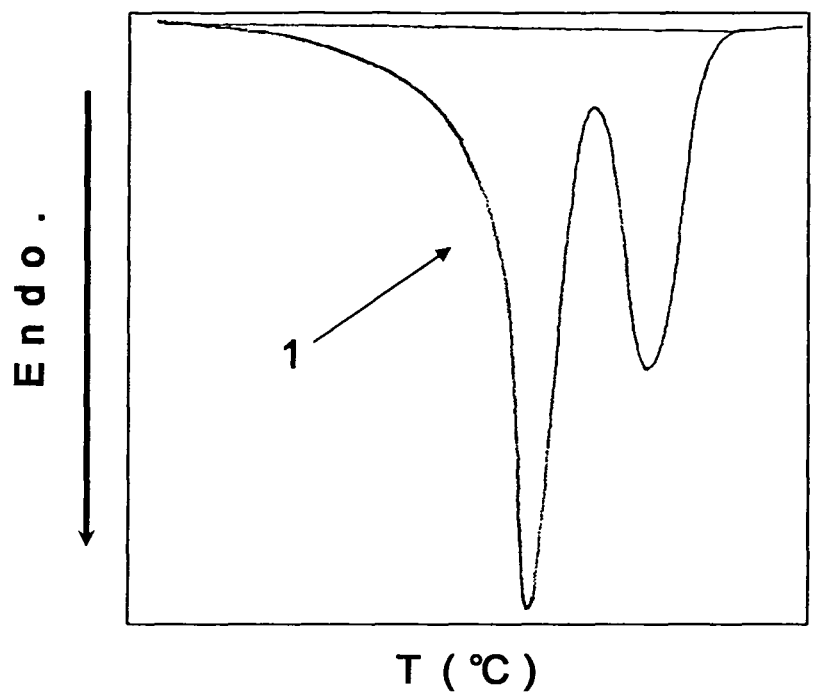
FIG. 1 is a graph schematically showing thermal curves obtained when the β-crystal content was calculated according to the measuring method (12) β-crystal content shown below using a differential scanning calorimeter (DSC)

1 Heat flow curve of polypropylene film having a β-crystal activity
2 Amount of heat of fusion of β-crystal (ΔHβ)
3 Amount of heat of fusion originating from polypropylene other than β-crystal (ΔHα)
4 Sample (Specimen)
5 Line normal to the surface of a sample film
6 Incident X-ray
7 Diffracted X-ray
8 Goniometer axis (diffractometer axis)
9 Rotation plane when a sample rotates in the direction of an azimuthal angle (β)
10 Observation point
11 Portion irradiated with X-ray
12 Longitudinal direction of sample
13 Base line drawn so as to pass through minimum intensity in intensity profile
14 Integrated intensity in longitudinal direction (I(MD))
15 Integrated intensity in transverse direction (I(TD))
16 Pores in film
17 Microfbril observed in pores
T Temperature
Endo. Endothermic direction
I Intensity of X-rays
MD Longitudinal direction of film
TD Transverse direction of film
ND Thickness direction of film First, the group of a first aspect is described.

The microporous polypropylene film which belong to the embodiment A comprises a polypropylene whose Trouton ratio is not less than 30 in the entire polypropylene constituting the film (hereinafter sometimes simply referred to as "polypropylene constituting a film" or "polypropylene of a film." In addition, a definition for polypropylene itself is described as following). In other words, the microporous polypropylene film of A comprises a polypropylene with the Trouton ratio of not less than 30. Naturally, polypropylene of a film can comprise only a polypropylene with the Trouton ratio of not less than 30.

The Trouton ratio is obtained through a measurement in accordance with the theory by Cogswell ["Polymer Engineering Science" 12, pp. 64-73 (1972)], using a converging flow method. Here, the Trouton ratio is obtained from elongational viscosity-elongational strain rate curve and shear viscosity-shear strain rate curve, which are approximated using an exponential function, where the Trouton ratio in each of the inventions disclosed herein is the ratio of the elongational viscosity to the shear viscosity at 230° C. and a strain rate of $60\,s^{-1}$. Accordingly, the Trouton ratio becomes high when the elongational viscosity is high relative to the shear viscosity for certain polypropylenes, and the Trouton ratio becomes low in the opposite case. Here, as for the method to increase the elongational viscosity of polypropylenes, broadening the distribution of the molecular weight, introducing an ultra-high molecular weight component, introducing a long chain branch, slight cross-linking, adding a polymer having a long chain branch, such as low density polyethylene, and adding an additive which disperses in propylene in a rod-like shape or the like can be cited as examples.

Examples of measuring Trouton ratio of polypropylene are disclosed in A. Pendse et al "SPE Annual Technical Conference" 41, pp. 1080-1084 (1995); A. Pendse et al "SPE Annual Technical Conference" 42, pp. 1129-1133 (1996); G. Barakos "J. Appl. Polym. Sci." 59, pp. 543-556 (1996); D. M. Bindigs et al "J. Non-Newtonian Fluid Mech." 79, pp. 137-155 (1998). In addition, examples of measuring Trouton ratio of polypropylene under aforesaid conditions are disclosed in, for example, Japanese Unexamined Patent Publication 2004-161799.

In the case where a microporous polypropylene film of the embodiment A contains a β-crystal nucleating agent, as shown in the following, it is preferable that polypropylene with a Trouton ratio of not less than 30 to be mixed into the polypropylene of the film as described above comprise no β-crystal nucleating agent. That is to say, in the case where a microporous polypropylene film comprises a β-crystal nucleating agent as described below, it is preferable that the polypropylene of the film is a mixture of a polypropylene comprising a β-crystal nucleating agent and an above-discrived polypropylene with a Trouton ratio of not less than 30. In addition, in the case where the above-described polypropylene with a Trouton ratio of not less than 30 comprises an additive other than the above-described β-crystal nucleating agent, it is preferable to measure the Trouton ratio after extracting or removing the additive, or to measure it before adding the additive. However, it is reasonable to use the Trouton ratio measured in the presence of the above-described additive or the like before extraction, where the objective of this invention is achieved in the same manner. Therefore, the requirements are assumed to be satisfied if the Trouton ratio of the polypropylene is not less than 30 in the presence of the above-described additive or the like.

The microporous polypropylene film of the embodiment A comprises a polypropylene with a Trouton ratio of not less than 30, and thereby, is excellent in the film formability with little film breakage during the stretching process in comparison with conventional microporous polypropylene films. Furthermore, the film can be formed without breakage during the transversely stretching process, even through stretching in the longitudinal direction at a low temperature and to a high ratio, and thus, the line speed can be increased through stretching to a high ratio in the longitudinal direction for the same casting speed, as compared to conventional microporous polypropylene films, and therefore, the producible area of the film per unit time can be increased. In this manner, polypropylene with the Trouton ratio of not less than 30 is comprised, and thereby, the film formability can be improved and the producible area can be increased, and thereby, the productivity can be significantly improved. Furthermore, the physical properties of the film in the longitudinal direction can be enhanced in the particular case where the film is produced by stretching to a high ratio in the longitudinal direction. This is assumed to be because polypropylene with a Trouton ratio of not less than 30 is comprised, and thereby, entanglement of tie molecules in an amorphous phase which penetrates crystallites within the system is accelerated at the stage of casting process, and thereby, the stretching stress is uniformly propagated throughout the entire system during the subsequent stretching process.

In addition, in the case where a film comprises a polypropylene with a Trouton ratio of not less than 30, as described above, and is produced by stretching to a high ratio in the longitudinal direction, the area ratio after stretching (product of effective longitudinally stretching ratio and effective transversely stretching ratio) can be increased, and pore generation is accelerated, and thereby, the specific gravity can be lowered, as compared to conventional microporous polypropylene films. Also, mainly the multilayer construction of the film and the conditions for film formation can be controlled to improve the permeability significantly.

The Trouton ratio of polypropylene comprised in the microporous polypropylene film of the embodiment A is preferably not less than 35, more preferable not less than 40. The higher the Trouton ratio of the polypropylene comprised in the microporous polypropylene film of this invention is, the more breakage can be reduced, as described above, and as a result, the more stably the film can be produced by stretching in the longitudinal direction to a high ratio, and such effects tend to be obtained that the specific gravity is lowered and the permeability is improved through stretching in the longitudinal direction to a high ratio. Though no specific upper limit is set for this Trouton ratio, it is preferable that the Trouton ratio is no greater than, for example, 100, depending on the amount of addition, because film formability, particularly strethchability in the longitudinal direction in the case of longitudinal-transverse sequential biaxial stretching, may occasionally deteriorate (film may break at the longitudinal stretching process), if the Trouton ratio is too high.

Though the method for obtaining the polypropylene with the Trouton ratio of not less than 30 as described above is not particularly limited, the following methods can be shown as examples, and these methods are preferably used:

a method of blending polypropylene comprising a large amount of a high molecular weight component;

a method of blending oligomers or polymers with a branched structure;

a method of introducing a long chain branched structure in polypropylene molecules as described in Japanese Unexamined Patent Publication S62 (1987)-121704;

a method of preparing a straight-chain crystalline polypropylene, whose melt strength and the intrinsic viscosity, as well as the crystallizing temperature and the melting point, satisfy a specific relationships respectively, and the residual ratio after extracting with the boiling xylene is in a specific range, without introducing a long chain branch, as disclosed in Japanese Patent publication No. 2869606.

It is particularly preferable that the polypropylene with a Trouton ratio of not less than 30 comprised in the microporous polypropylene film of A be a polypropylene having a long chain branch in the main chain, from among the above-described polypropylenes, because the effect of improving the melt-extrusion stability, the above-described effects of improving the film formability, which are associated with the effects of lowering the specific gravity and improving the permeability, tend to be enhanced significantly.

Here, the polypropylene having a long chain branch in the main chain is polypropylene having a polypropylene chain that branches from its main chain. The great effects can be obtained as described above for the polypropylene having a long chain branch in the main chain is assumed to be because the long chain branch works as a tie molecule to quasi-crosslink between crystallites at the stage of casting process, so that the stretching stress is uniformly propagated throughout the entire system during the subsequent stretching process.

The concrete examples of polypropylene having a long chain branch in the main chain include polypropylenes manufactured by Basell (types: PF-814, PF-633, PF-611, SD-632 and the like), polypropylenes manufactured by Borealis (types: WB13OHMS and the like), polypropylenes manufactured by Dow (types: D114, D201, D206 and the like), or the like.

A branching index g, represented by the following formula, can be cited for an index value indicating the degree of the long chain branching in the polypropylene:

$g=[\eta]_{LB}/[\eta]_{Lin}$ Here, $[\eta]_{LB}$ is the intrinsic viscosity of polypropylene having a long chain branch, and $[\eta]_{Lin}$ is the intrinsic viscosity of straight-chain crystalline polypropylene having substantially the same weight average molecular weight as the polypropylene having a long chain branch. Here, the intrinsic viscosity shown here is measured at 135° C. by heretofore known method where the sample is dissolved in tetralin. The weight average molecular weight at the time of measurement of this g value is measured in accordance with the method published by M. L. McConnell in "American Laboratory" May, pp. 63-75 (1978), that is to say, low-angle laser light scattering photometry.

It is preferable that the branching index g of the polypropylene with a Trouton ratio of not less than 30 comprised in the microporous polypropylene film of A is no greater than 0.95. If the branching index g exceeds the above-described range, the effects of adding polypropylene with a Trouton ratio of not less than 30 may be impaired, film formability may occasionally deteriorate, the specific gravity of the microporous film obtained through stretching in the longitudinal direction to a high ratio may occasionally increase, and, the permeability may occasionally become inferior. It is more preferable that the branching index g of the polypropylene with a Trouton ratio of not less than 30 be no greater than 0.9.

Though the content of polypropylene with a Trouton ratio of not less than 30 comprised in the microporous polypropylene film of the embodiment A is not particularly limited, it is preferable to be 1 wt % to 50 wt % with respect to the entire amount of polypropylene of the film, and characteristically, those effect could be obtained even by adding a small amount. If the content is below the above-described range, film formability, particularly stretchability in the transverse direction in the case of longitudinal-transverse sequential biaxial stretching, when stretched in the longitudinal direction to a high ratio , may occasionally deteriorate (film may break during the transversely stretching process). In addition, the specific gravity of the microporous film obtained through stretching in the longitudinal direction to a high ratio may occasionally become high and the permeability may occasionally become inferior. If the content is above the above-described range, film formability, particularly stretchability in the longitudinal direction in the case of longitudinal-transverse sequential biaxial stretching, when stretched in the longitudinal direction to a high ratio may occasionally deteriorate (film may break during the longitudinal stretching process). In addition, discharging stability of the melted polymer at the melt-extrusion process and impact resistance of the film may occasionally deteriorate. Furthermore, the β-crystal content defined as below may occasionally decrease more than necessary. It is preferable that the content of the polypropylene with a Trouton ratio of not less than 30 is 1 wt % to 20 wt % with respect to the entire amount of the polypropylene of the film, and more preferably 1.5 wt % to 15 wt %.

As the embodiment B, a microporous polypropylene film having a Trouton ratio of not less than 6 can be cited. Here, "film has a Trouton ratio of not less than 6" means that the Trouton ratio obtained for the entirety of the polypropylene constituting the film is not less than 6. In addition, here, the Trouton ratio is a value obtained for the polypropylene of the film comprising a β-crystal nucleating agent, in the case where the microporous polypropylene film of this invention comprises a β-crystal nucleating agent, as shown in the following. Though the value of the Trouton ratio of the polypropylene comprising β-crystal nucleating agent becomes lower than that for the Trouton ratio of polypropylene not comprising a β-crystal nucleating agent, advantages can be achieved in both these cases if the above-described requirements are satisfied. In the case where the polypropylene of the film comprises an additive other than the above-described β-crystal nucleating agent, it is preferable to measure the Trouton ratio after extracting or removing the additive or to measure it before adding the additive. However, it is reasonable to use the Trouton ratio measured in the presence of the additive or the like before extraction, where the objective of this invention is achieved in the same manner. Therefore, the requirements are assumed to be satisfied if the Trouton ratio is not less than 6 in the presence of the above-described additive or the like.

In the embodiment B, the Trouton ratio of the polypropylene of the microporous polypropylene film is not less than 6, and thereby, is excellent in the film formability with little film breakage during the stretching process as compared to conventional microporous polypropylene films. Furthermore, the film can be formed without breakage during the transverse stretching process even through stretching in the longitudinal direction at a low temperature and to a high ratio, and thus, the line speed can be increased by stretching to a high ratio in the longitudinal direction for the same casting speed, in comparison with conventional microporous polypropylene films, and therefore, the producible area per unit time can be increased. Thus, the film contains a polypropylene film with a Trouton ratio of not less than 6, and thereby, film formability can be improved and the producible area can be increased, and thus, the productivity is significantly improved. Furthermore, in the particular case where the film is produced by stretching to a high ratio in the longitudinal direction, the physical properties of the film in the longitudinal direction can be enhanced. This is assumed to be because the film is constituted from a polypropylene with a Trouton ratio of not less than 6, and thereby, entanglement of tie molecules in an amorphous phase which penetrates crystallites within the system is accelerated at the stage of casting process, and thereby, the stretching stress is uniformly propagated throughout the entire system during the subsequent stretching process.

In addition, in the case where a film comprises a polypropylene with a Trouton ratio of not less than 6, as described above, and is produced by stretching to a high ratio in the longitudinal direction, the area ratio after stretching (product of effective longitudinal stretching ratio and effective transversely stretching ratio) can be increased, and pore generation is accelerated, and thereby, the specific gravity can be lowered in comparison with conventional microporous polypropylene films. Also, mainly the multilayer construction of the film and the conditions for film formation can be controlled to improve the permeability significantly.

The higher the Trouton ratio of the polypropylene of the microporous polypropylene of the embodiment B is, the more breakage can be reduced as described above, and the more stably the film can be produced by stretching in the longitudinal direction to a high ratio, and such effects tend to be obtained, that the specific gravity is lowered and the permeability is improved through the stable stretching in the longitudinal direction to a high ratio, though film formability may occasionally deteriorate and the β-crystal content defined as below may occasionally lowers more than necessary if the Trouton ratio is too high. It is preferable that the Trouton ratio of the polypropylene of the microporous polypropylene film of this invention is 6.5 to 30, more preferably 7 to 20, and most preferably 7 to 12. These can be controlled by, for example, adjusting the type and the content of polypropylene having a long chain branch in the main chain, as shown below.

The above-described polypropylene with a Trouton ratio of not less than 30 can be obtained by, for example, mixing a polypropylene comprising a high molecular weight component or a polypropylene having a long chain branch in the main chain with a variety of general-purpose polypropylenes, or by introducing a long chain branch component to the main chain of a general-purpose polypropylene through copolymerization or graft polymerization. As for the polypropylene with a Trouton ratio of not less than 6 constituting the microporous polypropylene film, it is preferable to use polypropylenes having a long chain branch in the main chain, from among the above-described polypropylenes, because the above-described effects of improving the film formability, which is associated with the effect of reducing the specific gravity and improving the permeability, tend to be enhanced significantly.

Though the polypropylene itself constituting the microporous polypropylene film of the embodiment B is not particularly limited, as long as the Trouton ratio is 6 or more, it is preferable that the polypropylene has, for example, properties as shown in the following.

It is preferable that the polypropylene comprises, for example, a polypropylene with a Trouton ratio of not less than 30, and as a result, be a polypropylene with a Trouton ratio of not less than 6. The polypropylene with a Trouton ratio of not less than 30 can be obtained by, for example, mixing a polypropylene having a long chain branch in the main chain with a general-purpose polypropylene, or by introducing a long chain branch component to the main chain of a general-purpose polypropylene through copolymerization or graft polymerization.

While the molecular structure of conventional general-purpose polypropylenes is a linear structure, a polypropylene having a long chain branch as described above is mixed into the polypropylene of the microporous polypropylene film of this invention, and thereby, the effects of improving the film formability and the involved effect of lowering the specific gravity and improving the permeability can be enhanced. This is assumed to be because long chain branches work as tie molecules to quasi-crosslink between crystallites at the stage of casting process, and the stretching stress is uniformly propagated throughout the entire system at the subsequent stretching process.

At this time, it is preferable that the Trouton ratio of the polypropylene having a long chain branch to be mixed is not less than 35, more preferably not less than 40, and most preferably 40 to 100.

As the embodiment C, a microporous polypropylene film comprising a polypropylene having a long chain branch can be cited.

The microporous polypropylene film of the embodiment C comprises a polypropylene having a long chain branch, and thereby, is excellent in the film formability with little film breakage during the stretching process, as compared to conventional microporous polypropylene films. Furthermore, the film can be produced even by stretching in the longitudinal direction at a low temperature and to a high ratio without breakage during the transverse stretching process, and the line speed can be increased through stretching to a high ratio in the longitudinal direction for the same casting speed, as compared to conventional microporous polypropylene films, and thereby, the producible area per unit time can be increased. Thus, the film comprises a polypropylene having a long chain branch, and thereby, film formability can be improved and the producible area can be increased, and thus, the productivity is significantly improved. Furthermore, in the particular case where the film is produced by longitudinal stretching to a high ratio, the physical properties of the film in the longitudinal direction can be enhanced. This is assumed to be because the film comprises a polypropylene having a long chain branch, and thereby, long chain branch accelerate entanglement of tie molecules in an amorphous phase which penetrates crystallites within the system at the stage of casting process (effects of quasi-crosslinking between crystallites), and thereby, the stretching stress is uniformly propagated throughout the entire system during the subsequent stretching process.

In addition, in the case where a film comprises a polypropylene having a long chain branch as described above, and is produced by longitudinal stretching to a high ratio, the area ratio after stretching (product of effective longitudinal stretching ratio and effective transversely stretching ratio) can be increased, and pore generation is accelerated, and thereby, the specific gravity can be lowered as compared to conventional microporous polypropylene films. Also, mainly the multilayer structure of the film and the conditions for film formation can be controlled to improve the permeability significantly.

The longer the polypropylene chain that branches from the main chain of the polypropylene having a long chain branch in the main chain is, the greater the effects of adding the above-described polypropylene having a long chain branch are. It is preferable that the branch has the similar length as the main chain of polypropylene. In addition, it is preferable that one or more long chain branches is introduced in one main chain of the polypropylene on average throughout the entire polypropylene having a long chain branch, from the point of view of obtaining the above-described effects of quasi-crosslinking between crystallites, and it is more preferable that two or more long chain branches is introduced.

It is preferable that the weight average molecular weight (Mw) of the polypropylene having a long chain branch as described above is not less than $10 \times 10^4$. If Mw is below the above-described range, the above-described effects of preventing reorientation of the longitudinally oriented crystallites may occasionally become insufficient. Though no particular upper limit is set for Mw, as long as the effects of this invention can be obtained, it is preferable that Mw is no greater than $500 \times 10^4$, from the point of view of, for example, the melt-extrusion stability. It is more preferable that Mw is $15 \times 10^4$ or more, most preferably $20 \times 10^4$ or more. The weight average molecular weight of polypropylene having a long chain branch can be measured in accordance with the above-described method.

Examples of polypropylenes having a long chain branch in the main chain include those already described above.

It is preferable that the branching index g of the polypropylene having a long chain branch comprised in the microporous polypropylene film of the embodiment C is not greater than 0.95. If the branching index g exceeds the above-described range, the effects of adding the polypropylene having a long chain branch may occasionally be impaired, the film formability may occasionally deteriorate, the specific gravity of the microporous film obtained through stretching in the longitudinal direction to a high ratio may occasionally increase, and the permeability may occasionally deteriorate. It is preferable that the branching index g of the polypropylene having a long chain branch is not greater than 0.9.

Though the content of the polypropylene having a long chain branch comprised in the microporous polypropylene film of the embodiment C is not particularly limited, it is preferable to be 1 wt % to 30 wt % with respect to the entire amount of polypropylene of the film, and characteristically, the effects can be obtained even by adding a small amount. If the amount of mixture is below the above-described range, film formability, particularly stretchablity in the transverse direction in the case of longitudinal-transverse sequential biaxial stretching when stretched to a high ratio in the longitudinal direction, may occasionally deteriorate (film may break during the transversely stretching process). In addition, the specific gravity of the microporous film obtained through stretching to a high ratio in the longitudinal direction may occasionally increase and the permeability may occasionally deteriorate. If the content exceeds the above-described range, film formability, particularly stretchability in the longitudinal direction in the case of longitudinal-transverse sequential biaxial stretching when stretched to a high ratio in the longitudinal direction, may occasionally deteriorate (film may break during the longitudinal stretching process). In addition, discharging stability of the melted polymer at the melt-extrusion process and impact resistance of the film may occasionally deteriorate. Furthermore, the β-crystal content defined as below may occasionally decrease more than necessary. It is preferable that the content of the polypropylene having a long chain branch is 1 wt % to 20 wt % with respect to the total amount of polypropylene of the film, and more preferably 1.5 wt % to 15 wt %.

As common to the group of the first aspect, it is preferable that the temperature of crystallization from melt (Tmc) of these microporous polypropylene films is 120° C. to 135° C. The Tmc is within the above-described range, and thereby, the size of spherulites can be reduced at the process of obtaining an unstretched sheet from the melt state. Therefore, film formability can be improved and the specific gravity of the resultant microporous film can be effectively reduced, and furthermore, the permeability can sometimes be improved, in the case of a permeable microporous film. If the Tmc is below the above-described range, the solidification rate of the polymer from melt is low at the casting process and taking off of the sheet from a metal drum may become insufficient, and therefore, it may become necessary to set the casting speed; thus the line speed (film formation speed), low, and the productivity may deteriorate. In addition, the specific gravity of the resultant microporous film may increase and the permeability may deteriorate. If the Tmc exceeds the above-described range, although it may become possible to increase the casting speed at the casting process, the β-crystal content in an unstretched sheet may decrease, and the specific gravity of the resultant microporous film may increase and the permeability may deteriorate. It is preferable that the Tmc is 121° C. to 130° C., and more preferably 123° C. to 129° C.

Next, the group of the second aspect is described.

The microporous polypropylene film of the embodiment A comprises a polypropylene where the relationship between the melt strength (MS) and the melt flow rate (MFR), measured at 230° C., is represented in the following formula (1) in the polypropylene constituting the film.

$$\log (MS) > -0.61 \log (MFR) + 0.82 \quad (1)$$

In other words, the microporous polypropylene film of the embodiment A comprises a polypropylene that satisfies the above-described formula (1). The polypropylene of the film may of course comprise only the polypropylene that satisfies the above described formula (1). Such polypropylene is usually termed as a high melt strength-PP (hereinafter, sometimes abbreviated as HMS-PP) due to the characteristics of the high MS.

Here, the MS measured at 230° C. is the tension (unit: cN) which is measured when a strand is taken up at a rate of 15.7 m/min, and this strand is obtained in such a manner that a capirograph with a melt tension tester is used to heat a sample to 230° C., and the melted polypropylene is extruded at a extrusion rate of 20 mm/min. Here, only in the case where the tension cannot be measured because the strand breaks under the above-described conditions, the tension at the taking-up rate of 5 m/min may be used as the MS of the polypropylene. In general, the MS of polypropylene has a dependency on the MFR in such a manner that the lower the MFR is, the higher the MS is. Therefore, a formula is obtained in the above-described manner so as to represent the characteristics where the MS is high relative to the MFR in comparison with conventional polypropylenes. The relationship between the MS and the MFR of polypropylene or a polypropylene-based resin composition is disclosed in, for example, Japanese Unexamined Patent Publication 2003-64193, Japanese Unexamined Patent Publication 2001-114950 and the like, and the data of the measured MS under the same conditions as in this invention is disclosed in Japanese Unexamined Patent Publication 2003-64193.

The polypropylene of the film comprises a polypropylene which satisfies the above-described formula (1), and thereby, the microporous polypropylene film of the embodiment A is excellent in the film formability with little film breakage as compared to conventional microporous polypropylene films. Furthermore, the film can be produced by stretching in the longitudinal direction at a low temperature and to a high ratio without breakage during the transverse stretching process, and the line speed can be increased by stretching to a high ratio in the longitudinal direction for the same casting speed as compared to conventional microporous polypropylene films, and thereby, the producible area of the film per unit time can be increased. In this manner, the polypropylene which satisfies the above-described formula (1) is comprised, and thereby, film formability can be improved, and the producible amount can also be increased, and thus, the productivity can be significantly improved. Furthermore, the physical properties of the film in the longitudinal direction can be enhanced, particularly in the case where the film is produced by stretching to a high ratio in the longitudinal direction. This is assumed to be because the polypropylene which satisfies the above-described formula (1) is comprised, and thereby, entanglement between tie molecules in amorphous phases that penetrate through crystallites within the system is accelerated at the stage of casting process, and as a result, the stretching stress is uniformly propagated throughout the entire system during the subsequent stretching process.

Moreover, in the case where the polypropylene which satisfies the above-described formula (1) is comprised as described above and the film is produced by stretching to a high ratio in the longitudinal direction, the area ratio after stretching (product of effective longitudinal stretching ratio and effective transversely stretching ratio) can be increased, and pore generation is accelerated, and thereby, the porosity can be increased as compared to conventional microporous polypropylene films. In addition, mainly the multilayer construction of the film and the conditions for film formation can be controlled to improve the permeability significantly.

It is preferable that the above-described high melt strength polypropylene (HMS-PP), which is comprised in the polypropylene of the microporous polypropylene film, satisfies the following formula (4) and more preferably the following formula (5) in the embodiment A:

$$\log (MS) > -0.61 \log (MFR) + 1.2 \quad (4)$$

$$\log (MS) > -0.61 \log (MFR) + 1.3 \quad (5).$$

In addition, if the relationship between the MS and the MFR of the above-described HMS-PP is represented by the above-described formula (1), the above-described film breakage can be reduced, the film can be stably produced by stretching to a high ratio in the longitudinal direction, and such effects tend to be obtained that the porosity can be increased through stretching to a high ratio in the longitudinal direction and the permeability can be improved. However, while in the case where, for example, the MS is too high relative to the MFR or the MFR is too high relative to the MS even within the range of the above-described formula (1), film formability particularly longitudinal stretchability in the case of longitudinal-transverse sequential biaxial stretching, may deteriorate, depending on the amount of addition, and therefore, it is preferable to satisfy, for example, the following formula (6), more preferably the following formula (7);

$$\log (MS) < -0.61 \log (MFR) + 2.3 \quad (6)$$

$$\log (MS) < -0.61 \log (MFR) + 2 \quad (7).$$

Though the method to obtain the HMS-PP as described above is not particularly limited, the following methods are shown as examples, and these methods are preferably used:
  a method of blending polypropylene comprising a large amount of a high molecular weight component;
  a method of blending oligomers or polymers having a branched structure;
  a method of introducing a long chain branched structure into polypropylene molecules as described in Japanese Unexamined Patent Publication S62 (1987)-121704;
  a method of preparing a stretight-chain crystalline polypropylene, whose melt strength and the intrinsic viscosity, as well as the crystallization temperature and the melting point, satisfy a specific relationships respectively, and the residual ratio after extracting with the boiling xylene is in a specific range, without introducing a long chain branch, as disclosed in Japanese Patent publication No. 2869606.

It is particularly preferable that the above-described HMS-PP, comprised in the microporous polypropylene film of the embodiment A of the second invention, be HMS-PP having a long chain branch in the main chain from among the above-described polypropylenes because the effect of improving a melt-extrusion stability and the above-described effects of improving the film formability, which are associated with the effect of increasing the porosity and improving the permeability, tend to be enhanced significantly.

Here, the HMS-PP having a long chain branch in the main chain is polypropylene having a polypropylene chain that branches from its main chain. The great effects can be obtained with polypropylene having a long chain branch in the main chain as described above is assumed to be because the long chain branches work as a tie molecule to quasi-crosslink between crystallites at the stage of casting process, so that the stretching stress is propagated throughout the entire system during the subsequent stretching process.

The concrete examples of above-described HMS-PP having a long chain branch in the main chain include HMS-PP manufactured by Basell (types: PF-814, PF-633, PF-611, SD-632 and the like), HMS-PP manufactured by Borealis (types: WB130HMS and the like) and HMS-PP manufactured by Dow (types: D114, D201, D206 and the like), or the like. It is preferable that the branching index g of the HMS-PP, which satisfies the above-described formula (1) and is comprised in the polypropylene of the microporous polypropylene film of the embodiment A, is no greater than 0.95. If the branching index g exceeds the above-described range, the above-described effects of adding HMS-PP may be impaired, film formability may deteriorate, the porosity of the microporous film that is obtained by stretching to a high ratio in the longitudinal direction may decrease and the permeability may deteriorate. The branching index g of the above-described HMS-PP is more preferably no greater than 0.9.

It is preferable that the MS of the HMS-PP, which satisfies the above-described formula (1) and is comprised in the polypropylene film of the embodiment A, is 3 cN to 100 cN. If the MS is below the above-described range, the above-described effects of adding HMS-PP cannot be obtained and film formability, particularly transverse stretchability in the case of longitudinal-transverse sequential biaxial stretching when stretched to a high ratio in the longitudinal direction, may deteriorate (film may break during the transverse stretching process). In addition, the porosity of the microporous film that is obtained by stretching to a high ratio in the longitudinal direction may decrease and the permeability may deteriorate. If the MS exceeds the above-described range, film formability, particularly longitudinal stretchability in the case of the longitudinal-transverse sequential biaxial stretching when stretched to a high ratio in the longitudinal direction, may deteriorate (film may break during the longitudinal stretching process). In addition, melt-extrusion stability of a melted polymer at the melt-extrusion process and the impact resistance of the film may deteriorate. Furthermore, the β-crystal content, defined as below, may decrease more than necessary. It is preferable that the MS of the HMS-PP satisfying the above-described formula (1) is 4 cN to 80 cN, and more preferably 5 cN to 60 cN.

Though the content of the HMS-PP, which satisfies the above-described formula (1) and is comprised in the microporous polypropylene film of the embodiment A, is not particularly limited, it is preferable to be 1 wt % to 50 wt % with respect to the total amount of the polypropylene of the film, and characteristically, those effects can be obtained by adding a small amount. If the content is below the above-described range, film formability, particularly transverse stretchability in the case of longitudinal-transverse sequential biaxial stretching when stretched to a high ratio in the longitudinal direction, may deteriorate (film may break during the transversely stretching process). In addition, the porosity of the microporous film that is obtained by stretching to a high ratio in the longitudinal direction may decrease and the permeability may deteriorate. If the content exceeds the above-described range, film formability, particularly longitudinal stretchability in the case of longitudinal-transverse sequential biaxial stretching when stretched to a high ratio in the longitudinal direction, may deteriorates (film may break during the longitudinal stretching process). In addition, melt-extrusion stability of the melted polymer at the melt-extrusion process and impact resistance of the film may deteriorate. Furthermore, the β-crystal content, defined as below, may decrease more than necessary. It is preferable that the content of the HMS-PP satisfying the above-described formula (1) is 1 wt % to 20 wt % with respect to the total amount of the polypropylene of the film, and more preferably 2 wt % to 12 wt %.

As the embodiment B, a microporous polypropylene film where the melt strength (MS) measured at 230° C. is less than 5 cN and the relationship between the MS and the melt flow rate (MFR) is represented by the following formula (2) can be cited:

$$\log (MS) > -0.9 \log (MFR) + 0.6 \quad (2).$$

Here, "the MS of the film is less than 5 cN, and the relationship between the MS and the MFR satisfy the above-described formula (2)" means that the MS obtained for the entire polypropylene of the film is less than 5 cN, and the MS and the MFR satisfy the above-described formula (2). At this time, in the case where an additive or the like is comprised in the polypropylene of the film, it is preferable to measure the MS and the MFR after extracting it or to measure those before adding it. However, it is reasonable to be represented by whether or not the relationship between the MS and the MFR, which are measured in the presence of the additive before extraction, satisfy the above-described formula (2), and in such a case, an objective of this invention is achieved in the same manner, and therefore, the present requirements are assumed to be satisfied if the MS is less than 5 cN, and the relationship between the MS and the MFR satisfy the above-described formula (2) in the presence of the additive or the like in this invention.

In the embodiment B, the polypropylene of the microporous polypropylene film has the MS of less than 5 cN and satisfies the relationship between the MS and the MFR represented by the above-described formula (2), and thereby, is excellent in film formability with little film breakage at the stretching process as compared to conventional microporous polypropylene films. Furthermore, a film can be formed without breakage during the transverse stretching process even by longitudinal stretching at a low temperature and to a high ratio, and thus, the line speed can be increased by stretching to a high ratio in the longitudinal direction for the same casting speed as compared to conventional microporous polypropylene films, and thereby, the producible area per unit time can be increased. In this manner, the MS is less than 5 cN and the relationship between the MS and the MFR satisfy the above-described formula (2), and thereby, film formability can be improved, and the producible area can be increased, and therefore, the productivity can be improved significantly. Furthermore, in the particular case where the film is stretched to a high ratio in the longitudinal direction, the physical properties of the film in the longitudinal direction can be improved. This is assumed to be because the MS is less than 5 cN and the MS and the MFR are controlled so as to satisfy the above-described formula (2), and thereby, entanglement of tie molecules in amorphous phases which penetrate through crystallites within the system is accelerated at the stage of casting process, and as a result, the stretching stress is uniformly propagated throughout the entire system during the subsequent stretching process.

In addition, in the case where a film comprises a polypropylene where the MS is less than 5 cN, and the relationship between the MS and the MFR satisfy the above-described formula (2), as described above, and the film is produced by stretching to a high ratio in the longitudinal direction, the area ratio after stretching (product of effective longitudinal stretching ratio and effective transversely stretching ratio) can be increased, and pore generation is accelerated, and thereby, the porosity can be increased in comparison with conventional microporous polypropylene films. In addition, mainly the multilayer construction of the film and the conditions for film formation can be controlled to improve the permeability significantly.

It is preferable that the MS of the polypropylene of the microporous polypropylene film of the embodiment B is less than 3 cN, more preferably no greater than 2 cN. The relationship between the MS and the MFR of the polypropylene of the microporous polypropylene film of this invention preferably satisfy the following formula (8), and more preferably the following formula (9). These can be controlled, for example, by adjusting the type and the content of HMS-PP, shown as below, and thus, film formability can be improved, the film could be formed by longitudinal stretching at a low temperature and to a high ratio, the porosity sometimes can be increased by stretching to a high ratio in the longitudinal direction, and the permeability could be improved, as described above:

$$\log (MS) > -0.9 \log (MFR) + 0.65 \quad (8)$$

$$\log (MS) > -0.9 \log (MFR) + 0.7 \quad (9).$$

The polypropylene, where the MS is less than 5 cN and the relationship between the MS and the MFR satisfies the above-described formula (2), can be obtained by, for example, mixing a so-called high melt strength-PP (HMS-PP) having a high melt strength (MS), such as a polypropylene to which a high molecular weight component is introduced or a polypropylene having a long chain branch in the main chain, with a variety of general-purpose polypropylenes, or by introducing a long chain branch component to the main chain of a variety of general-purpose polypropylenes through copolymerization or graft polymerization, or the like, so that the MS increases. It is preferable to use a polypropylene having a long chain branch from among the above-described polypropylenes as a polypropylene constituting the microporous polypropylene film, because the above-described effects of improving the film formability, and the involved effect of increasing the porosity and improving the permeability tend to be enhanced significantly.

Though the polypropylene constituting the microporous polypropylene film of the embodiment B is not particularly limited, as long as the MS is less than 5 cN and the above-described formula (2) is satisfied, it is preferable to be a polypropylene having, for example, the properties shown in the following.

That is to say, it is preferable that the polypropylene comprises a polypropylene satisfying the above-described formula (1), and as a result, be a polypropylene where the MS is less than 5 cN and the MS and the MFR satisfies the above-described formula (2). The polypropylene satisfying the above-described formula (1) is obtained by, for example, mixing a polypropylene having a long chain branch in the main chain, from among HMS-PP's, with general-purpose polypropylene, or introducing a long chain branch component to the main chain of a general-purpose polypropylene through copolymerization, graft polymerization or the like, so that the MS increases.

The molecular structure of conventional general-purpose polypropylenes is a linear structure. Meanwhile, the polypropylene constituting the microporous polypropylene film comprises the polypropylene having such a long chain branch, and thereby, the effect of improving the film formability and then, the improved effect of increasing the porosity and improving the permeability can be enhanced significantly. This is assumed to be because long chain branches work as tie molecules to quasi-crosslink between crystallites at the stage of casting process and the stretching stress is uniformly propagated throughout the entire system in the subsequent stretching process.

As common to all of the second aspects of the disclosure, it is preferable that the isotactic pentad fraction (mmmm) of the polypropylene of these microporous polypropylene films is 90% to 99.5%. The isotactic pentad fraction is controlled in the above-described range, and thereby, the crystallinity itself of the obtained unstretched sheet can be increased, and thus, the producible amount of β-crystal can be increased, the porosity of the resultant microporous film can be increased, and the permeability can be improved. If the isotactic pentad fraction is below the above-described range, the porosity may decrease, the permeability may become inferior, taking off the unstretched sheet from the casting drum may become insufficient at the casting process. It may tend to be impossible to increase the casting speed, the casting speed, and consequently, the line speed (film formation speed) must be set low, and the productivity may deteriorate. Moreover, if the isotactic pentad fraction exceeds the above-described range, although it may become possible to increase the casting speed at the casting process, there may be much film breakage during the film formation process. As a result, film formability may deteriorate. It is preferable that the isotactic pentad fraction is 92% to 99%, and more preferably 93% to 99%.

Next, a polypropylene film characterized by a specific azimuthal profile measured by an X-ray diffraction method of a film is described as the third aspect.

The microporous polypropylene film satisfies the following formula (3) in the azimuthal profile for (−113) plane measured by an X-ray diffraction method $$0.5 \leq I(MD)/I(TD) \leq 8 \tag{3}$$

Here, I(MD) is the integral intensity in the longitudinal direction, and I(TD) is the integral intensity in the transverse direction.

(−113) Plane is a crystal lattice plane comprising a component in the direction of molecular chain axis, which is obtained at the vicinity of 2θ=43° in the X-ray diffraction profile measured by 2θ/θ scanning. I(MD) and I(TD) are the integral intensity, calculated from the profile of intensity distribution, which is obtained by fixing the sample and the counter at θ and 2θ, where the above-described diffraction peak for (−113) peak can be obtained, and rotating the sample in the direction of the azimuthal angle (β) within the film plane, as described in the following detailed description of the measuring method. If the X-ray irradiation volume is constant with each sample, the above-described azimuthal intensity distribution profile for (−113) plane corresponds to the in-plane orientation distribution of the crystalline molecular chain. That is to say, I(MD) corresponds to the component of the in-plane crystalline chains oriented in the longitudinal direction and I (TD) corresponds to that oriented in the transverse direction. In the case where, for example, I (TD) is sufficiently high as compared to I (MD), the crystalline chains within the film plane correspond to those mainly oriented transversely. Accordingly, the magnitude of I(MD)/I(TD) can be concluded to be a criterion indicating how much in-plane crystalline chains are oriented in the longitudinal direction. That is to say, I(MD)/I(TD) becomes high for the film highly oriented longitudinally, and conversely, I(MD)/I(TD) becomes low for the film mainly oriented transversely. The in-plane crystalline chain orientation balance of a biaxially stretched polypropylene film is examined with the azimuthal intensity distribution profile for (−113) plane by, for example, Masuda et al "Convertech" 369, December, pp. 42-45 (2002). In addition, since (−113) plane is not strictly the meridional peak (diffraction peak for the lattice spacing perpendicular to the chain), the peak of each intensity distribution may slightly split in the above-described profile of the intensity distribution in the β direction.

The microporous polypropylene film has I(MD)/I(TD) in the above-described mode, and thereby, is in a state where the crystalline chains are highly oriented in the longitudinal direction, as compared to conventional microporous polypropylene films. As a result, crystalline chains are highly oriented longitudinally for the same specific gravity, in comparison with conventional microporous polypropylene films, and thus, the physical properties in the longitudinal direction of the film become excellent. As a result, in the film formation process and in the subsequent converting process, such as slitting, winding, coating, vapor depositing, printing or laminating, it becomes difficult for the film to get elongated uniformly or get wrinkled or break, and thus, handling properties becomes excellent. Moreover, even if the specific gravity is further lowered, that is to say, the porosity is further increased, the longitudinal physical properties are excellent, and therefore, the permeability can be improved significantly while maintaining handling properties. That is to say, the microporous polypropylene film has I(MD)/I (TD) in the above-described mode, and thereby, the low gravity (high porosity), the excellent permeability and handling properties accompanying those can both be satisfied at a high level.

Controlling I(MD)/I(TD) to the above-described mode can be achieved by, for example, selecting the β-crystal nucleating agent to be added to the polypropylene constituting the film and controlling the content, or in the manufacturing process, by controlling the crystallization conditions when the melted polymer is solidified at the casting process (temperature of metal drum, rotating speed of metal drum, thickness of obtained unstretched sheet, contacting time with metal drum and the like) and the stretching conditions at the stretching process (stretching direction (longitudinal and/or transverse), stretching manner (longitudinal or transverse uniaxial stretching, longitudinal-transverse or transverse-longitudinal sequential biaxial stretching, simultaneous biaxial stretching, rest retching after biaxial stretching), stretching ratio, stretching speed, stretching temperature and the like). In the case where longitudinal-transverse sequential biaxial stretching is carried out, selection of appropriate conditions for longitudinal stretching (temperature, ratio and the like) from among these is particularly important. That is to say, the higher the longitudinal stretching ratio is, the higher I(MD)/I(TD) can be made. However, the higher the longitudinal stretching ratio is, the more unstable the stretchability during the subsequent transverse stretching process becomes, and therefore, it is preferable that the polypropylene constitutes the microporous polypropylene film of the third invention satisfies at least one of the following requirements:

The polypropylene of the film comprises a polypropylene of which the Trouton ratio is 30 or more.

The Trouton ratio of the polypropylene of the film is 6 or more.

The polypropylene of the film comprises a polypropylene having a long chain branch.

The polypropylene of the film comprises a polypropylene which satisfies the following formula (1):

$$\log (MS) > -0.61 \log (MFR) + 0.82 \tag{1}$$

The polypropylene of the film satisfies the following formula (2):

$$\log (MS) > -0.9 \log (MFR) + 0.6 \tag{2}$$

Though the higher I(MD)/I(TD) is, the more excellent the longitudinal physical properties become, the resultant film tends to become easy to be teared in the longitudinal direction and the productivity tends to deteriorate during the manufacturing process if the value is too high. Accordingly, it is preferable that the microporous polypropylene film satisfies the following formula (10), and more preferably satisfy the following formula (11):

$$0.8 \leq I(MD)/I(TD) \leq 6 \tag{10}$$

$$0.9 \leq I(MD)/I(TD) \leq 5 \tag{11}$$

The "polypropylene" can consist mainly of a homopolymer of propylene, and may be a polymer where propylene and a monomer other than propylene are copolymerized, or those copolymer may be blended with the polypropylene, as long as the objective of these inventions is maintained. Examples of the monomer constituting such a copolymer component or blended polymer include ethylene, 1-butene, 1-pentene, 3-methyl pentene-1, 3-methyl butene-1, 1-hexene, 4-methyl pentene-1, 5-ethyl hexene-1, 1-octene, 1-decene, 1-dodecene, vinyl cyclohexene, styrene, ally benzene, cyclopentene, norbornene, 5-methyl-2-norbornene, acrylic acid and their derivatives, to which the monomer is not limited.

It is desirable that these porous polypropylene films comprises at least one type of polymer selected from polyolefin based resins and polymers other than polyolefin based resins, from the point of view of accelerating the pore generation.

Though homopolymers and copolymers from mainly of olefin, such as the monomers shown in the above, other than propylene, can be cited as the polyolefin based resins, the polyolefin based resins are not limited to these. Concrete examples of the polyolefin based resins include, for example, polymethyl pentene, copolymers of methyl pentene and α-olefin other than methyl pentene, homopolybutene, homopolymer and copolymer of cycloolefins, linear low-density polyethylene obtained by a metallocene catalyst method and very-low-density polyethylene obtained by a metallocene catalyst method, in view of the effects of fine dispersion in polypropylene at the melt-extrusion process and acceleration of pore generation at the subsequent stretching process. The polyolefin based resin is not limited to these, and very-low-density polyethylene obtained by a metallocene catalyst method is particularly preferable, because the pore generation could be accelerated, and as a result, the specific gravity could be reduced, and furthermore, it is the often the case that the permeability and film formability can be improved.

The polymers other than polyolefin based resins includes a vinyl based polymer resin other than polyolefin, a polyester based resin, a polyamide based resin, a polyphenylene sulfide based resin and a polyimide based resin and the like, to which the other polymers are not limited. The concrete examples of the polymers other than polyolefin based resin include polybutylene terephthalate, polycarbonate and syndiotactic polystyrene, in view of the effects of fine dispersion in polypropylene at the melt-extrusion process and acceleration of the pore generation at the subsequent stretching process, to which the polymers other than the polyolefin based resins are not limited.

Here, as for ultra-high molecular weight polyethylene (UHMWPE) as a polyolefin based resin, and polytetrafluoroethylene (PTFE) and its derivatives as the polymers other than the polyolefin based resin, a gel-like material may separate out at the melt-extrusion process. In addition, there is a concern with PTFE that fluorinated acid may be generated through the decomposition of the polymer, and thereby, the extruder and the die may be corroded. Therefore, substantially, it may be not preferable to add UHMWPE or PTFE as the polymer other than the polyolefin based resin.

As common to the first, second and third inventions, the polypropylene of these microporous polypropylene can be blended with pieces of the scrap film, which are formed at the manufacturing process of the microporous polypropylene films, and pieces of the scrap film which are formed at the manufacturing process of other films, as long as the properties are maintained, from the viewpoint of an economical efficiency. At this time, in one aspect, the polypropylene of the microporous polypropylene film needs to comprise a polypropylene with the Trouton ratio of not less than 30, or have a Trouton ratio of not less than 6, and needs to have the β-crystal activity defined as below. In another aspect, the polypropylene of the microporous polypropylene film needs to comprise a polypropylene where the relationship between the MS and the MFR satisfy the above-described formula (1) or have an MS of less than 5 cN and satisfy a relationship between the MS and the MFR represented by the above-described formula (2), and needs to have the β-crystal activity defined as below.

It is preferable that these microporous polypropylene films comprises 90 wt % or more of a propylene monomer unit with respect to the total amount of the monomers of all the polymers constituting the film in either of the case of a single layer film or the case of a multilayer laminated film of two or more layers, as shown below. Here, in the case where a polymer consisting of a monomer other than propylene is added in view of the acceleration of the pore generation, or in the case where pieces of the scrap film that are formed at the manufacturing process of a film other than the microporous polypropylene films are blended, or in the case where a variety of polyolefin based resins and/or the other resins are laminated, or the like, the propylene monomer becomes less than 100 wt % with respect to the total amount of monomers of all the polymers constituting the film. If the content of the propylene monomer is below the above-described range, the β-crystal activity of the resultant microporous film may become insufficient, and as a result, the specific gravity may increase and the permeability may become inferior. It is preferable that the content of the propylene monomer of the microporous polypropylene films is not less than 95 wt % with respect to the total amount of the monomers of all the polymers constituting the film, and more preferably not less than 97 wt %.

It is preferable that the melt flow rate (MFR) of the polypropylene of these microporous polypropylene films is 1 g/10 min to 30 g/10 min in view of film formability. If the MFR is below the above-described range, such problems may arise, that melt-extrusion at a low temperature becomes unstable, it takes a long time to replace raw materials in extruder, the formation of a film with a uniform thickness becomes difficult, and film formability deteriorates. If the MFR exceeds the above-described range, when melted polymer discharged from the slit-die is cast onto a metal drum at the casting process so as to be formed into a sheet, the landing point of the melted polymer on the metal drum is greatly fluctuated, and therefore, uniform generation of β-crystal in the unstretched sheet may become difficult, and defects such as rippling are formed in the sheet, and thus, thickness variation of the resultant microporous film may become great and the uniformity of the pore generation may be impaired. The MFR is preferably 1 g/10 min to 20 g/10 min.

It is preferable that the isotactic index (II) of the polypropylene of these microporous polypropylene films is 92% to 99.8%. If the II is below the above-described range, such problems may occur, that the stiffness becomes impaired when processed to a film and the heat shrinkage increases. The higher the II is, the more the rigidity and the dimensional stability tend to be improved, but if the II exceeds the above-described range, film formability may deteriorate. It is preferable that the II is 94% to 99.5%, and more preferably 96% to 99%.

Here, in the case where it is necessary to remove impurities/additives when the above-described property values of polypropylene, for example Trouton ratio, MS, MFR, ranching index g, Tmc, isotactic pentad fraction and II, are measured, the sample is extracted with n-heptane for two hours at a temperature of no higher than 60° C., after removing impurities/additives, and measurement is carried out for the sample after it has been dried in a vacuum for not less than two hours at the temperature of 130° C.

Next, it is necessary that the microporous polypropylene film of these inventions have a β-crystal activity. Here, "having a β-crystal activity" is determined that the top of the endothermic peak accompanying the melting of β-crystal is between 140° C. and 160° C. in the thermal curve obtained when a sample of 5 mg is heated to 280° C. at a rate of 10° C./min, and after that, the sample is kept in this state for five minutes and cooled to 30° C. at a cooling rate of 10° C/min and then again heated at a rate of 10° C/min in a nitrogen atmosphere according to JIS K 7122 (1987) using a differential scanning calorimeter (DSC), and the heat of fusion calculated from the peak area of this endothermic peak is not less than 10 mJ/mg. In addition, the thermal curve obtained for the initial heating may be referred to as the thermal curve of the first run, and the thermal curve obtained for the second heating may be referred to as the thermal curve of the second run. Here, as disclosed by Cho et al "Polymer" 44, pp. 4053-4059 (2003) and Takahashi et al "Forming Process" 15, pp. 756-762 (2003), the performance of polypropylene to generate β-crystal can be confirmed with a DSC. In these documents, the thermal curve is obtained with a DSC under temperature conditions close to those of these inventions, and the β-crystal activity of polypropylene comprising a β-crystal nucleating agent is confirmed. Here, that the film "has β-crystal activity" means that β-crystal can be generated when polypropylene is crystallized. In addition, in determining the β-crystal activity described here, measurement is carried out on a film after the processes of melt-extrusion, casting, stretching and winding, that is to say, after film formation. Accordingly, in the case where the polypropylene of the film comprises a β-crystal nucleating agent as shown below, the β-crystal activity is determined for the entirety of the film comprising the β-crystal nucleating agent.

In addition, in the case where the endothermic peak is in the above-described temperature range but it is unclear whether the peak is caused by the fusion of the β-crystal, "having a β-crystal activity" may be determined from the below-described K value, where the sample is prepared by melting and crystallizing the above-described sample and calculation is carried out in accordance with wide angle X-ray diffraction method as described in the following detailed description of the measuring method, together with the results obtained with a DSC. That is to say, it may be determined on the basis of whether the K value, calculated using the following formula, is no smaller than 0.3, preferably no smaller than 0.5, from the diffraction peak intensity (referred to as $H\beta_1$) for (300) plane, originated from the β-crystal and observed near $2\theta=16°$ and the diffraction peak intensity (referred to as $H\alpha_1$, $H\alpha_2$ and $H\alpha_3$, respectively) for (110), (040) and (130) planes, originated from the α-crystal and observed near $2\theta=14°$, 17° and 19°, respectively. Here, the K value is an empirical value indicating the ratio of the β-crystal. A. Turner Jones et al "Makromolekulare Chemie" 75, pp. 134-158 (1964) may be referred to for the details of the K value, including the method to calculate each of the diffraction peak intensities.

$$K=H\beta_1/\{H\beta_1+(H\alpha_1+H\alpha_2+H\alpha_3)\}.$$

(Here, $H\beta_1$ is the diffraction peak intensity for (300) plane originated from the β-crystal of polypropylene, and $H\alpha_1$, $H\alpha_2$ and $H\alpha_3$ are the diffraction peak intensities of (110), (040) and (130) planes, respectively, originated from the α-crystal of polypropylene).

The microporous polypropylene films have a β-crystal activity, and thereby, it becomes possible to generate β-crystal in the unstretched sheet in the manufacturing process, and the β-crystal are transformed to α-crystal at the subsequent stretching process so that pores can be generated due to the difference in the two crystal densities.

Figure 2:
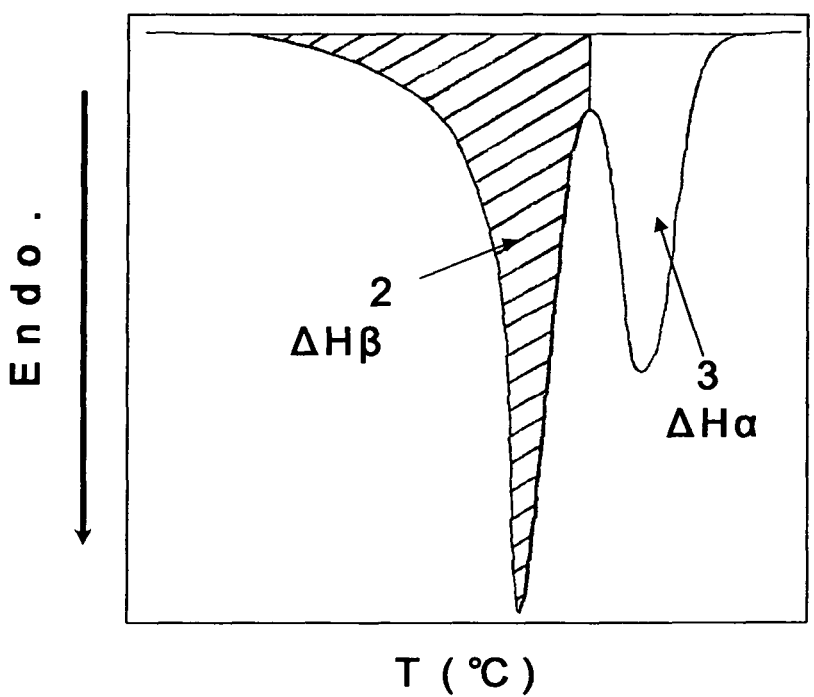
FIG. 2 is a diagram showing the heat of fusion obtained from the area of the endothermic peak due to the melting of β-crystal (ΔHβ), which was observed between 140° C. and 160° C., in FIG. 1, and the heat of fusion obtained from the area of the endothermic peak due to the melting of crystal originating from polypropylene other than β-crystal (ΔHα), which was observed at a temperature of not less than 160° C.

Here, it is preferable that the β-crystal content of the microporous polypropylene films, is not less than 30% in order to generate uniform and a great number of pores. Here, the β-crystal content is obtained by using the following formula from the heat of fusion calculated from the peak area of the endothermic peaks (one or more peaks) accompanying the fusion of β-crystal of the polypropylene (ΔHβ: symbol 2 in FIG. 2, showing the same thermal curve as FIG. 1) where a peak is observed no lower than 140° C. and lower than 160° C. in the thermal curve of the second run obtained during the second heating with a DSC as described above, and the heat of fusion calculated from the peak area of the endothermic peaks accompanying the melt of crystals other than β-crystal of the polypropylene having a peak above the base line accompanying the melt of the crystals of the polypropylene other than β-crystal where a peak is observed no lower than 160° C. (ΔHα: symbol 3 in FIG. 2, showing the same thermal curve as FIG. 1). Here, the β-crystal content is a ratio of the β-crystal in the total crystals of the polypropylene, and the) β-crystal content of a film is obtained by measuring the thermal curve with a DSC under the temperature conditions close to those of those disclosed herein in Japanese Unexamined Patent Publication 2004-142321 and the above-described Japanese Unexamined Patent Publication 2004-160689. Here, there is a endothermic peak with a top between 140° C. and 160° C., and the above-described K value may be used for determination in the case where it is unclear whether the peak is caused by the fusion of the β-crystal.

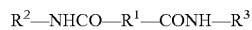

If the β-crystal content is below the above-described range, the porosity of the resultant microporous film may become low and the permeability may become inferior. It is preferable that the β-crystal content is not less than 36%, more preferably not less than 39%, and most preferably not less than 50%.

It is preferable that a so-called β-crystal nucleating agent is added to the polypropylene of these microporous polypropylene films in order to provide a high β-crystal activity as described above. If such a β-crystal nucleating agent is not added, a high β-crystal content as described above may fail to be obtained. The β-crystal nucleating agents to be preferably added to the polypropylene constituting the microporous polypropylene film include, alkali or alkaline-earth metal salt of carboxylic acid such as 1, 2-hydroxy potassium stearate, magnesium benzoate, magnesium succinate and magnesium phthalate; amide-based chemical compounds such as N, N'-dicyclohexyl-2, 6-naphthalene dicarboxamide; aromatic sulfonate chemical compounds such as sodium benzene sulfonate and sodium naphthalene sulfonate; di- or triesters of dibasic or tribasic carboxylate; tetraoxaspiro chemical compounds; derivatives of imido carboxylic acid; phthalocyanine-based pigments such as phthalocyanine blue; quinacridone-based pigment such as quinacridone and quinacridone quinine; and two component-based compounds made of component A, which is an organic dibasic acid, and component B, which is an oxide, a hydroxide or a salt of a metal in group IIA of the periodic table, to which the β-crystal nucleating agent is not limited. In addition, only one type may be used or two or more types may be mixed for use. As for the β-crystal nucleating agent to be added to the polypropylene of the microporous polypropylene film of the inventions, amide-based chemical compounds such as N, N'-dicyclohexyl-2, 6-naphthalene dicarboxamide, particularly represented by the following chemical formula:

$$R^2-NHCO-R^1-CONH-R^3$$

wherein $R^1$ in the formula indicates a residual group of saturated or unsaturated aliphatic dicarboxylic acid of which the carbon number is 1 to 24, a residual group of saturated or unsaturated alicyclic dicarboxylic acid of which the carbon number is 4 to 28 or a residual group of aromatic dicarboxylic acid of which the carbon number is 6 to 28, and $R^2$ and $R^3$ are same or different cycloalkyl groups of which the carbon number is 3 to 18, cycloalkenyl groups of which the carbon number is 3 to 12 or their derivatives;

chemical compounds having the following chemical formula:

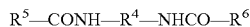
$$R^5\text{—CONH—}R^4\text{—NHCO—}R^6$$

wherein $R^4$ in the formula indicates a residual group of saturated or unsaturated aliphatic diamine of which the carbon number is 1 to 24, a residual group of saturated or unsaturated alicyclic diamine of which the carbon number is 4 to 28, a residual group of heterocyclic diamine of which the carbon number is 6 to 12 or a residual group of aromatic diamine of which the carbon number is 6 to 28, and $R^5$ and $R^6$ are same or different cycloalkyl groups of which the carbon number is 3 to 12, cycloalkenyl groups of which the carbon number is 3 to 12 or their derivatives; and two component-based chemical compounds made of a component which is organic dibasic acid and a component which is an oxide, a hydroxide or a salt of a metal in group IIA of the periodic table, are particularly preferable from among the above because the specific gravity of the resultant microporous polypropylene film can be lowered (the porosity can be increased) and the permeability can be improved.

Concrete examples of such particularly preferable β-crystal nucleating agents and polypropylenes comprising a β-crystal nucleating agent include, the β-crystal nucleating agent "NJ Star" (type name: NU-100 and the like), manufactured by New Japan Chemicals Co., Ltd., and the polypropylene comprising a β-crystal nucleating agent "BEPOL" (type name: B022-SP and the like), manufactured by SUNOCO, or the like.

It is preferable that the content of β-crystal nucleating agent is 0.001 wt % to 1 wt % with respect to the total amount of the polypropylene of the film, depending on the β-crystal generating performance of the used β-crystal nucleating agent. If the content of β-crystal nucleating agent is below the above-described range, the β-crystal activity of the obtained microporous film may become insufficient, the specific gravity may increase (the porosity may decrease) and the permeability may become inferior. If the content of the β-crystal nucleating agent exceeds the above-described range, the obtained β-crystal content of the microporous film may not increase for the extra addition of β-crystal nucleating agent, the microporous film may become economically inferior and the dispersion of the nucleating agent may be impaired leading to deterioration of the β-crystal activity. It is preferable that the content of β-crystal nucleating agent is 0.005 wt % to 0.5 wt %, and more preferably 0.05 wt % to 0.2 wt %.

Here, it is preferable that the above-described β-crystal nucleating agent is dispersed in needle-shape in the polypropylene of the film. The mode of dispersion of the nucleating agent is defined as being dispersed in needle-shape in the case where the chip of raw material or the unstretched sheet or the microporous film, that is melted through heating, are observed with an optical microscope in the planar direction of the film as described in the following detailed description for the measuring method, and the average value of the ratio of the minor axis to the major axis of the shape of the nucleating agent that is observed at this time is 10 or more. It may become possible to increase the porosity and improve the permeability by dispersing the β-crystal nucleating agent in needle-shape. Furthermore, as a result of the above-described effects of accelerating the pore generation due to the accelerating the entanglement of tie molecules, micropores can be generated highly efficiently and uniformly with high density and therefore it may becomes possible to further increase the porosity and to improve the permeability. This is assumed to be because the β-crystal nucleating agent disperses in needle-shape, and thereby, the nucleating agent dispersed in needle-shape is easily aligned to the longitudinal direction at the melt-extruding process (the direction of the major axis of the nucleating agent easily direct to the longitudinal direction of the unstretched sheet), and thereby, crystalline lamellae obtained in the unstretched sheet after casting also easily orient, and there are synergetic effects of those described above and the crystal transformation from β-crystal to α-crystal.

A variety of additives such as, for example, an antioxidant, a thermal stabilizer, a chlorine catcher, an antistatic agent, a lubricant, a anti-blocking agent, a viscosity adjuster and a copper inhibitor can be added to the polypropylene constituting the microporous polypropylene film as long as the objective of these inventions is achieved. At this time, it is particularly preferable that the resultant β-crystal content of the microporous film, in the case where an additive is added, be in a targeted range.

From among these, the appropriate selection of the types and the amount of addition of an antioxidant and a thermal stabilizer is important in view of the thermal resistance of the film. A variety of chemical compounds can be cited as an antioxidant and a thermal stabilizer which are preferably added to the polypropylene of the microporous polypropylene films of these inventions.

Examples of the antioxidant include 2,6-di-tert-butyl-p-cresol (BHT), 3,3',3",5, 5',5"-hexa-tert-butyl-a,a',a"-(mesitylene-2,4,6-triyl)tri-p-cresol (for example, IRGANOX 1330, or the like manufactured by Ciba-Geigy Ltd.) and pentaerythritol tetrakis [3-(3,5-di-tert-butyl-4-hydroxyphenyl)propionate] (for example, IRGANOX 1010, or the like, manufactured by Ciba-Geigy Ltd.), and the like.

Examples of the thermal stabilizer include tris(2,4-di-tert-butylphenyl)phosphite (for example, IRGAFOS 168, or the like, manufactured by Ciba-Geigy Ltd.), and a product through the reaction between 3-hydroxy-5,7-di-tert-butyl-flan-2-on and o-xylene (for example, HP-136, made by Ciba-Geigy Ltd.), and the like.

Here, the antioxidant and the thermal stabilizer are not limited to the above shown examples. It is preferable that two or more types of the above-described antioxidant and thermal stabilizer are used together, and it is preferable that the amounts of addition is 0.03 wt parts to 1 wt part, respectively, with respect to the total amount of the polypropylene of the film. In the case where the respective amounts of addition of the antioxidant and the thermal stabilizer are below the above-described range, long term thermal resistance may becomes inferior at the manufacturing process where a microporous film is obtained from the initial raw materials and at the subsequent converting process. In addition, in the case where the respective amounts of addition of the antioxidant and the thermal stabilizer exceed the above-described range, the resultant long term theramal resistance of the microporous film may not be improved for the extra addition of additives, and the microporous film may become economically inferior. It is preferable that the respective amounts of addition of the antioxidant and thermal stabilizer is 0.05 wt parts to 0.9 wt parts with respect to the total amount of the polypropylene of the film, and more preferably 0.1 wt parts to 0.8 wt parts.

In addition, an antistatic agent for preventing problems caused by static electricity due to an electrostatic charge of the film can be added to the polypropylene of the microporous polypropylene film. Examples of the antistatic agent to be added to the propylene of the microporous polypropylene film include a betaine derivative to which ethylene oxide is added, a quaternary amine-based chemical compound, an alkyl diethanol amine fatty acid ester, a glycerin fatty acid ester, a glyceride stearate and a mixture of these, and the like, to which the antistatic agent is not limited. In addition, a lubricant can be added to the microporous polypropylene film. A lubricant is added in order to improve the flowability and mold releasing property at the process of heat-forming a thermoplastic resin as described using the JIS terms (see, for example, JIS K 6900 (1994)), and is added, for example, in order to adjust the frictional force between the processing machinery and the film surface or between the films. Examples of the lubricant to be added to the polypropylene of the microporous polypropylene film include amide-based chemical compounds such as amide stearate, erucic amide and amide oleate and their mixtures, and the like, to which the lubricant is not limited.

It is preferable that the amount of addition of the antistatic agent to be added to the microporous polypropylene film is not less than 0.3 wt parts with respect to the total amount of the polypropylene of the film, and more preferably 0.4 wt parts to 1.5 wt parts. In addition, it is preferable that the total amount of addition of the antistatic agent and the lubricant is 0.5 wt parts to 2.0 wt parts in view of the antistatic properties and the slip properties. Furthermore, as described above, in the case where the β-crystal content lowers by adding these, it is preferable not to add a substantial amount, and thus, an appropriate amount of addition may be appropriately selected.

Inorganic particles and/or crosslinked organic particles may be added to the polypropylene of the microporous polypropylene film in order in view of providing the slip properties, preventing blocking (anti-blocking agent) and accelerating the pore generation.

The inorganic particles are inorganic particles of a metal or a metal chemical compound, including, for example, particles of zeolite, calcium carbonate, magnesium carbonate, alumina, silica, aluminum silicate, kaoline, kaolinite, talc, clay, diatomite, montmorillonite and titanium oxide as well as their mixtures and the like, to which the inorganic particles are not limited.

Alternatively, the crosslinked organic particles are particles where polymeric compounds are crosslinked with a crosslinking agent, including, for example, crosslinked particles of a polymethoxy silane-based chemical compound, crosslinked particles of a polystyrene-based chemical compound, crosslinked particles of an acryl-based chemical compound, crosslinked particles of a polyurethane-based chemical compound, crosslinked particles of a polyester-based chemical compound, crosslinked particles of a fluorine-based chemical compound and their mixtures, to which the crosslinked organic particles are not limited.

Moreover, it is preferable that the volume average particle diameter of the inorganic particles and crosslinked organic particles is 0.5 μm to 5 μm in the case where they are used only as an anti-blocking agent. If the average particle diameter is below the above-described range, the slip properties of the resultant microporous film may become inferior, and if the average particle diameter exceeds the above-described range, particles may drop off. In addition, in the case where the particles are added for the main purpose of accelerating the pore generation, it is preferable that the average particle diameter is 0.05 μm to 1 μm. If the average particle diameter is below the above-described range, the effects of adding may not be obtained, and if the average particle diameter exceeds the above-described range, particles may drop off leading to the generation of coarse pores.

In the case where the inorganic particles and/or the crosslinked organic particles are used only as an anti-blocking agent, it is preferable that the amount of addition of the inorganic particles and/or the crosslinked organic particles be 0.02 wt % to 0.5 wt %, and more preferably 0.05 wt % to 0.2 wt % from the points of view of preventing blocking and slip properties. In addition, in the case where they are added for the main purpose of accelerating the pore generation, it is preferable that the amount of addition is 1 wt % to 50 wt %, greatly depending on the average particle diameter thereof, and more preferably 5 wt % to 40 wt % from the points of view of the dispersion of the particles and the pore generation. Furthermore, as described above, in the case where the β-crystal content lowers or particles drop off to contaminate the manufacturing process by adding particles, it is preferable not to add a substantial amount, and the amount of addition may be appropriately selected.

The specific gravity of the microporous polypropylene film of the first and third inventions is 0.1 to 0.6. Moreover, the porosity of the microporous polypropylene film of the second invention is 30% to 95%. Here, a low specific gravity corresponds to a high porosity. That is to say, in the case where the film consists only of polypropylene, a type of relation between the specific gravity and the porosity exists as shown in the calculation formula for the porosity, which is described in the following detailed description of the measuring method.

Here, such a significantly low specific gravity or a significantly high porosity corresponds to a large amount of pores generated with high density. As a result, such films can be manufactured that not only the cushioning properties (shock-absorbing properties), the concealing ability and the adiathermancy are excellent, in the case where the film excellent in the permeability is manufactured, the permeability, absorbability and liquid retaining properties are also excellent. Therefore, the film can exhibit the excellent properties in applications such as synthetic paper, receiving sheet for thermal transfer recording, optical elements, building materials, separation membranes (filters), moisture permeable waterproof elements including wound dressing materials and the like, moisture permeable waterproof materials including those for clothing and the like, absorbing articles including those for diapers and sanitary products and the like, separators including those for batteries and electrolytic capacitors and the like, ink receiving sheets, oil or fat absorbing materials, blood sugar test kits, and protein separating membranes, taking advantage of a high productivity.

The specific gravity and the porosity of the microporous polypropylene film can be controlled by the content of β-crystal nucleating agent to be added to the polypropylene of the film, and also in the manufacturing process of the film, by the conditions of crystallization when the melted polymer is solidified at the casting process (the temperature of the metal drum, the rotating speed of the metal drum, the thickness of the obtained unstretched sheet, the contacting time on the metal drum and the like) and the conditions of stretching at the stretching process (the stretching direction (longitudinal or transverse), the stretching manner (longitudinal or transverse uniaxial stretching, longitudinal-transverse or transverse-longitudinal sequential biaxial stretching, simultaneous biaxial stretching, rest retching after biaxial stretching and the like), the stretching ratio, the stretching speed, the stretching temperature and the like). In particular, it is primarily important to use polypropylene as described above, and to form a large amount of uniform β-crystals at the casting process and to set the area ratio, particularly the longitudinal stretching ratio, at the process for stretching high in the manufacturing process of the film in order to control the specific gravity significantly low and the porosity significantly high.

The lower the specific gravities of the microporous polypropylene films of the first and third aspects are, the better the above-described properties tend to be obtained, which is preferable. In addition, in the same manner, the higher the porosity of the microporous polypropylene film of the second aspect is, the better the above-described properties tend to be obtained, which is preferable. However, if the specific gravity is too low or the porosity is too high, the film tends to get elongated, get wrinkled or break during the manufacturing process of the film and during the subsequent converting process (those skilled in the art refer to such a film as being inferior in its processability, converting ability or handling properties in the case where such a phenomenon is observed). Accordingly, it is preferable that the specific gravities of the microporous polypropylene films of the first and third aspects is 0.19 to 0.56, and more preferably 0.2 to 0.4. Moreover, it is preferable that the porosity of the microporous polypropylene film of the second invention is 35% to 90%, more preferably 60% to 85% and most preferably 65% to 85%.

Next, a variety of polyolefin-based resins and other resins may be appropriately laminated on at least one side of the microporous polypropylene films, depending on a variety of purposes such as the suppression of the scattering and the bleeding out of an additive, the easy-adhesion of a coating layer and a vapor deposited layer, providing an printabilities, providing heat sealing abilities, providing print laminating properties, providing a gloss, providing a slip properties, providing a releasing properties, providing an easy-peeling properties, increasing the surface hardness, providing a smoothness, improving the surface roughness, providing a hand-tearing property, increasing the surface open-pore ratio, providing a surface hydrophilicity, controlling the optical properties, providing a thermal resistance to the surface and increasing the concealing properties.

It is preferable that the thickness of the layer at this time be not less than 0.25 µm and is not greater than ½ of the total thickness of the film. If the thickness of the layer is less than 0.25 µm, uniform laminating may become difficult due to the uneven discharging, and if the thickness of the layer exceeds ½ of the total thickness, properties such as high porosity and high permeability of the microporous polypropylene films of the inventions may become inferior.

In addition, it is not necessary that the resin for the skin layer to be laminated at this time be within the range of the first and second inventions, and the laminating method includes co-extrusion, in-line/off-line extrusion laminating, in-line/off-line coating, physical vapor deposition, chemical vapor deposition, sputtering and the like, but these inventions are not limited to any of these, and the best method can be appropriately selected. It is preferable that the laminated film of the third invention be within the range.

In the case where the films are applied to the receiving sheets for thermal transfer recording, it is necessary to increase smoothness of the film surface, provide gloss and improve the appearance of the receiving sheets for thermal transfer recording while maintaining high sensitivity for image transfer due to the excellent adiathermancy and cushioning properties. It may be preferable from the above-described points of view to laminate a variety of resins on at least one side as a skin layer so that a receiving layer for image transfer can be formed on this skin layer, optionally via an adhesive layer.

In the case where the film is applied to a battery separator, it is necessary to provide appropriate slip properties and to improve the handling properties as a separator while maintaining high permeability. It may be preferable from the above-described points of view to laminate a variety of resins comprising a variety of lubricants or particles on at least one side as a skin layer.

It is preferable to adopt a corona discharging treatment on at least one film surface of the microporous polypropylene film, so that the wetting tension of the film surface becomes 35 mN/m and more in order to improve the surface hydrophilicity, the adhesiveness, the anti-static properties and the bleeding out properties of the lubricant. At this time, air, oxygen, nitrogen, carbon dioxide gas or a mixed system of nitrogen/carbon dioxide gas or the like are preferable as the atmospheric gas of the corona discharging treatment, and it is particularly preferable from the economic point of view to carry out the corona discharging treatment in the air. In addition, a flame treatment, a plasma treatment and the like are preferable from the points of view of increasing the surface wetting tension. Though there is no particular upper limit in the wetting tension, excessive treatment on the surface may deteriorate the quality of the surface, and thus, it is preferable that the wetting tension is no greater than 60 mN/m.

It is preferable that the Gurley air permeability of the microporous polypropylene film be 10 seconds/100 ml to 1000 seconds/100 ml in the case where a microporous film with excellent permeability is provided. Here, in the case where only the feature of the film with a low specific gravity (high porosity) is used and the permeability is unnecessary, the Gurley permeability may be impossible to measure, becoming so-called infinite ($\infty$) seconds/100 ml. The Gurley air permeability, which is one of the criteria of permeability of the obtained microporous film, can be controlled by the content of $\beta$-crystal nucleating agent to be added to the polypropylene constituting the film, and also in the manufacturing process of the film, by the conditions of crystallization when the melted polymer is solidified at the casting process (the temperature of the metal drum, the rotating speed of the metal drum, the thickness of the obtained unstretched sheet, the contacting time on the metal drum and the like) and the stretching conditions at the stretching process (the stretching direction (longitudinal or transverse), the stretching manner (longitudinal or transverse uniaxial stretching, longitudinal-transverse or transverse-longitudinal sequential biaxial stretching, simultaneous biaxial stretching, rest retching after biaxial stretching and the like), the stretching ratio, the stretching speed, the stretching temperature and the like). If the case where a microporous film with excellent permeability is provided, if the Gurley air permeability is below the above-described range, the handling properties may become inferior at the manufacturing process of the film or at the subsequent converting process. If the Gurley air permeability exceeds the above-described range, the permeability may become insufficient, and the specific gravity also may increase. It is preferable that the Gurley air permeability is 10 seconds/100 ml to 900 seconds/100 ml, and more preferably 50 seconds/100 ml to 300 seconds/100 ml.

It is preferable that the liquid paraffin permeating time of the microporous polypropylene film is 0.1 seconds/25 µm to 60 seconds/25 µm in the case where a microporous film with excellent permeability is provided. Here, in the case where only the feature of low specific gravity (high porosity) is used and the permeability is unnecessary, the liquid paraffin permeating time may be impossible to measure, becoming so-called infinite ($\infty$) seconds/25 µm. Here, the liquid paraffin permeating time means a value that is obtained in such a manner that, when liquid paraffin is dropped onto the film surface and this permeates in the direction of the thickness so that the pores are filled in with this, making the film transparent, the period of time from the point in time when the liquid paraffin makes contact with the film surface to the point in time when the film becomes completely transparent is measured, and this value is converted through calculation to a value with respect to the thickness of 25 μm using the average film thickness near the portion where the fluid paraffin is dropped. Accordingly, the liquid paraffin permeating time is one of the criteria of permeability of the film, and the shorter the liquid paraffin permeating time is, the more excellent the permeability is, and the longer the time is, the inferior the permeability becomes. The liquid paraffin permeating time of these inventions can be controlled by the content of β-crystal nucleating agent to be added to the polypropylene of the film, and also in the manufacturing process of the film, by the conditions of crystallization when the melted polymer is solidified at the casting process (the temperature of the metal drum, the rotating speed of the metal drum, the thickness of the obtained unstretched sheet, the contacting time on the metal drum and the like) and the stretching conditions at the stretching process (the stretching direction (longitudinal or transverse), the stretching manner (longitudinal or transverse uniaxial stretching, longitudinal-transverse or transverse-longitudinal sequential biaxial stretching, simultaneous biaxial stretching, rest retching after biaxial stretching and the like), the stretching ratio, the stretching speed, the stretching temperature and the like). In the case where a microporous film with high permeability is provided, if the liquid paraffin permeating time of these inventions is below the above-described range, the handling properties may become inferior at the manufacturing process of the film or at the subsequent converting process, whereas, if the time exceeds the above-described range, the permeability may become insufficient and the specific gravity may become high. It is preferable that the liquid paraffin permeating time be 1 second/25 μm to 30 seconds/25 μm, and more preferably 1.5 seconds/25 μm to 9 seconds/25 μm.

It is preferable that the Young's modulus in the longitudinal direction of the microporous polypropylene film is 0.1 GPa or more. If the Young's modulus in the longitudinal direction is below the above-described range, the handling properties may become inferior at the manufacturing process of the film and at the subsequent converting process. The Young's modulus in the longitudinal direction can be controlled by the crystallinity of the polypropylene of the film (corresponding to II or the like), the specific weight of the obtained microporous film (porosity), the I(MD)/I(TD) and the like. It is preferable that the Young's modulus in the longitudinal direction is not less than 0.3 GPa, and more preferably not less than 0.39 GPa. In addition, the higher the Young's modulus in the longitudinal direction of the microporous polypropylene film is, the more the above-described handling properties tends to be improved, and though there is no upper limit provided, it is preferable that the Young's modulus be no greater than, for example, 1.2 GPa, because the porosity may become low and the permeability also may deteriorate if the Young's modulus is too high.

It is preferable that the stress at break in the longitudinal direction of the microporous polypropylene film be not less than 40 MPa. If the stress at break in the longitudinal direction at 25° C. is below the above-described range, the handling properties may become inferior at the manufacturing process of the film and at the subsequent converting process. The stress at break can be controlled by the crystallinity of the polypropylene of the film (corresponding to II or the like), the specific weight of the obtained microporous film (porosity), the I(MD)/I(TD) and the like. It is preferable that the stress at break is not less than 50 MPa, and more preferably not less than 55 MPa. In addition, the higher the stress at break in the longitudinal direction of the microporous polypropylene film is, the more superior the above-described handling properties tends to become, and though there is no upper limit provided, it is preferable that the stress at break is no greater than, for example, 150 MPa, because the porosity may becomes low and the permeability also may deteriorate if the stress at break is too high.

It is preferable that the thermal dimensional stability of the microporous polypropylene film be low, even when the temperature is relatively low for the stretching conditions. Substantially, it is preferable that the heat shrinkage ratio at 105° C. in the longitudinal direction of the microporous polypropylene film of these inventions be no greater than 5%. If the heat shrinkage ratio in the longitudinal direction at 105° C. exceeds the above-described range, the shrinkage of the film may become great at the converting process, and defects such as wrinkling and curling may be formed during the process. The heat shrinkage ratio in the longitudinal direction at 105° C. can be controlled by the crystallinity (corresponding to II or the like) of the polypropylene of the film, the stretching conditions (the stretching ratio, the stretching temperature and the like), the conditions of heat set after stretching (the relaxation ratio, the temperature and the like at the process of heat set) and the like. It is preferable that the heat shrinkage ratio in the longitudinal direction at 105° C. is not greater than 4.5%. In addition, the lower the heat shrinkage ratio at 105° C. in the longitudinal direction of the microporous polypropylene film of these inventions is, the more the above-described troubles at the process tend to be suppressed, and though there is no lower limit provided, it is necessary to raise the temperature of heat set after stretching to a temperature that is directly beneath the melting point of the polypropylene of the film in order to keep the ratio low, and it is preferable that the heat shrinkage ratio is not less than, for example, 0%, because there are some cases where the specific gravity may become high due to closing of the pores and the permeability may deteriorate.

It is preferable that the coefficient of static friction ($\mu s$) of the microporous polypropylene film is in a range from 0.2 to 2. Here, the coefficient of static friction of a film is measured in accordance with a technique shown in the below-described detailed description of the measuring method after the two surfaces of a film are overlapped. If the $\mu s$ is below the above-described range, the film may become too slippery, causing slippage in the roll when the film is winded up, and a long film may fail to be rolled up. If the $\mu s$ exceeds the above-described range, the smoothness may be poor at the winding process of the film, and the film after rolled up may be wrinkled. It is preferable that the $\mu s$ be 0.3 to 1.5.

It is preferable that the microporous polypropylene film be oriented biaxially. When the film is oriented biaxially, the pore generation can be accelerated in accordance with a β-crystal technique. Furthermore, when the film is oriented biaxially, the film can exhibit permeability, and in the particular case where the film is stretched sequentially and biaxially, longitudinally and transversely, the microporous film with excellent permeability could be obtained through stretching in the longitudinal direction at a low temperature and to a high ratio.

Though a variety of manufacturing methods are used for the manufacture of the microporous polypropylene film, it is important to use a longitudinal-transverse sequential biaxial stretching method in order to highly achieve the objective of these inventions of manufacturing a microporous film with a low specific gravity (high porosity) and excellent permeability at a high productivity. In addition, the longitudinal-transverse sequential biaxial stretching method is appropriate from the points of view of the expandability of the apparatus in comparison with other manufacturing methods. An example of a method for manufacturing a microporous polypropylene film according to any of these inventions using a longitudinal-transverse sequential biaxial stretching method is shown in the following.

In the manufacturing method for a microporous polypropylene film of the first invention, a polypropylene comprising a polypropylene with the Trouton ratio of not less than 30 and has a β-crystal activity, a polypropylene of which the Trouton ratio of the polypropylene of an unstretched sheet is not less than 6 and can be in the mode having a β-crystal activity or a polypropylene comprising a polypropylene having a long chain branch and has a β-crystal activity, is prepared.

In the manufacturing method of a microporous polypropylene film, a polypropylene comprising a polypropylene that satisfies, for example, the following formula (1), and has a β-crystal activity or a polypropylene which satisfies the following formula (2) and has a β-crystal activity, is prepared:

$$\log (MS) > -0.61 \log (MFR) + 0.82 \quad (1)$$

$$\log (MS) > -0.9 \log (MFR) + 0.6 \quad (2).$$

In the manufacturing method of one of the microporous polypropylene films, a polypropylene comprising a polypropylene with the Trouton ratio of not less than 30 and has a β-crystal activity, a polypropylene of which the Trouton ratio of the polypropylene of an unstretched sheet is not less than 6 and can be in the mode having a β-crystal activity, a polypropylene comprising a polypropylene having a long chain branch and has a β-crystal activity, a polypropylene comprising a polypropylene that satisfies, for example, the following formula (1), and has a β-crystal activity or a polypropylene which satisfies the following formula (2) and has a β-crystal activity, is prepared:

$$\log (MS) > -0.61 \log (MFR) + 0.82 \quad (1)$$

$$\log (MS) > -0.9 \log (MFR) + 0.6 \quad (2).$$

Thus, a mode of the manufacturing method is described below.

The prepared polypropylene is supplied to an extruder so as to be melted at a temperature from 200° C. to 320° C., and is passed through a filtration filter, and after that, is extruded from a slit-die so as to be cast onto a metal drum for cooling, and cooled and solidified into a sheet, and then an unstretched sheet is obtained. At this time, a polymer other than polypropylene can be appropriately added to the prepared polypropylene.

Here, it is preferable that the melt-extruding temperature be low in order to form a large amount of β-crystal in the unstretched sheet, and if the temperature is below the above-described range, a unmelted material may be generated in the melted polymer discharged from the slit-die and may become a cause which induces troubles such as film breakage during the subsequent stretching process, whereas, if the temperature exceeds the above-described range, thermal decomposition of the polypropylene may become severe, and the film properties of the resultant microporous film such as, for example, the Young's modulus and the stress at break, may become inferior.

In addition, it is preferable that the temperature of the metal drum (cast drum) for cooling be 60° C. to 130° C. in order to crystallize a polypropylene under the condition where the film is appropriately and gradually cooled so as to form a large amount of uniform β-crystal so that a microporous film with a low specific gravity and excellent permeability is obtained after stretching. If the temperature of the drum for cooling is below the above-described range, the β-crystal content of the obtained unstretched sheet may become low, whereas, if the temperature exceeds the above-described range, solidification of the sheet on the drum may become insufficient, and it may become difficult to taking off the sheet uniformly from the drum. In addition, the closer to the upper limit of the above-described temperature range the temperature is, the more excellent the permeability of the resultant microporous polypropylene film become, whereas, the closer to the lower limit the temperature is, the inferior the permeability tends to become, and it is assumed that the permeability depends on the amount of β-crystal in the unstretched sheet. Here, the amount of β-crystal in the unstretched sheet corresponds to the β-content calculated from the thermal curve of the first run obtained using a DSC with a sample of an unstretched sheet. If a microporous film with an excellent permeability is provided, it is preferable that the temperature of the cast drum be 100° C. to 125° C.

At this time, it is preferable that the time during which the unstretched sheet makes contact with the drum (hereinafter, sometimes simply referred to as "the contacting time" on to the dram) is 6 seconds to 60 seconds. Here, the contacting time on the drum means a required period of time between the starting time (0 seconds), which is the point in time when the melted polymer first makes contact with the drum and the point in time when the unstretched sheet is taken off from the drum in the above-described casting process. Here, in the case where the casting process comprises a number of drums, the total period of time during which the unstretched sheet makes contact with these drums becomes the contacting time on the metal drums. If the contacting time on the metal drums is below the above-described range, the unstretched sheet adheres to the metal drum and the amount of β-crystal generated in the unstretched sheet is small (the β-crystal content of the unstretched sheet is low) at the above-described point in time of the taking off, and therefore, the specific gravity of the film after the biaxial stretching may become high more than necessary (the porosity may become low more than necessary). If the contacting time on the metal drum exceeds the above-described range, the rotating speed of the metal drum may become low more than necessary depending on the size of the metal drum, which may significantly deteriorate the productivity. It is preferable that the contacting time on the metal drum be 7 seconds to 45 seconds, and more preferably 8 seconds to 40 seconds.

In addition, any technique from among an electro-pinning technique, a close-contact method using the surface tension of water, an air-knife method, a press-rolling method and a method of casting in water may be used as a method of making close contact with a cooling drum, and it is preferable to use an air-knife method, where the controllability of the thickness is excellent and the cooling rate can be controlled by the temperature of the blowing air, or an electro-pinning technique. Here, it is preferable that the air be blown from a non-drum surface and that the temperature of the air be 10° C. to 200° C. in the air-knife method, and the amount of the β-crystal of the surface could be controlled by controlling the cooling rate of the surface, and as a result, the open-pore ratio on the surface sometimes can be controlled, that is to say, the permeability of the resultant microporous film sometimes can be controlled.

In addition, in the case where a laminated film, in which the second and third layers are laminated on at least one side of such a microporous polypropylene film through co-extrusion, is provided, desired resins in addition to the above-described polypropylene are prepared, if necessary, and these resins are supplied to discrete extruders so as to be melted at a desired temperature, and are passed through a filtration filter, and after that, the melted flows are converged within a connecting pipe or a slit-die so as to be extruded from a slit-die so that the respective melted flows form a target layer thickness, and then the resins are cast onto a drum for cooling so as to be cooled and solidified into a sheet, and thus, an unstretched laminated sheet can be obtained.

Next, the obtained unstretched (laminated) sheet is biaxially stretched using a heretofore known and general-purpose longitudinal-transverse sequential biaxial stretching method. First, an unstretched film is passed through rolls maintained at a predetermined temperature so as to be preheated, and subsequently, this sheet is passed between rolls which are maintained at a predetermined temperature and have a different rotating speed so as to be stretched in the longitudinal direction, and cooled immediately.

Here, the longitudinal stretching ratio (direction of the length) is important in order to manufacture a microporous polypropylene film having properties such as a low specific gravity or excellent permeability according to any of these inventions. The effective longitudinal stretching ratio when a conventional microporous polypropylene film is manufactured in accordance with a longitudinal-transverse sequential biaxial stretching method is in a range from 3 to 4.5, and if the ratio exceeds 5, it may becomes difficult to stably manufacture a film and the film break at the transverse stretching process, whereas, it is preferable that the effective longitudinal stretching ratio for the microporous polypropylene film of these inventions is 5 to 10 in the case where a microporous film with a low specific gravity and excellent permeability is provided. If the effective longitudinal stretching ratio is less than the above-described range, the specific gravity of the resultant microporous film may become high and the permeability may become inferior, and thus, the film formation speed (line speed) may become slow due to a low stretching ratio for the same casting speed, which may lead to the inferior productivity. If the effective longitudinal stretching ratio exceeds the above-described range, the film may break sporadically at the longitudinal stretching process or at the transverse stretching process, and thus, film formability may deteriorate. It is preferable that the effective longitudinal stretching ratio be 5 to 9, and more preferably 5 to 8. At this time, it can be preferable to carry out the longitudinal stretching at, at least, two or more different stages from the points of view of obtaining low specific gravity, improving permeability and suppressing surface defects. The condition of longitudinal stretching temperature may be appropriately selected from the points of view of stable film formation, uniform thickness and target specific gravity or permeability, and it is preferable that the longitudinal stretching temperature be 80° C. to 140° C. In addition, it is preferable from the points of view of longitudinal dimensional stability to provide a relaxation in the longitudinal direction during the cooling process after the longitudinal stretching to such an extent that the uniformity in the thickness of the film or the permeability does not deteriorate. Furthermore, a desired resin layer may be appropriately provided onto the film after the longitudinal stretching through extrusion lamination or coating.

Subsequently, this longitudinally stretched film is led to a tenter-type stretching machine and is preheated to a predetermined temperature, and then is stretched in the transverse direction. Here, it is preferable that the effective transverse stretching ratio be no greater than 12. If the effective transverse stretching ratio exceeds 12, film formability may deteriorate. The conditions of the transverse stretching temperature may be appropriately selected from the points of view of stable film formation, uniform thickness and target specific gravity or permeability, and it is preferable that the transverse stretching temperature be 100° C. to 150° C.

After the transverse stretching, the obtained microporous film is heat set at 100° C. to 180° C. while providing a relaxation of not less than 1% in the transverse direction from the points of view of improving the dimensional stability of the microporous film, which is then cooled. Furthermore, a corona discharging treatment is carried out, if necessary, on at least one side of the film in the air, in nitrogen or in a mixed atmosphere of a carbon dioxide gas and nitrogen. Next, this film is winded up, and thus, a microporous polypropylene film according to any of these inventions can be obtained.

The microporous polypropylene films has less film breakage at the stretching process and excellent in film formability in comparison with those obtained by a conventional β-crystal technique. Furthermore, a film can be formed without breakage during the transverse stretching process when stretched at a low temperature and to a high ratio in the longitudinal direction, and the line speed can be increased in comparison with a conventional β-crystal technique, providing excellent productivity. In addition, the film can be produced by stretching to a high ratio in the longitudinal direction, and thereby, the specific gravity can be lowered and the permeability can be significantly improved in comparison with the conventional β-crystal technique.

Next, examples of applications of the microporous polypropylene films, where the above-described characteristics are appropriately used, are illustrated in the following, to which these examples are not limited.

(1) Film for Receiving Sheet for Thermal Transfer Recording

The specific gravity can be controlled so as to be extremely low due to the uniform formation of the micropores with high density in the microporous polypropylene films of the first, second and third inventions, and thereby, when used as an element of receiving sheet for thermal transfer recording, excellent concealing properties can be provided, and the appearance becomes excellent as receiving sheet for thermal transfer recording as compared to conventional cavitated films or microporous films including films with isolated voids. In addition, shock-absorbing properties (also referred to as cushioning properties) and adiathermancy become excellent due to this porous structure, and therefore, in the case of processed into receiving sheet for thermal transfer recording, sensitivity is high, images are photographic-printed vividly, and in particular, natural colors such as skin colors can be vividly expressed. A skin layer with pores can be laminated onto the film surface, and thereby, the sensitivity can further be enhanced. In addition, the thermal resistance of the surface layer can further be enhanced by increasing the crystallinity of this skin layer. Furthermore, the resin composition and the state of the surface (surface roughness, chemical compatibility) of the skin layer can be controlled, and thereby, adhesiveness to the layer for adhesion such as the receiving layer and the anchor coat layer can be improved. As stated above, it is possible to improve the performance and functions by controlling the layer construction.

Therefore, the microporous polypropylene films can be preferably used as a film for receiving sheet for thermal transfer recording, which is appropriate as a dye-sublimation type receiving sheet for thermal transfer recording, by coating a receiving layer onto the surface layer and by appropriately laminating with a substrate such as paper or the like.

(2) Film for Moisture Permeable Waterproof Element

The permeating performance is significantly improved, and thereby, moisture permeability is excellent, and the pore diameter is small and its distribution is sharp, and thereby, waterproof is excellent, and therefore, moisture permeating waterproof property is significantly excellent in the microporous polypropylene films of the first, second and third inventions in comparison with the conventional β-crystal technique. In addition, the strength and the water resistant pressure are also high, and thus, the reliability is excellent and the dimensional stability is excellent, and thus, the handling properties at the converting process, such as sewing and laminating, is excellent. Furthermore, such an excellent moisture permeable waterproof film can be manufactured at a low cost.

Therefore, the microporous polypropylene films are preferably used as a film for a moisture permeable waterproof element such as a moisture permeable waterproof elements for medicinal purposes including a wound dressing materials, a waterproof moisture permeable clothing including that for clothing, and absorbing articles including those for diapers or sanitary products and the like.

(3) Separators for Batteries and Electrolytic Capacitors

The microporous polypropylene films consist primarily of propylene, and therefore, have excellent electrically insulating properties and resistance to electrolyte when used as a separator for a battery or an electrolytic capacitor. In addition, the microporous polypropylene films can be biaxially oriented, and therefore, can be provided with excellent tensile strength and puncture strength, in comparison with uniaxially oriented or non-oriented microporous films obtained by, for example, an extraction technique, a lamella stretching technique, a conventional β-crystal technique or an inorganic particle technique. Furthermore, the permeability can be significantly improved while maintaining the fine pore diameter and its sharp distribution in comparison with a conventional β-crystal technique, and the permeating performance is equal to or higher than that of microporous films obtained by the above-described extraction technique and lamella stretching technique, and therefore, the electrical resistance (ER) can be lowered in comparison with conventional microporous films for the same thickness when used, for example, as a separator for a battery. In addition, the separator can be made thin while maintaining the ER because it has excellent tensile strength and puncture strength. Furthermore, the microporous polypropylene films have an extremely low specific gravity (high porosity), and thus, electrolyte holding properties can be improved and the battery capacity can be increased. In addition, the time required for the permeation of electrolyte can be shortened at the process of assembling a battery in comparison with a conventional microporous film, because of their excellent permeating performance, which have excellent tensile strength and puncture strength, do not elongate, wrinkle or break, and are excellent in handling properties, and therefore, are excellent in battery assembling properties. In addition, the permeability of this electrolyte can further be improved by carrying out a variety of treatments for providing hydrophilicity, for example making a variety of surfactants permeate into the separators, and thus battery assembling properties can further be improved.

Therefore, the microporous polypropylene films are preferably used as a separator.

(4) Separation Membrane (Filter)

The microporous polypropylene films have fine pore diameters and their sharp distribution, and are excellent in the permeating performance as described above, and therefore, pressure loss can be kept low when used as a separation membranes (filters), and thus, the films can be expanded to the application of separation membranes (filters) where it is difficult to expand films obtained by a conventional β-crystal technique due to its high pressure loss. In addition, the microporous polypropylene films can be biaxially oriented, and therefore, the tensile strength and the puncture strength can be increased for the same specific gravity in comparison with uniaxially oriented or non-oriented microporous films obtained by, for example, an extraction technique, a lamella stretching technique, a conventional β-crystal technique or an inorganic particle technique, and thus, long-term reliability (durability over a long period of time). Furthermore, for example, a variety of surfactants are added, and thereby, the hydrophilicity of the obtained microporous film can be controlled depending on the nature of the substances to be separated, and the osmosis and permeability of the substance to be separated can be improved when used as a separation membrane (filter).

Therefore, the microporous polypropylene films are preferably used as a variety of separation membranes (filters).

(5) Light Reflectors

Micropores are uniformly formed with high density in the microporous polypropylene films, which thus are excellent in concealing properties and optical reflection properties. In addition, the reflection properties can further be improved through the converting process described below. Furthermore, a variety of light stabilizers, weatherproofers and the like are added or coated, and thereby, long-term reliability (durability over a long period of time) can be provided.

Therefore, the microporous polypropylene films are preferably used as a light reflector.

In addition, novel functions can be provided to the microporous polypropylene films by making the pores carry a variety of functional substances through a converting process, such as coating and the like. Examples for the above-described films include, light reflectors with further improved optical reflection properties, where the inner walls of the pores may be coated with a substance with high reflective index aromatic substance films, where a aromatic substance is carried, anisotropically electrically conductive films, where the inner walls of the pores are coated with a conductive substance, in such a manner that these continue in the direction of the thickness, which exhibit conductivity in the direction of the thickness but no conductivity in the direction within the film surface, sustained release films, where the chemical is carried within pores, and the like, in addition to which a variety of applications can be applied.

Moreover, the microporous polypropylene films can be continuously manufactured using a conventional melt-film-formation method, and the productivity can be improved in comparison with a conventional β-crystal technique, and therefore, a highly functional microporous film having properties (specific gravity, permeability and the like) which are equal to or better than those of the films obtained by an extracting technique or a lamellar stretching technique as described above can be manufactured at much lower cost than when an extraction technique or lamellar stretching technique are used.

Therefore, the microporous polypropylene film is preferably used for applications of packaging and industry and the like.

[Method for Measuring Property Values]

The terms and measuring methods used are described together in the following.

(1) Trouton Ratio

Measurement was carried out under the following conditions, on the basis of the theory by Cogswell ["Polymer Engineering Science" 12, pp. 64-73 (1972)], using a converging flow method. Here, measurement was carried out at Toray Research Center Inc.

Apparatus: type RH-2200 twin-capillary rheometer (manufactured by Rosand)
Temperature: 230° C.
Capillary size: die/diameter of 1.0 mm×16 mm orifice/diameter of 1.0 mm×0.25 mm
shear rate: approximately $10 \text{ s}^{-1}$ to approximately $1800 \text{ s}^{-1}$
elongational strain rate: $2 \text{ s}^{-1}$ to approximately $180 \text{ s}^{-1}$ Each sample (a chip-shaped raw material was used as it is and a film-shaped sample was cut into a required size of no greater than a square of 5 mm for use, if necessary, after an extraction process was carried out) was set and the apparatus was filled with this at 230° C., which was kept at this temperature for three minutes. Furthermore, the apparatus was filled with another sample and, after kept at the temperature for three minutes, measurement was started.

According to the theory by Cogswell, the pressure loss ($\Delta P_{ent}$) caused at an inlet of the capillary when the sample flows into it can be represented by the following formula using the shear viscosity and the elongataional viscosity.

$$\Delta P_{ent} = \frac{4\sqrt{2}}{3(n+1)} \gamma_a (\eta_s \ \eta_E)^{1/2} \quad \text{[Formula A]}$$

Here, $\eta_E$ is the elongational viscosity, $\eta_s$ is the shear viscosity, and $\gamma_a$ is the shear rate.

In addition, n is the flow index in the power rule ($\sigma_s = k\gamma_a^n$; $\sigma_s$ is the shear stress).

In the twin-capillary rheometer, measurement is carried out using two capillaries having different lengths at the same time, and thereby, the pressure loss ($\Delta P_{ent}$) caused at an inlet of the capillary can be calculated from the pressure loss at each capillary using a Bagley plot. That is to say, the shear viscosity and $\Delta P_{ent}$ at a certain shearing rate can be calculated simultaneously, and therefore, the elongational viscosity $\eta_E$ can be calculated using the following formula.

$$\eta_E = \frac{9(n+1)^2}{32\eta_s} \left(\frac{\Delta P_{ent}}{\gamma_a}\right)^2 \quad \text{[Formula B]}$$

$$\varepsilon = \frac{4\eta_s \gamma_a^2}{3(n+1)\Delta P_{ent}} \quad \text{[Formula C]}$$

Here, $\varepsilon$ is the elongational stress.

In addition, the shear rate was converted through calculation to the true value of the wall surface of the capillary using a computer attached to the apparatus through Rabinovitsch correction. Here, JIS K 7199 (1991), 8.2; edited by Japan Rheology Society, "KOZA-Rheology" by The Society of Rheology, Japan (1993), p. 68 and the like, for example, may be referred to for the details of the Bagley plot and the Rabinovitsch correction.

The obtained curve for the elongational viscosity-elongational strain rate and the curve for the shear viscosity-shear rate were respectively approximated as an exponential function, and $\eta_{E(60)}$ and $\eta_{S(60)}$ were calculated at a strain rate of 60 $\text{s}^{-1}$. As a result, the Trouton ratio (the ratio of $\eta_{E(60)}$ to $\eta_{S(60)}$ for the same strain rate) at a strain rate of 60 $\text{s}^{-1}$ was calculated using the following formula.

$$\text{Trouton Ratio} = \frac{\eta_{E(60)}}{\eta_{B(60)}} \quad \text{[Formula D]}$$

The same measurement was carried out five times for the same sample, and the average value of the obtained Trouton ratios was assumed to be the Trouton ratio of this sample.

(2) Recognition of a β-Crystal Activity

Measurement was carried out following JIS K 7122 (1987) using a type RDC 220 thermal analyzer, manufactured by Seiko Instruments Inc. A film with the weight of 4.5 mg to 5.5 mg was mounted into an aluminum pan and sealed and set into the apparatus, and heated from 30° C. to 280° C. at a rate of 10° C./min in a nitrogen atmosphere, and after the temperature was raised, the film was kept at 280° C. for five minutes° C., and subsequently, cooled to 30° C. at a rate of 10° C./min, and then after the temperature was lowered, the film was kept at 30° C. for five minutes° C., and again the temperature was raised to 280° C. at a rate of 10° C./min. When a endothermic peak (symbol 2 in FIG. 2) accompanying the fusion of a β-crystal having a peaktop at a temperature of no lower than 140° C. and lower than 160° C. was observed in the thermal curve (symbol 1 in FIG. 1) obtained in the above, this film was determined to have a β-crystal activity. The term "endothermic peak" here refers to the peak where the heat of fusion is not lower than 10 mJ/mg. The thermal curve obtained at the initial heating may be referred to as "the thermal curve of the first run", and the thermal curve obtained when the temperature is raised for the second time may be referred to as "the thermal curve of the second run." The heat of fusion is the area surrounded by the base line and the thermal curve after the thermal curve shifts from the base line to the endothermic side accompanying the raise in temperature and then returns to the location of the base line. This area was calculated through computer processing, by extending the base line from the location of the temperature where fusion starts to the intersection point with the thermal curve on the high temperature side, and by calculating the area. In FIG. 2, the heat of fusion for the endothermic peak accompanying the fusion of a β crystal is indicated by symbol 2, and the heat of fusion for the endothermic peak accompanying the fusion of crystals other than β-crystal is indicated by symbol 3. When the β crystal activity of the polypropylene chip of the raw material is confirmed, the same procedure as in the above may be carried out. In the table, the film having a β-crystal activity is shown as Yes, and the film having no β-crystal activity is shown as No.

(3) Specific Gravity and Porosity

The specific gravity of a film was measured at 23° C. and 65% RH with the sample which was cut into a size of 30 mm×40 mm following the method A (pycnometer and hydrostatic method of JIS K 7112 (1999), using a high-accuracy electronic densmeter (SD-120L) manufactured by Mirage Trading Co., Ltd. The same measurement was carried out five times for the same sample, and the average value of the obtained specific gravities was assumed to be the specific gravity (d1) of this sample.

This sample was sandwiched between aluminum plates with a thickness of 0.5 mm and melted and compressed through hot-pressing at 280° C., and after that, the obtained sheet was quenched through immersion into water at 30° C. together with the aluminum plates. The same measurement was carried out five times for the same sample of the thus obtained sheet in accordance with the method described above, and the average value for the obtained specific gravities was assumed to be the specific gravity (d0) after the sample preparation. The porosity of the film was calculated from the obtained d1 and d0 using the following formula (unit: %).

$$porosity(\%)=\{1-d1/d0\}\times 100$$

(4) Melt Strength (MS)

Measurement was carried out under the following conditions, using an apparatus in compliance with JIS K 7199 (1999). Here, measurement was carried out in TOSOH Analysis and Research Center Co.

Apparatus: capirograph with melt tension tester IBPMD-i (manufactured by Toyo Seiki Seisaku-sho, Ltd.)
Temperature: 230° C. (using thermal insulation chamber)
Dice: L=8 (mm), D=2.095 (mm)
Extrusion rate: 20 mm/min
Taking-up rate: 15.7 m/min
Sample weight: 15 g to 20 g Each sample (a chip-shaped raw material was used as it is and a film-shaped sample was cut into a required size of no greater than a square of 5 mm for use, if necessary, after an extraction process was carried out) was set and the apparatus was filled with this at 230° C., and after that, the sample was preliminarily pushed in up to a certain position (position 25 cm along the scale on the capirograph) at 50 mm/min and preheated in this position. 6 Minutes after filling with the sample, extrusion of the polymer and taking-up of the strand were started under the above-described conditions. The tension at the time of taking up can be measured using a stress gauge, via pulleys on the way. Sampling of data was started 10 minutes after the filling with the sample, and the average value of the tensions measured 12 minutes to 16 minutes after the filling was sampled (unit: cN). Here, the obtained data was analyzed using attached software (system program for capirograph). The same measurement was carried out five times for the same sample, and the average value for the obtained MS's was assumed to be the MS of this sample.

(5) Melt Flow Rate (MFR)

Measurement was carried out under condition of M (230° C., 2.16 kgf (21.18 N)), following JIS K 7210 (1999) (unit: g/10 min). The same measurement was carried out five times for the same sample, and the average value for the obtained MFR's was assumed to be the MFR of this sample.

(6) Evaluation of I (MD)/I (TD) and Confirmation of a β-Crystal Activity in Accordance with Wide Angle X-Ray Diffraction Method

[Evaluation of I (MD)/I (TD)]

The intensity distribution in the direction of the circumference (azimuthal direction (β)) of the diffraction peak for (−113) plane observed at the vicinity of 2θ=43° was measured under the below described measurement conditions, in accordance with wide angle X-ray diffraction method.

Figure 3:
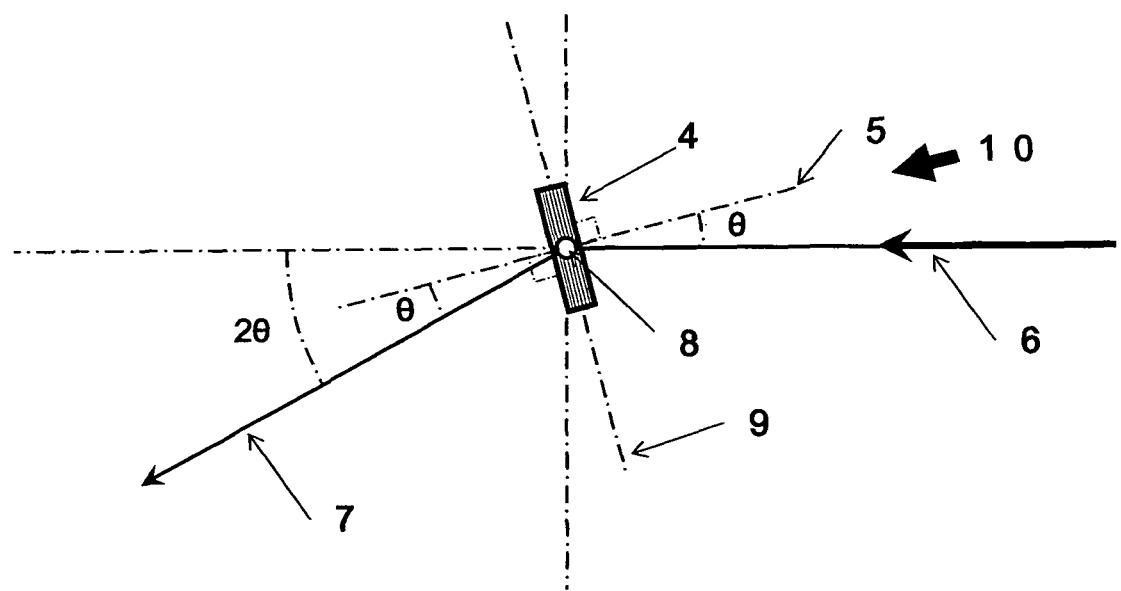
FIG. 3 is a diagram schematically showing the arrangement of a sample and an apparatus when a 2θ/θ scan X-ray diffraction profile is measured in accordance with the measuring method (6) shown below using wide angle X-ray diffraction method.
Figure 4:
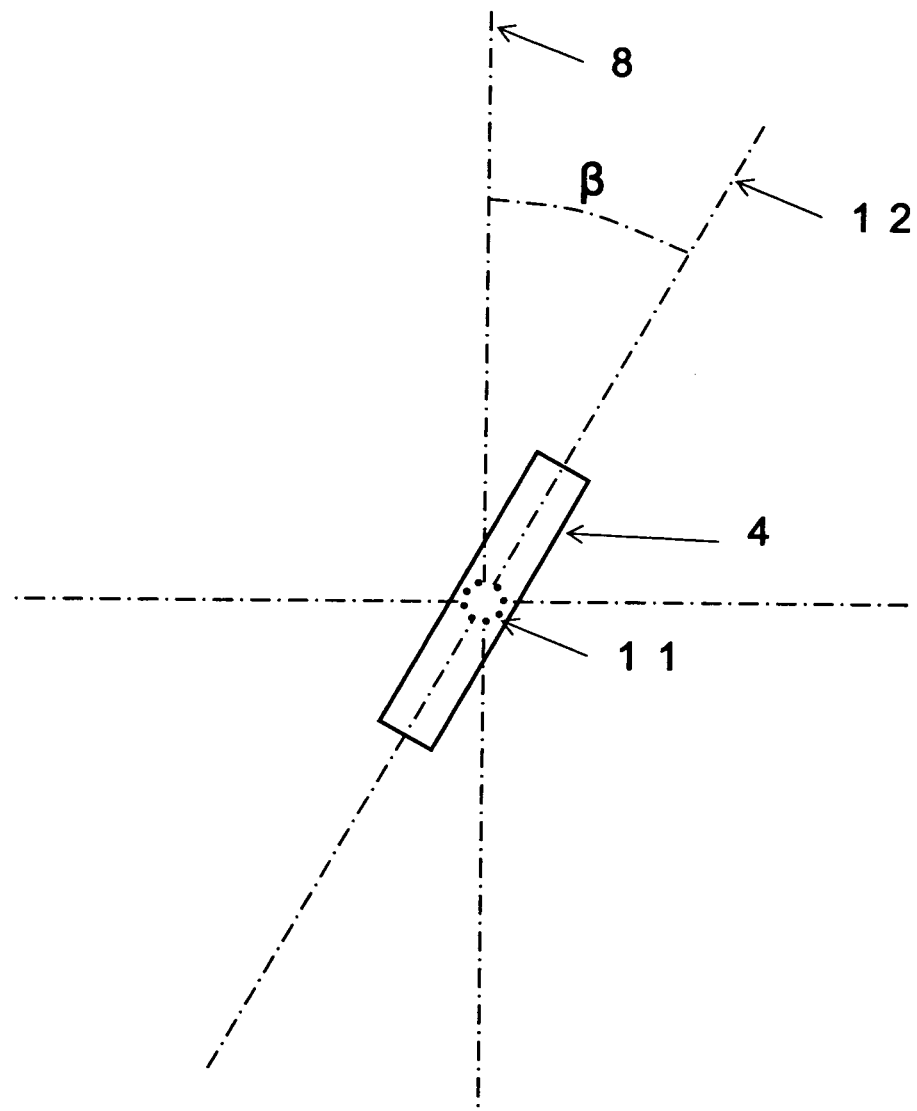
FIG. 4 is a diagram schematically showing the arrangement of a sample when an intensity distribution profile is measured in the direction of an azimuthal angle (β) in accordance with the measuring method (6) shown below using wide angle X-ray diffraction method.

Sample: a film was cut in such a manner that the direction was directed the same way and overlaps so that the thickness of the stack becomes approximately 1 mm, which is then measured
X-ray generator: 4036A2 (bulb type), manufactured by Rigaku Corporation
X-ray source: CuKα ray (using Ni filter)
Output: 40 kV, 20 mA
Optical system: pinhole optical system (diameter of 2 mm) made by Rigaku Corporation
Goniometer: manufactured by Rigaku Corporation
Slit system: diameter of 2 mm (as described above) −1°−1°
Detector: scintillation counter
Count recorder: type RAD-C, manufactured by Rigaku Corporation
Measuring method: transmission method 2θ/θ scanning: step scanning, range of 2θ: 10° to 55°, 0.05° steps, integrating time: 2 seconds
Azimuthal (β) scanning: 2θ≈43° (fixed), step scanning, measurement range of β: 0° to 360, 0.5° steps, integrating time: 2 seconds FIGS. 3 and 4 respectively show simple illustrations of the apparatus for 2θ/θ scanning and azimuthal (β) scanning, as well as geometrical arrangement of the sample. FIG. 3 is a diagram schematically showing the arrangement of the sample and the apparatus when 2θ/θ scanning X-ray diffraction profiles are measured. The normal line 5 to the film surface of Sample 4, is inclined by θ (°) with respect to the incident X-ray 6, and a slit (not shown) is placed at the head of diffracted X-ray 7, and furthermore, there is a scintillation counter (not shown) for counting X-ray, and the scintillation counter is placed so as to be inclined by 2θ (°). Though not shown, incident X-ray 6 can be obtained from the X-ray source after passing through the Ni filter, the pinhole collimator and the slit. There is a goniometer axis 8, which is a rotatable axis for adjusting the angle between the scintillation counter and the sample. In the β scanning, the sample rotates within in the rotation plane 9, which is parallel to the film surface, that is to say, perpendicular to the normal line 5. FIG. 4 schematically shows the geometrical arrangement of the sample when the sample of FIG. 3 is observed from the observation point (symbol 10 in FIG. 3) in the direction of the line normal to the film surface (symbol 5 in FIG. 3). β is an angle between the goniometer axis 8 and the longitudinal direction of the sample 12. Here, though in these diagrams, the sample is drawn long in the longitudinal direction for the purpose of convenience, the dimensions of the sample in the longitudinal and transverse direction do not matter, as long as the fundamental direction is clear and the portion irradiated with X-ray 11 during measurement is constant, as shown in the following. In addition, the sample is set so that the film surface becomes parallel to the rotation plane 9 in the β direction and the goniometer axis 8 in order to evaluate the in-plane orientation distribution of the crystalline molecular chains.

Here, the diffraction peak for (−113) plane at the vicinity of 2θ=43° comprises the component in the direction of the axis of the molecular chains. Accordingly, the peaks of the X-ray intensity at β=0° and 180° correspond to the components oriented in the transverse direction from among in-plane crystalline chains of the film, and the peaks of the X-ray intensity at β=90° and 270° correspond to the components of in-plane crystalline chains oriented in the longitudinal direction. That is to say, the case where the integral intensity of the peaks at β=0° and 180° is sufficiently high relative to the integral intensity of the peaks at β=90° and 270°, corresponds to a situation such that the crystalline molecular chains are primarily transversely oriented.

Figure 5:
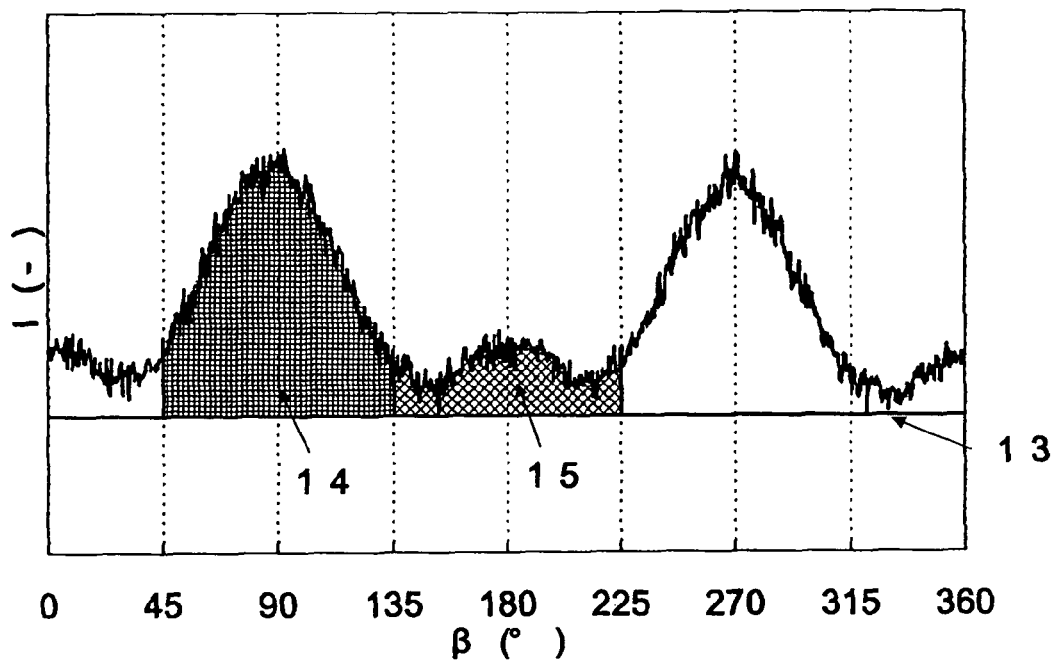
FIG. 5 is a diagram showing the intensity distribution profile in the β-direction of Example 303.
Figure 6:
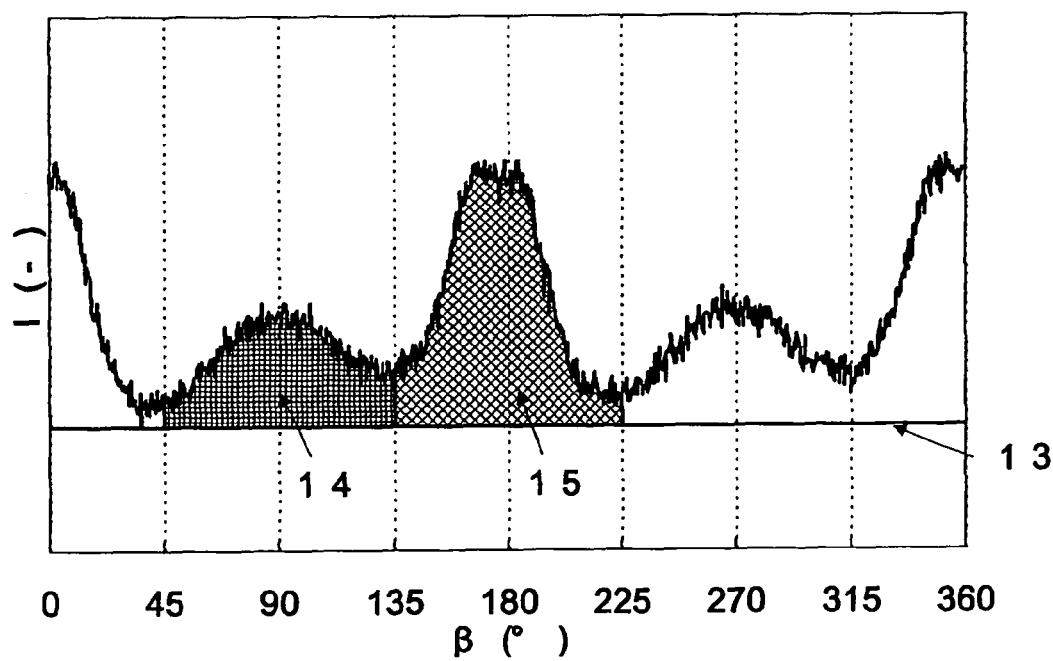
FIG. 6 is a diagram showing the intensity distribution profile in the β-direction of Comparative Example 301.

First, β is fixed at 0° or 90°, and 2θ/θ scanning is carried out under the above-described conditions. Next, the position of the sample and the counter is fixed at θ and 2θ, provide the peaktop at the vicinity of 2θ=43°. Subsequently, the sample is scanned in the direction of β under the above-described conditions, so that the targeted X-ray intensity distribution can be obtained. At this time, it is necessary that the portion irradiated with X-ray be constant for any β, so that the apparent intensity does not change with X-ray shifting off of the sample depending on β. FIG. 5 shows an example of the intensity distribution in the direction of β obtained in the below-described example. In addition, FIG. 6 shows an example obtained in the below-described comparative example.

The obtained profile in the direction of β is used to calculate the integral intensity (I (MD)) in the longitudinal direction and the integral intensity (I (TD)) in the transverse direction using the below-described technique.
  i. The base line, which passes through the minimum intensity (symbol 13 in FIGS. 5 and 6), is drawn for β in a range from 0° to 360°.
  ii. The integral intensities I (MD) and I (TD) are calculated as the area of the portions surrounded by the base line and the X-ray intensity curve for the respective β's in the below-described ranges. Here, in FIGS. 5 and 6, symbols 14 and 15 correspond to I (MD) and I (TD), respectively.

$$I(MD): 45° \leq \beta \leq 135°, I(TD): 135° \leq \beta \leq 225°$$

I (MD)/I (TD) was calculated from the above, and the obtained value was assumed to be the criterion for the orientation balance of in-plane crystalline molecular chains of the film

[Recognition of a β-Crystal Activity]

The melting peak with the top at 140° C. to 160° C. exists in the above-described (2) or the below-described (12), and in the case where it is unclear whether the peak is originated from the fusion of β-crystal, the top of the melting peak exists at 140° C. to 160° C. and the value K that is calculated for the sample prepared under the following conditions from each diffraction peak intensity of the diffraction profile obtained through the above-described 2θ/θ scanning is 0.3 or more, and thereby, it may be determined that a β-crystal activity is provided.

The conditions for preparing a sample and the conditions for measurement in accordance with wide angle X-ray diffraction method are shown in the following.

Sample: films were directed the same way and overlap, so that the thickness of the sample after hot-pressing became approximately 1 mm. This sample was sandwiched between two aluminum plates with a thickness of 0.5 mm, and melted and pressed through hot-pressing at 280° C., so that the polymer chains were almost randomly oriented. The obtained sheet was immersed into boiling water at 100° C. for 5 minutes so as to be crystallized immediately after taken out together with the aluminum plates. After that, the sheet was cooled in an atmosphere of 25° C. and then cut into samples, on which measurement was then carried out.
  Measuring conditions by wide angle X-ray diffraction method: an X-ray diffraction profile was obtained through 2θ/θ scanning in accordance with the above-described conditions.

Here, the K value can be calculated using the following formula, from the diffraction peak intensity (referred to as $H\beta_1$) for (300) plane, which is observed at the vicinity of 2θ=16° and originates from the β-crystal, and the diffraction peak intensities for (110), (040) and (130) planes, which are observed at the vicinity of 2θ=14°, 17° and 19°, respectively, and originate from the α-crystal. The K value is an empirical value indicating the ratio of the β-crystal, and A. Turner Jones et al "Makromolekulare Chemie" 75, pp. 134-158 (1964) may be referred to for the details of the K value, including the method for calculating each diffraction peak intensity.

$$K = H\beta_1 / \{H\beta_1 + (H\alpha_1 + H\alpha_2 + H\alpha_3)\}$$

Here, the structure of the crystal forms (α-crystal, β-crystal) of polypropylene and the obtained wide angle X-ray diffraction profile are reported in a great number of references, such as, for example, Edward P. Moore Jr. "Polypropylene Handbook" Kogyo Chosakai Publishing Co., Ltd. (1998), pp. 135 to 163, Hiroyuki Tadokoro "Koubunshi no Kozo" Kagaku-Dojin Publishing Company, Inc. (1976), p. 393, A. Turner Jones et al "Makromolekulare Chemie" 75, pp. 134-158 (1964), and the references cited in these publications, and these may be referred to.

(7) Gurley Air Permeability

Measurement was carried out at 23° C. and 65% RH in compliance with JIS P8117 (1998) (unit: second/100 ml). The same measurement was carried out five times for the same sample, and the average value for the obtained Gurley air permeability was assumed to be the Gurley air permeability of this sample. At this time, the samples with the averaged Gurley air permeability above 1000 sec/100 ml were assumed to be substantially not permeable, and the value was assumed to be infinite (∞) sec/100 ml.

(8) Temperature of Crystallization from Melt(Tmc)

Measurement was carried out in compliance with JIS K 7122 (1987), using a type RDC220 thermal analyzer, manufactured by Seiko Instruments Inc. A film with the weight of 5 mg was mounted into an aluminum pan and sealed and set into the apparatus, and heated from 30° C. to 280° C. at a rate of 10° C./min in a nitrogen atmosphere, and after the temperature was raised, the film was kept for five minutes at 280° C., and subsequently, cooled to 30° C. at a rate of 10° C./min. The top of the exothermic peak accompanying crystallization from a melted state was obtained using the program incorporated in the thermal analysis system SSC5200, manufactured by Seiko Instruments Inc. in the thermal curve obtained above, and assumed to be the temperature of crystallization from the melt (Tmc) (unit: ° C.). The same measurement was carried out five times for the same sample, and the average value for the obtained Tmc's was assumed to be the Tmc of this sample.

(9) Isotactic Pentad Fraction (mmmm)

The polypropylene of the film was extracted for two hours in n-heptane at 60° C., so that impurities and additives were removed from the polypropylene, and after that, the polypropylene, which was vacuum dried for more than two hours at 130° C., was used as a sample. This sample was dissolved in a solvent, and the isotactic pentad fraction (mmmm) was calculated under the following conditions, using $^{13}$C-NMR (unit: %).

Conditions for Measurement
  Apparatus: DRX-500, manufactured by Bruker
  Measurement nuclear: $^{13}$C nuclear (resonant frequency: 125.8 MHz)
  Concentration for measurement: 10 wt %
  Solvent: mixed solution of benzene: deuterated orthodichlorobenzene=1:3 (volume ratio)
  Temperature for measurement: 130° C.
  Spin rotation number: 12 Hz
  NMR test tube: 5 mm tube
  Pulse width: 45° (4.5 μs)
  Time for repeating pulses: 10 seconds
  Data point: 64 K
  Integrated number: 10000
  Measurement mode: complete decoupling
Conditions for Analysis
  Fourier transformation was carried out with a LB (line broadening factor) of 1, and the mmmm peak was set at 21.86 ppm. The peak was divided using WINFIT software (manufactured by Bruker). At this time, the peak on the higher magnetic field side was divided as follows, and furthermore, was automatically fitted with the software, so that the peak division was optimized, and in addition, the total of the peak ratios of the mmmm and the ss (spinning side band peak of mmmmm) was assumed to be the isotactic pentad fraction (mmmm).
(1) mrrm
(2) (3) rrrm (divided as two peaks)
(4) rrrr
(5) mrmm+rmrr
(6) mmrr
(7) mmmr
(8) ss (spinning side band peak of mmmm)
(9) mmmm
(10) rmmr The same measurement was carried out five times for the same sample, and the average value for the obtained isotactic pentad fractions was assumed to be the isotactic pentad fraction of this sample.

(10) Intrinsic Viscosity ([η])

Measurement was carried out on a sample that was dissolved in tetralin at 135° C. using an Ostwald viscometer made by Mitsui Toatsu Chemicals, Inc. (unit: dl/dg). The same measurement was carried out five times on the same sample, and the average value for the obtained intrinsic viscosities was assumed to be the intrinsic viscosity of this sample.

(11) Isotactic Index (II)

Polypropylene of a film was extracted for two hours in n-heptane at a temperature of 60° C., and impurities and additives in the polypropylene were removed. After that, the polypropylene was vacuum dried for two hours at 130° C. A sample with the weight of W (mg) was taken from this and put into a Soxhlet extractor so as to be extracted in boiling n-heptane for 12 hours. Next, this sample was taken out and sufficiently rinsed with acetone, and after that, vacuum dried for six hours at 130° C. After that, this sample was cooled to room temperature and the weight W' (mg) was measured, and the isotactic index was calculated using the following formula.

$$II(\%) = (W'/W) \times 100(\%)$$

The same measurement was carried out five times on the same sample, and the average value of the obtained II's was assumed to be the II of this sample.

(12) β-Crystal Content

The β-crystal content was obtained using the following formula, from the heat of fusion (ΔHβ: symbol 2 in FIG. 2 as an example), calculated from one or more endothermic peaks accompanying the fusion of β-crystal, where the peaktop can be observed at a temperature of no lower than 140° C. and lower than 160° C., and the heat of fusion (ΔHα: symbol 3 in FIG. 2 as an example), calculated from the endothermic peak accompanying the fusion of crystals other than β-crystal originating from polypropylene, where the peaktop can be observed at a temperature of no lower than 160° C., in the thermal curve (symbol 1 in FIG. 1 as an example) of the second run obtained in the same manner as in the above-described (2). At this time, though slight exothermic or an endothermic peak may be observed between the melting peak of ΔHβ and the melting peak of ΔHα, this peak may be deleted.

$$\beta\text{-crystal content} = \{\Delta H\beta/(\Delta H\beta + \Delta H\alpha)\} \times 100$$

The same measurement was carried out five times on the same sample, and the average value for the obtained β-crystal contents was assumed to be the β-crystal content of this sample (unit: %). In addition, when the difference in the β-crystal contents depending on the manufacturing conditions is evaluated, for example in the case where measurement is carried out on an unstretched sheet manufactured under a variety of casting conditions, measurement may be carried out under the same conditions as those described above, except that the thermal curve of the first run is used.

(13) Confirmation of Dispersion State of β-crystal Nucleating Agent

An optical microscope attached with a heating apparatus was used, and a sample (a chip-shaped ra material was used as it was and a film/sheet-shaped sample was cut into a square of 10 mm for use) was placed on a cover glass (18 mm×18 mm, No. 1) manufactured by Matsunami Glass Ind. Ltd. and heated at 200° C. so as to be melted. After melted, another glass cover was placed on top, and the melt was pressed into a melted body with a thickness of 0.03 mm. The dispersion state of the entirety of the nucleating agent in the thickness direction was observed at five arbitrary points on the sample with different depths of focus at a magnification of 400 times, and the major axis and the minor axis were measured for all of the observed nucleating agents, and the average value of the ratios (major axis/minor axis) was calculated. The same measurement was carried out five times on the same sample, and the average value for the obtained ratios of the major axis to the minor axis was assumed to be the ratio of the major axis to the minor axis of this sample. Samples where this ratio of the major axis to the minor axis is 10 or more are defined as samples where the nucleating agent is dispersed in needle shape in all of the first, second and third inventions.

(14) Average Diameter of Particles

The volume average diameter, measured using a centrifugal sedimentation method (using CAPA500, manufactured by HORIBA, Ltd.), was assumed to be the average particle diameter (μm).

(15) Observation of Cross-sectional Structure of Microporous Film

A cross section of the transverse direction-thickness direction was taken from a microporous film at −100° C. using a cryo-microtome technique. The cross section of the obtained microporous film was coated with Pt, and after that, the cross section was observed using a scanning electron microscope (SEM) under the following conditions and the cross-sectional images were obtained. In addition, the thickness (μm) of each layer was measured from the obtained cross-sectional image. Here, sample preparation and observation of the cross section was carried out at Toray Research Center Inc. In addition, the observational magnification was changed within the below-described range if needed.

Apparatus: ultra-high resolution field emission scanning electron microscope (UHR-FE-SEM) S-900H, manufactured by Hitachi Ltd.
Acceleration voltage: 2 kV
Observational magnification: 2000 times to 20000 times

(16) Wetting Tension

Measurement was carried out using a mixed liquid of formamide and ethylene glycol monoethyl ether in compliance with JIS K 6768 (1999) (unit: mN/m).

(17) Liquid Paraffin Permeating Time

Liquid paraffin manufactured by SIGMA-ALDRICH Japan K.K (SAJ, first class, product number 24-0570-5) was used, and this liquid paraffin and a film sample were kept at 23° C. and 65% RH for 24 hours, and after that, the film was placed on a horizontal surface and liquid paraffin with the approximate weight of 0.5 g was dropped from a height of approximately 20 mm above the sample. At this time, the time T (seconds) from when this liquid paraffin made contact with the film surface to when the portion of the film onto which the paraffin initially dropped became completely transparent was measured. Furthermore, the thickness was measured at five points around the portion onto which the paraffin dropped, and the average thickness t (µm) was calculated, and the liquid paraffin permeating time, which was converted to the value with respect to a thickness of 25 µm, was obtained using the following formula (unit: second/25 µm).

$$\text{Liquid paraffin permeating time (seconds/25 µm)} = T/t \times 25$$

The same measurement was carried out five times on the same sample, and the average value for the obtained liquid paraffin permeating time was assumed to be the liquid paraffin permeating time of this sample. At this time, samples with the averaged liquid paraffin permeating time above 60 seconds/25 µm were regarded as substantially not permeable, and were assumed to have infinite (∞) seconds/25 µm.

(18) Young's Modulus in Longitudinal Direction and Stress at Break in Longitudinal Direction Measurement was carried out at 25° C. and 65% RH using an apparatus for tensile testing (AMF/RTA-100) manufactured by Orientec Co. in compliance with JIS K 7127 (1999, sample piece type 2). A sample with a size of 15 cm in the longitudinal direction and 1 cm in the transverse direction was cut out, and the Young's modulus (unit: GPa) and the stress at break (unit: MPa) were measured by elongating a sample with an original length of 50 mm and a elongating rate of 300 mm/min. The same measurement was carried out five times on the same sample, and the average value for the obtained values of the Young's modulus and the stress at break was assumed to be the Young's modulus and the strength against breaking of this sample.

(19) Heat Shrinkage Ratio in Longitudinal Direction

A sample of 260 mm in the longitudinal direction and 10 mm in the transverse direction was prepared, and a point indicating an initial size ($L_0$) of 200 mm was marked. A load of 3 g was applied on the bottom side of this sample, and heat treatment was carried out for 15 minutes in a hot-air circulating oven at 105° C., and after that, the sample was taken out to room temperature and the length ($L_1$) of the sample was measured using the mark. At this time, the heat shrinkage ratio was obtained using the following formula (unit: %).

$$\text{Heat shrinkage ratio}(\%) = 100 \times (L_0 - L_1)/L_0$$

The same measurement was carried out five times on the same sample, and the average value for the obtained heat shrinkage ratios was assumed to be the heat shrinkage ratio of this sample.

(20) Coefficient of Static Friction µs

A slip tester manufactured by Toyo Seiki Seisaku-sho, Ltd. was used. Side A of one of the two films cut out from the same sample was made to overlap with side B of the other film for measurement, in compliance with JIS K 7125 (1999), except that the humidity was 65% RH, where the two sides of a film are referred to as side A and side B, respectively. The same measurement was carried out five times on the same sample, and the average value for the obtained coefficients of static friction was assumed to be the coefficient of static friction of this sample.

(21) Determination of Biaxial Orientation

The state of orientation of a film is determined with X-ray diffraction photographs obtained when X-rays entered into the film in three directions, shown in the following.

Through incident: incident perpendicular to a plane including the longitudinal direction (MD) and the transverse direction (TD) of the film End incident: incident perpendicular to a plane including the transverse direction and the thickness direction of the film Edge incident: incident perpendicular to a plane including the longitudinal direction and the thickness direction Here, the films were aligned in the same direction and overlapped, so that the thickness became approximately 1 mm, and cut out as samples, which were then measured.

The X-ray diffraction photograph was measured in accordance with an imaging plate method under the following conditions.

X-ray generator: type 4036A2, manufactured by Rigaku Corporation

X-ray source: CuKα ray (using Ni filter)

Output: 40 Kv, 20 mA

Slit system: pinhole collimator with diameter of 1 mm

Imaging plate: FUJIFILM BAS-SR

Conditions for taking image: camera radius (distance between sample and imaging plate): 40 mm, exposure time: 5 minutes Here, non-orientation, uniaxial orientation and biaxial orientation can be distinguished in the film in accordance with the following criterion, as described in Kiyoichi Matsumoto et al "Sen-i Gakkaishi" Vol. 26, No. 12, 1970, pp. 537-549; "Film wo Tsukuru", written by Kiyoichi Matsumoto, KYORITSU SHUPPAN Co., Ltd. (1993), pp. 67-86; "Kobunshi Kagaku Joron" (second edition), written by Seizo Okamura et al, Kagaku-Dojin Publishing Company, Inc. (1981), pp. 92-93 and the like.

Non-orientation: Debye-Scherrer rings having almost essentially uniform intensity are obtained in an X-ray diffraction photograph in any direction Longitudinal uniaxial orientation: a Debye-Scherrer ring having almost essentially uniform intensity is obtained in an X-ray diffraction photograph of end incident Biaxial orientation: a diffraction image where the diffraction intensity is not uniform, which reflects the orientation thereof, is obtained in an X-ray diffraction photograph in any direction

(22) Thickness of Film

A dial gauge type thickness meter (JIS B7503 (1997), UPRIGHT DIAL GAUGE (0.001 mm×2 mm), manufactured by PEACOCK, No. 25, gauge head: diameter of 5 mm, flat type, load of 125 gf) was used, and ten points were measured in the longitudinal direction and the transverse direction on the film at intervals of 10 cm, and the average value of these was assumed to be the film thickness of this sample (unit: µm).

(23) Effective Stretching Ratio

Squares of a length of 1 cm were marked on an unstretched film which was extruded from a slit-die and cast onto a metal drum so as to be cooled and solidified into a sheet so that the respective sides were parallel to the longitudinal direction and the transverse direction of the sheet, and after that, the film was stretched and winded up, and the length (cm) of ten squares of the obtained film was measured in the longitudinal direction and in the transverse direction, and the average value for these was assumed to be, respectively, the effective longitudinal stretching ratio and the effective transverse stretching ratio.

(24) Film Formability

The film formability was evaluated in accordance with the following criterion when the film was formed for five hours at a casting speed of 2 m/min.

A: no breakage occurred

B: breakage occurred once

C: breakage occurred twice

D: breakage occurred three or more times

Here, the number of occurrences of film breakage was counted in accordance with the following criterion. That is to say, when film breakage occurs at the longitudinal stretching process or at the transverse stretching process, one occurrence of breakage is counted at this point in time, and the film is cut quickly before that process, and waits ready by winding (in the case where, for some reason, it is difficult to standby at the process before the breakage occurs, the film may standby at the process before this), and the film is again introduced into the process where breakage occurred, as soon as preparations are made. For example, in the case where a film breaks at the transverse stretching process, the film is once cut between the longitudinal stretching machinery-transverse stretching machinery (tenter), and the longitudinally stretched film is winded up as it is so as to be in a state of standby, and then, the film is again introduced into the tenter for transverse stretching, as soon as removal of the broken film from the tenter and adjustment of the conditions for introducing the film (temperature, running speed of tenter clips) are completed, and then, film formability is evaluated. Here, the time for film formation, which is five hours in the above, is defined as a time including this state of standby. The same experiment of film formation was carried out five times in accordance with the same criterion, and the average value for the obtained number of occurrences of film breakage was assumed to be the number of occurrences of film breakage, and film formability was evaluated in accordance with the above-described criterion.

EXAMPLES

The selected aspects of the disclosure are described on the basis of the examples. Here, the amount of extruded polymer was adjusted to a predetermined value unless otherwise specified in order to obtain a film with a desired thickness. In addition, the Trouton ratio, the melt strength (MS), the melt flow rate (MFR), the isotactic pentad fraction (mmmm) and the isotactic index (II) of the polypropylene constituting a film were measured for samples of the film unless otherwise specified. The Trouton ratio, the melt strength (MS), the melt flow rate (MFR), the isotactic pentad fraction (mmmm) and the isotactic index (II) of a laminated film are values measured for polypropylene constituting the core layer to which each of the inventions is applied. The above-described property values of the film to which a polymer other than polypropylene was added are values measured for the polypropylene before the other polymer was added. In addition, the determination of the β-crystal activity, the β-crystal content, the specific gravity, the porosity, the temperature of crystallization from the melt (Tmc) of a film are values measured for the entirety of the obtained film if the film is a laminated film or a film to which other polymer is added.

First, the first aspect is described. Here, all films that can be sampled from among the films of the examples and the films of the comparative examples were confirmed to be biaxially oriented in accordance with the above-described measuring method (21).

Example 101

A polypropylene resin having the below-described composition was prepared.
polypropylene: polypropylene WF836DG3, manufactured by Sumitomo Chemical Co., Ltd. (melt flow rate (MFR: 7 g/10 min)••96.95 wt %
polypropylene having long chain branch with a Trouton ratio of 50: polypropylene PF-814, manufactured by Basell (MFR: 3 g/10 min)••3 wt %
β-crystal nucleating agent: N,N'-dicyclohexyl-2,6-naphthalene dicarboxamide (NU-100, manufactured by New Japan Chemicals Co., Ltd.)••0.05 wt %

0.15 Weight parts of IRGANOX 1010, manufactured by Ciba-Geigy Ltd., as an antioxidant, and 0.1 weight part of IRGAFOS 168, manufactured by Ciba-Geigy Ltd., as a thermal stabilizer, were added to 100 weight parts of the above-described resin composition. This is supplied into a twin-screw extruder and melt-mixed at 300° C., and after that, extruded into a gut form and passed through a water bath at 20° C. so as to be cooled, and cut into a length of 3 mm with a chip cutter, and then, dried for two hours at 100° C. The obtained raw material chip was supplied into a single-screw extruder so as to be meltmixed at 220° C., passed through a single plate filtration filter with a gauge standard of 200 mesh, and after that, extruded from a slit-die that was heated to 200° C., cast onto a drum (casting drum or cast drum) with the surface temperature of 120° C., formed into a sheet, which was made close contact with the drum using an air knife from the non-drum sheet surface with hot air heated to 140° C. blown, and thus, an unstretched sheet was obtained. Here, the contacting time on this metal drum was 40 seconds at this time.

The obtained unstretched sheet was passed through a group of rolls which were kept at 100° C. so as to be preheated, passed between rolls with a difference in the rotating speed which were kept at 100° C., and stretched to 4 times the original length in the longitudinal direction at 100° C. and then cooled to 80° C. Subsequently, the both edges of this longitudinally stretched film were gripped with clips, and the sheet was introduced into a tenter and preheated to 135° C., and thus, the film was stretched to 8 times the original length in the transverse direction at 135° C. Next, a relaxation of 5% was provided in the transverse direction within the tenter, and the film was heat set at 155° C. and gradually and uniformly cooled, and after that, cooled to room temperature and winded up, so that a microporous polypropylene film with a thickness of 25 μm was obtained.

The composition of the raw material and the results of evaluation of the film properties of the resultant microporous film are shown in Tables 1 and 3, respectively. The resultant microporous film was excellent in film formability and had a low specific gravity and an excellent permeability. In addition, the Young's modulus and the stress at break in the longitudinal direction were high and the dimensional stability was excellent.

Example 102

A microporous polypropylene film with a thickness of 25 μm produced under the same conditions as in Example 101, except that the longitudinal stretching ratio was increased to 5, was provided as Example 102.

The results are shown in Tables 1 and 3. The resultant microporous film was excellent in film formability and had a low specific gravity and an excellent permeability. In addition, the Young's modulus and the stress at break in the longitudinal direction were high and the dimensional stability was excellent.

Example 103

A microporous polypropylene film with a thickness of 25 μm produced under the same conditions as in Example 101, except that the longitudinal stretching ratio was increased to 6, was provided as Example 103.

The results are shown in Tables 1 and 3. The resultant microporous film was excellent in film formability and had a low specific gravity and an excellent permeability. In addition, the Young's modulus and the stress at break in the longitudinal direction were high and the dimensional stability was excellent.

Example 104

A microporous polypropylene film with a thickness of 25 µm produced under the same conditions as in Example 102, except that the amount of addition of a polypropylene having a long chain branch was 15 wt % and the film was stretched to 5 times the original length in the longitudinal direction and stretched to 7 times the original length in the transverse direction, was provided as Example 104.

The results are shown in Tables 1 and 3. The resultant microporous film was excellent in film formability and had a low specific gravity and an excellent permeability. In addition, the Young's modulus and the stress at break in the longitudinal direction were high and the dimensional stability was excellent.

Example 105

A microporous polypropylene film with a thickness of 25 µm produced under the same conditions as in Example 102, except that the amount of addition of polypropylene having a long chain branch was 10 wt % and the film was stretched to 5 times the original length in the longitudinal direction and stretched to 7 times the original length in the transverse direction, was provided as Example 105.

The results are shown in Tables 1 and 3. The resultant microporous film was excellent in film formability and had a low specific gravity and an excellent permeability. In addition, the Young's modulus and the stress at break in the longitudinal direction were high and the dimensional stability was excellent.

Example 106

A polypropylene resin having the following composition was prepared.
  Polypropylene having a long chain branch with the Trouton ratio of 50:
  polypropylene PF-814, manufactured by Basell (MFR: 3 g/10 min)••3 wt %
  Polypropylene comprising β-crystal nucleating agent: "BEPOL," manufactured by SUNOCO (type B022-SP, MFR: 1.8 g/10 min)••97 wt %

0.15 Weight parts of IRGANOX 1010, manufactured by Ciba-Geigy Ltd., as an antioxidant, and 0.1 weight part of IRGAFOS 168, manufactured by Ciba-Geigy Ltd., as a thermal stabilizer, were added to 100 weight parts of the above-described resin composition. This is supplied into a twin-screw extruder and extruded into a gut form at 300° C. and passed through a water bath at 20° C. so as to be cooled, and cut into a length of 3 mm with a chip cutter, and then, dried for two hours at 100° C. The obtained raw material chip was supplied into a single-screw extruder so as to be melt-mixed at 220° C., passed through a single plate filtration filter with a gauge standard of 200 mesh, and after that, extruded from a slit-die that was heated to 200° C., cast onto a drum with the surface temperature of 120° C., formed into a sheet, which was made close contact with the drum using an air knife from the non-drum sheet surface with hot air heated to 140° C. blown. Here, the contacting time on this metal drum was 40 seconds at this time.

The obtained unstretched sheet was passed through a group of rolls which were kept at 110° C. so as to be preheated, passed between rolls with a difference in the rotating speed which were kept at 110° C., and stretched to 6 times the original length in the longitudinal direction at 110° C. and then cooled to 95° C. Subsequently, the both edges of this longitudinally stretched film were gripped with clips, and the sheet was introduced into a tenter and preheated to 135° C., and thus, the film was stretched to 8 times the original length in the transverse direction at 135° C. Next, a relaxation of 5% was provided in the transverse direction within the tenter, and the film was heat-set at 155° C. and gradually and uniformly cooled, and after that, cooled to room temperature and winded up, so that a microporous polypropylene film with a thickness of 25 µm was obtained.

The results are shown in Tables 1 and 3. The resultant microporous film was excellent in film formability and had a low specific gravity and an excellent permeability. In addition, the Young's modulus and the stress at break in the longitudinal direction were high and the dimensional stability was excellent.

Example 107

A microporous polypropylene film with a thickness of 25 µm produced under the same conditions as in Example 103, except that the amount of addition of β-crystal nucleating agents was 0.2 wt % and the temperature of the cast drum (casting temperature) was 110° C., vided as Example 107.

The results are shown in Tables 1 and 3. The resultant microporous film was excellent in film formability and had a low specific gravity and an excellent permeability. In addition, the Young's modulus and the stress at break in the longitudinal direction were high and the dimensional stability was excellent.

Example 108

A microporous polypropylene film with a thickness of 25 µm produced under the same conditions as in Example 107, except that the casting temperature was 100° C., was provided as Example 108.

The results are shown in Tables 1 and 3. The resultant microporous film was excellent in film formability and had a low specific gravity and an excellent permeability. In addition, the Young's modulus and the stress at break in the longitudinal direction were high and the dimensional stability was excellent.

Example 109

A microporous polypropylene film with a thickness of 25 µm produced under the same conditions as in Example 102, except that a polypropylene resin having the below-described composition was melt-mixed using a twin-screw extruder and stretched to 5 times the original length in the longitudinal direction and 9 times the original length in the transverse direction, was provided as Example 109.
  Polypropylene: polypropylene F-300SV, manufactured by Idemitsu Petrochemicals Co., Ltd. (MFR: 3 g/10 min) ••96.95 wt %
  Polypropylene having long chain branch with the Trouton ratio of 50: polypropylene PF-814, manufactured by Basell (MFR: 3 g/10 min)••3 wt %
  β-crystal nucleating agent: N,N'-dicyclohexyl-2,6-naphthalene dicarboxamide (NU-100, manufactured by New Japan Chemicals Co., Ltd.)••0.05 wt %

The results are shown in Tables 1 and 3. The resultant microporous film was excellent in film formability and had a low specific gravity and an excellent permeability. In addition, the Young's modulus and the stress at break in the longitudinal direction were high and the dimensional stability was excellent.

Example 110

A microporous polypropylene film with a thickness of 25 μm produced under the same conditions as in Example 102, except that the amount of addition of β-crystal nucleating agent was 0.005 wt % and the longitudinal preheating/stretching temperature was 110° C., was provided as Example 110.

The results are shown in Tables 1 and 3. The resultant microporous film was excellent in film formability and had a low specific gravity. In addition, the Young's modulus and the stress at break in the longitudinal direction were high and the dimensional stability was excellent.

Example 111

A microporous polypropylene film with a thickness of 25 μm produced under the same conditions as in Example 102, except that the amount of addition of β-crystal nucleating agent was 0.02 wt %, was provided as Example 111.

The results are shown in Tables 1 and 3. The resultant microporous film was excellent in film formability and had a low specific gravity and an excellent permeability. In addition, the Young's modulus and the stress at break in the longitudinal direction were high and the dimensional stability was excellent.

Example 112

A microporous polypropylene film with a thickness of 25 μm produced under the same conditions as in Example 102, except that the amount of addition of polypropylene having a long chain branch was 1.5 wt %, was provided as Example 112.

The results are shown in Tables 1 and 3. The resultant microporous film was excellent in film formability and had a low specific gravity and an excellent permeability. In addition, the Young's modulus and the stress at break in the longitudinal direction were high and the dimensional stability was excellent.

Example 113

The raw material chip supplied to a single-screw extruder in Example 101 was supplied as a core layer (layer A) raw material to a single-screw extruder (a) and melt-mixed at 220° C., and passed through a single plate filtration filter with a gauge standard of 200 mesh, and after that, introduced into a slit-die that was heated to 200° C. Meanwhile, polypropylene FM401G, manufactured by Sumitomo Chemical Co., Ltd. (MFR: 7 g/10 min) and polypropylene (ethylene-propylene copolymer) F107DV, manufactured by Mitsui Chemicals, Inc. (MFR: 7 g/10 min), were supplied as a skin layer (layer B) raw material to a single-screw extruder (b) and single-screw extruder (c), respectively, and melt-mixed at 260° C., and then, introduced into the above-described slit-die together. Next, the melted polymers from extruder (b) and extruder (c) were respectively laminated on one side of the melted polymer from extruder (a) so as to be co-extruded into a sheet within the slit-die, and then cast onto a cast drum with the surface temperature of 110° C., and the sheet was made contact with the drum with a cool air of 40° C. blowing using an air knife from the non-drum sheet surface so as to be formed into a sheet, and thus, an unstretched sheet was obtained. Here, the contacting time on the metal drum at this time was 40 seconds. In addition, the sheet was extruded from the slit-die, so that the layer C made contact with the metal drum.

The obtained unstretched laminated (layer B/layer A/layer C) sheet was passed through a group of rolls which were kept at 110° C. so as to be preheated, and passed between rolls with a difference in the rotating speed which were kept at 110° C. so as to be stretched to 5 times the original length in the longitudinal direction at 110° C., and cooled to 80° C. Subsequently, the both edges of this longitudinally stretched film were gripped with clips, and the sheet was introduced into a tenter which was preheated to 140° C., and thus, the film was stretched to 8 times the original size in the transverse direction at 140° C. Next, a relaxation of 5% was provided in the transverse direction within the tenter, and the film was heat-set at 155° C. and gradually and uniformly cooled, and after that, cooled to room temperature and winded up, so that a laminated microporous polypropylene film with a thickness of 25 μm was obtained. The thickness construction of the resultant laminated microporous polypropylene film was layer B/layer A/layer C=1.5 μm/22 μm/1.5 μm.

The results are shown in Tables 1 and 3. The resultant microporous film was excellent in film formability and had a low specific gravity. In addition, the Young's modulus and the stress at break in the longitudinal direction were high and the dimensional stability was excellent.

Comparative Example 101

Film formation was attempted to perform under the same conditions as in Example 101, except that a polypropylene resin having the below-described composition to which polypropylene having a long chain branch with the Trouton ratio of 50 was not added, was melt-mixed in a twin-screw extruder (Comparative Example 101).
  polypropylene: polypropylene WF836DG3, manufactured by Sumitomo Chemical Co., Ltd. (MFR: 7 g/10 min) ••99.95 wt %
  β-crystal nucleating agent: N,N'-dicyclohexyl-2,6-naphthalene dicarboxamide (NU-100, manufactured by New Japan Chemicals Co., Ltd.)••0.05 wt %

The raw material properties of the resultant microporous film and the results of evaluation of the film properties are shown in Tables 2 and 4, respectively. Film breakage occurred many times at the transverse stretching process, and therefore, a satisfactory film could not be obtained by any means, and the film could not be industrially manufactured.

Comparative Example 102

A microporous polypropylene film with a thickness of 25 μm produced under the same conditions as in Comparative Example 101, except that the longitudinal preheating/stretching temperature was 120° C., was provided as Comparative Example 102.

The results are shown in Tables 2 and 4. The resultant microporous film had a high specific gravity and insufficient permeability in comparison with the microporous films obtained in Examples 101 to 113.

Comparative Example 103

Film formation was attempted to perform under the same conditions as in Comparative Example 102, except that the longitudinal stretching ratio was increased to 5 (Comparative Example 103).

The results are shown in Tables 2 and 4. Fim breakage occurred sporadically at the transverse stretching process, and therefore, a satisfactory film could not be obtained, and the film could not be industrially manufactured.

Comparative Example 104

Film formation was attempted to perform under the same conditions as in Comparative Example 103, except that the longitudinal stretching ratio was increased to 6 (Comparative Example 104).

The results are shown in Tables 2 and 4. Film breakage occurred frequently at the longitudinal stretching and transverse stretching process, and therefore, a satisfactory film could not be obtained by any means, and the film could not be industrially manufactured.

Comparative Example 105

A polypropylene resin having the below-described composition was prepared.
  Polypropylene: polypropylene FS2011C, manufactured by Sumitomo Chemical Co., Ltd. (MFR: 1.3 g/10 min)••99.8 wt %
  β-crystal nucleating agent: N,N'-dicyclohexyl-2,6-naphthalene dicarboxamide (NU-100, manufactured by New Japan Chemicals Co., Ltd.)••0.2 wt %

0.15 Weight parts of IRGANOX 1010, manufactured by Ciba-Geigy Ltd., as an antioxidant, and 0.1 weight part of IRGAFOS 168, manufactured by Ciba-Geigy Ltd., as a thermal stabilizer, were added to 100 weight parts of the above-described resin composition. This was supplied into a twin-screw extruder and melt-mixed, and after that, extruded into a gut form at 300° C. and passed through a water bath at 20° C. so as to be cooled, and cut into a length of 3 mm with a chip cutter, and then, dried for two hours at 100° C. A resin composition where 15 wt % of polycarbonate ("TARFLON" A1700) manufactured by Idemitsu Petrochemicals Co., Ltd., was added as a void initiator to 85 wt % of the obtained raw material chip was supplied into a single-screw extruder so as to be melt-mixed at 280° C., passed through a single plate filtration filter with a gauge standard of 200 mesh, and after that, extruded from a slit-die that was heated to 260° C., cast onto a drum with the surface temperature of 90° C., formed into a sheet, which was made close contact with the drum using an air knife from the non-drum sheet surface with a cool air of 40° C. blown, and thus, an unstretched sheet was obtained. Here, the time of contact with this metal drum was 40 seconds at this time.

The obtained unstretched sheet was passed through a group of rolls which were kept at 132° C. so as to be preheated, passed between rolls with a difference in the rotating speed which were kept at 135° C., and stretched to 5 times the original length in the longitudinal direction and then immediately cooled to room temperature. Subsequently, the both edges of this longitudinally stretched film were gripped with clips, and the sheet was introduced into a tenter was and preheated to 165° C., and thus, the film was stretched to 9 times the original length in the transverse direction at 150° C. Next, a relaxation of 8% was provided in the transverse direction within the tenter, and the film was heat-set at 160° C., and after that, cooled and winded up, so that a cavitated polypropylene film with a thickness of 25 µm was obtained.

The results are shown in Tables 2 and 4. Here, the Trouton ratio, the II and the MFR of the polypropylene constituting the film were measured for the polypropylene before polycarbonate was added. The resultant microporous film was excellent in film formability, but the specific gravity was extremely high and did not have any permeability at all.

Comparative Example 106

Film formation was attempted to perform under the same conditions as in Example 102, except that no β-crystal nucleating agent was added (Comparative Example 106).

The results are shown in Tables 2 and 4. The sheet remained adhered to the cast drum and could not be taken off at the casting process, and thus, the sheet could not be fed continuously to the stretching process, and therefore, the film could not be industrially manufactured.

Comparative Example 107

Film formation was attempted to perform under the same conditions as in Comparative Example 106, except that the temperature of the single-screw extruder and the slit-die was 240° C. and the casting temperature was 40° C. (Comparative Example 107).

The results are shown in Tables 2 and 4. Film Breakages occurred frequently at the longitudinal stretching and transverse stretching process, and therefore, a satisfactory film could not be obtained by any means, and the film could not be industrially manufactured.

Comparative Example 108

A biaxially stretched polypropylene film with a thickness of 25 µm manufactured under the same conditions as in Comparative Example 107, except that the longitudinal preheating temperature and the longitudinal stretching temperature were 132° C. and 137° C., respectively, and the transverse stretching ratio, the transverse preheating temperature, the transverse stretching temperature and the transverse heat-set temperature were 10, 165° C., 160° C. and 160° C., respectively, was provided as Comparative Example 108.

The results are shown in Tables 2 and 4. Though the resultant film was excellent in film formability, the specific gravity was extremely high, and it was assumed from this specific gravity and transparent appearance that voids and pores were substantially nonexistent, and the film did not have any permeability.

Comparative Example 109

Film formation was attempted to perform under the same conditions as in Example 106, except that a polypropylene resin with the following composition, to which polypropylene having a long chain branch with the Trouton ratio of 50 was not added, was melt-mixed with a twin-screw extruder (Comparative Example 109).
  Polypropylene: polypropylene WF836DG3, manufactured by Sumitomo Chemical Co., Ltd. (melt flow rate (MFR: 7 g/10 min)••3 wt %
  Polypropylene comprising β-crystal nucleating agent: "BEPOL," manufactured by SUNOCO (type B022-SP, MFR: 1.8 g/10 min)••97 wt %

The results are shown in Tables 2 and 4. Film breakages occurred frequently at the longitudinal stretching and transverse stretching process, and therefore, a satisfactory film could not be obtained by any means, and the film could not be industrially manufactured.

Comparative Example 110

A microporous polypropylene film with a thickness of 25 µm manufactured under the same conditions as in Comparative Example 109, except that the longitudinal stretching ratio was lowered to 4, and the longitudinal preheating and stretching temperature was 120° C., was provided as Comparative Example 110.

The results are shown in Tables 2 and 4. The resultant microporous film had a high specific gravity and substantially no permeability in comparison with the microporous films obtained in Examples 101 to 113.

Comparative Example 111

Film formation was attempted to perform under the same conditions as in Comparative Example 109, except that a polypropylene resin with the composition of 100 wt % of "BEPOL" manufactured by SUNOCO, as the polypropylene comprising a β-crystal nucleating agent, was melt-mixed with a twin-screw extruder (Comparative Example 111).

The results are shown in Tables 2 and 4. Though the resultant film was excellent in film formability, the specific gravity was extremely high, and it was assumed from this specific gravity and transparent appearance that voids and pores were substantially nonexistent, and the film did not have any permeability.

Comparative Example 112

A microporous polypropylene film with a thickness of 25 μm manufactured under the same conditions as in Comparative Example 111, except that the longitudinal stretching ratio was lowered to 4, and the longitudinal preheating and stretching temperature was 120° C., was provided as Comparative Example 112.

The results are shown in Tables 2 and 4. The resultant microporous film had a high specific gravity and substantially no permeability in comparison with the microporous films obtained in Examples 101 to 113.

Comparative Example 113

Film formation was attempted to perform under the same conditions as in Example 101, except that a homopolypropylene WF836DG3 (MFR: 7 g/10 min), manufactured by Sumitomo Chemical Co., Ltd., was used as the polypropylene (Comparative Example 113).

The results are shown in Tables 2 and 4. The sheet remained adhered to the cast drum and could not be taken off at the casting process, and thus, the sheet could not be fed continuously to the stretching process, and therefore, the film could not be industrially manufactured.

Comparative Example 114

Film formation was attempted to perform under the same conditions as in Example 110, except that a polypropylene resin with the following composition, to which polypropylene having a long chain branch with the Trouton ratio of 50 was not added, was melt-mixed with a twin-screw extruder (Comparative Example 114).

polypropylene: polypropylene WF836DG3, manufactured by Sumitomo Chemical Co., Ltd. (MFR: 7 g/10 min) ••99.995 wt %

β-crystal nucleating agent: N,N'-dicyclohexyl-2,6-naphthalene dicarboxamide (NU-100, manufactured by New Japan Chemicals Co., Ltd.)••0.005 wt %

The results are shown in Tables 2 and 4. Film breakages occurred frequently at the longitudinal stretching and transverse stretching process, and therefore, a satisfactory film could not be obtained by any means, and the film could not be industrially manufactured.

Comparative Example 115

A microporous polypropylene film with a thickness of 25 μm manufactured under the same conditions as in Comparative Example 114, except that the longitudinal stretching ratio was lowered to 4, and the longitudinal preheating and stretching temperature was 125° C., was provided as Comparative Example 115.

The results are shown in Tables 2 and 4. The resultant microporous film had a high specific gravity and substantially no permeability in comparison with the microporous films obtained in Examples 101 to 113.

Comparative Example 116

Film formation was attempted to perform under the same conditions as in Example 111, except that a polypropylene resin with the following composition, to which polypropylene having a long chain branch with the Trouton ratio of 50 was not added, was melt-mixed with a twin-screw extruder (Comparative Example 116).

Polypropylene: polypropylene WF836DG3, manufactured by Sumitomo Chemical Co., Ltd. (MFR: 7 g/10 min) ••99.98 wt %

β-crystal nucleating agent: N,N'-dicyclohexyl-2,6-naphthalene dicarboxamide (NU-100, manufactured by New Japan Chemicals Co., Ltd.)••0.02 wt %

The results are shown in Tables 2 and 4. Film breakages occurred frequently at the transverse stretching process, and therefore, a satisfactory film could not be obtained, and the film could not be industrially manufactured.

Comparative Example 117

A microporous polypropylene film with a thickness of 25 μm manufactured under the same conditions as in Comparative Example 116, except that the longitudinal stretching ratio was lowered to 4, and the longitudinal preheating and stretching temperature was 120° C., was provided as Comparative Example 117.

The results are shown in Tables 2 and 4. The resultant microporous film had a high specific gravity and substantially no permeability in comparison with the microporous films obtained in Examples 101 to 113.

Comparative Example 118

Film formation was attempted to perform under the same conditions as in Example 113, except that raw material chips, which were supplied to a single-screw extruder as a core layer (layer A) raw material in Comparative Example 101, were supplied to a single-screw extruder (a) (Comparative Example 118).

The results are shown in Tables 2 and 4. Film breakage occurred frequently at the transverse stretching process, and therefore, a satisfactory film could not be obtained, and the film could not be industrially manufactured.

Comparative Example 119

A microporous polypropylene film with a thickness of 25 μm and a thickness construction of layer B/layer A/layer B=1.5 μm/22 μm/1.5 μm manufactured under the same conditions as in Comparative Example 118, except that the longitudinal stretching ratio was lowered to 4, and the longitudinal preheating and stretching temperature was 125° C., was provided as Comparative Example 119.

The results are shown in Tables 2 and 4. The resultant microporous film had a high specific gravity in comparison with the microporous films obtained in Examples 101 to 113.

TABLE 1

Characteristics of polypropylene resin

| | Composition of added PP | | Composition of β-crystal nucleating agent | | Trouton ratio of PP as a whole | II of PP as a whole (%) | MFR of PP as a whole (g/10 min) | Temperature of CD (deg. C.) | Stretching ratio [longitudinal × transverse] | Film formability <Occurrence of film breakage> |
|---|---|---|---|---|---|---|---|---|---|---|
| | Trouton ratio | Content (wt %) | β-crystal nucleating agent | Content (wt %) | | | | | | |
| Example 101 | 50 | 3 | NU-100 | 0.05 | 7.5 | 96 | 7.5 | 120 | 4 × 8 | A <0 times> |
| Example 102 | 50 | 3 | NU-100 | 0.05 | 7.5 | 96 | 7.5 | 120 | 5 × 8 | A <0 times> |
| Example 103 | 50 | 3 | NU-100 | 0.05 | 7.5 | 96 | 7.5 | 120 | 6 × 8 | B <1 time> |
| Example 104 | 50 | 15 | NU-100 | 0.05 | 11.8 | 96 | 6.7 | 120 | 5 × 7 | B <1 time> |
| Example 105 | 50 | 10 | NU-100 | 0.05 | 9.4 | 96 | 7.0 | 120 | 5 × 7 | A <0 times> |
| Example 106 | 50 | 3 | BEPOL | 97 | 7.8 | 96.3 | 2.0 | 120 | 6 × 8 | A <0 times> |
| Example 107 | 50 | 3 | NU-100 | 0.2 | 7.4 | 96 | 7.5 | 110 | 6 × 8 | A <0 times> |
| Example 108 | 50 | 3 | NU-100 | 0.2 | 7.4 | 96 | 7.5 | 100 | 6 × 8 | B <1 time> |
| Example 109 | 50 | 3 | NU-100 | 0.05 | 7.5 | 97.8 | 3.3 | 120 | 5 × 9 | B <1 time> |
| Example 110 | 50 | 3 | NU-100 | 0.005 | 7.8 | 96 | 7.5 | 120 | 5 × 8 | B <1 time> |
| Example 111 | 50 | 3 | NU-100 | 0.02 | 7.7 | 96 | 7.5 | 120 | 5 × 8 | A <0 times> |
| Example 112 | 50 | 1.5 | NU-100 | 0.05 | 6.6 | 96 | 7.6 | 120 | 5 × 8 | A <0 times> |
| Example 113 | 50 | 3 | NU-100 | 0.05 | 7.5 | 96 | 7.5 | 110 | 5 × 8 | A <0 times> |

PP: Polypropylene, PC: Polycarbonate, II: Isotactic Index, Tmc: Temperature of crystallization from melt, MI: Melt Index, CD: Cast drum

TABLE 2

Characteristics of polypropylene resin

| | Composition of added PP | | Composition of β-crystal nucleating agent | | Trouton ratio of PP as a whole | II of PP as a whole (%) | MFR of PP as a whole (g/10 min) | Temperature of CD (deg. C.) | Stretching ratio [longitudinal × transverse] | Film formability <Occurrence of film breakage> |
|---|---|---|---|---|---|---|---|---|---|---|
| | Trouton ratio | Content (wt %) | β-crystal nucleating agent | Content (wt %) | | | | | | |
| Comparative Example 101 | — | — | NU-100 | 0.05 | 5.3 | 96 | 7.7 | 120 | (4 × -) | D <12 times> |
| Comparative Example 102 | — | — | NU-100 | 0.05 | 5.3 | 96 | 7.7 | 120 | 4 × 8 | B <1 time> |
| Comparative Example 103 | — | — | NU-100 | 0.05 | 5.3 | 96 | 7.7 | 120 | (5 × 8) | D <4 times> |
| Comparative Example 104 | — | — | NU-100 | 0.05 | 5.3 | 96 | 7.7 | 120 | (6 × -) | D <20 times> |
| Comparative Example 105 | (PC) | (15) | NU-100 | 0.2 | 5.1 | 96.5 | 1.4 | 90 | 5 × 9 | A <0 times> |
| Comparative Example 106 | 50 | 3 | — | — | 19 | 96 | 7.5 | 120 | — | — |
| Comparative Example 107 | 50 | 3 | — | — | 19 | 96 | 7.5 | 40 | (5 × -) | D <20 times> |
| Comparative Example 108 | 50 | 3 | — | — | 19 | 96 | 7.5 | 40 | 5 × 10 | A <0 times> |
| Comparative Example 109 | 11 | 3 | BEPOL | 97 | 5.5 | 96.3 | 2.1 | 120 | (6 × -) | D <20 times> |
| Comparative Example 110 | 11 | 3 | BEPOL | 97 | 5.5 | 96.3 | 2.1 | 120 | 4 × 8 | B <1 time> |
| Comparative Example 111 | — | — | BEPOL | 100 | 5.5 | 96.3 | 2.0 | 120 | (6 × -) | D <21 times> |
| Comparative Example 112 | — | — | BEPOL | 100 | 5.5 | 96.3 | 2.0 | 120 | 4 × 8 | B <1 time> |
| Comparative Example 113 | — | — | — | — | 11 | 96 | 7.7 | 120 | — | — |

TABLE 2-continued

Characteristics of polypropylene resin

| | Composition of added PP | | Composition of β-crystal nucleating agent | | Trouton ratio of PP as a whole | II of PP as a whole (%) | MFR of PP as a whole (g/10 min) | Temperature of CD (deg. C.) | Stretching ratio [longitudinal × transverse] | Film formability <Occurrence of film breakage> |
|---|---|---|---|---|---|---|---|---|---|---|
| | Trouton ratio | Content (wt %) | β-crystal nucleating agent or PP comprising β-crystal nucleating agent | Content (wt %) | | | | | | |
| Comparative Example 114 | — | — | NU-100 | 0.005 | 5.6 | 96 | 7.7 | 120 | (5 × -) | D <10 times> |
| Comparative Example 115 | — | — | NU-100 | 0.005 | 5.6 | 96 | 7.7 | 120 | 4 × 8 | B <1 time> |
| Comparative Example 116 | — | — | NU-100 | 0.02 | 5.5 | 96 | 7.7 | 120 | (5 × -) | D <8 times> |
| Comparative Example 117 | — | — | NU-100 | 0.02 | 5.5 | 96 | 7.7 | 120 | 4 × 8 | B <1 time> |
| Comparative Example 118 | — | — | NU-100 | 0.05 | 5.3 | 96 | 7.7 | 110 | (5 × -) | D <18 times> |
| Comparative Example 119 | — | — | NU-100 | 0.05 | 5.3 | 96 | 7.7 | 110 | 4 × 8 | B <1 time> |

PP: Polypropylene, PC: Polycarbonate, II: Isotactic Index, Tmc: Temperature of crystallization from melt, MI: Melt Index, CD: Cast drum

TABLE 3

| | β-Crystal activity | β-Crystal content (%) | Specific gravity | Tmc (deg. C.) | Gurley air permeability (sec/100 ml) | Liquid paraffin permeating time (sec/25 μm) | Longitudinal Young's modulus at 25 deg. C. (GPa) | Longitudinal stress at break at 25 deg. C. (MPa) | Longitudinal heat shrinkage ratio at 105 deg. C. (%) |
|---|---|---|---|---|---|---|---|---|---|
| Example 101 | Yes | 60 | 0.30 | 127 | 260 | 8.5 | 0.39 | 60 | 3.1 |
| Example 102 | Yes | 60 | 0.24 | 127 | 170 | 5.3 | 0.39 | 61 | 3.4 |
| Example 103 | Yes | 60 | 0.20 | 127 | 80 | 3.2 | 0.40 | 63 | 3.7 |
| Example 104 | Yes | 50 | 0.26 | 128 | 200 | 6.8 | 0.43 | 65 | 3.8 |
| Example 105 | Yes | 53 | 0.25 | 128 | 180 | 6.0 | 0.40 | 63 | 3.6 |
| Example 106 | Yes | 61 | 0.34 | 123 | 280 | 8.3 | 0.58 | 70 | 3.8 |
| Example 107 | Yes | 69 | 0.23 | 129 | 150 | 3.3 | 0.40 | 59 | 3.8 |
| Example 108 | Yes | 69 | 0.31 | 129 | 200 | 3.9 | 0.40 | 60 | 4.3 |
| Example 109 | Yes | 64 | 0.22 | 130 | 104 | 4.8 | 0.45 | 66 | 2.4 |
| Example 110 | Yes | 39 | 0.55 | 121 | 950 | 25.0 | 0.86 | 105 | 4.5 |
| Example 111 | Yes | 51 | 0.33 | 126 | 280 | 7.8 | 0.58 | 70 | 3.7 |
| Example 112 | Yes | 63 | 0.19 | 126 | 110 | 3.6 | 0.40 | 62 | 3.5 |
| Example 113 | Yes | 53 | 0.36 | 127 | ∞ | ∞ | 0.62 | 75 | 4.0 |

∞ in Gurley air permeability means that the Gurley air permeablity exceeds 1000 sec/100 ml.
∞ in liquid paraffin permeating time means that the Liquid paraffin permeating time exceeds 60 sec/25 mm.

TABLE 4

| | β-Crystal activity | β-Crystal content (%) | Specific gravity | Tmc (deg. C.) | Gurley air permeability (sec/100 ml) | Liquid paraffin permeating time (sec/25 μm) | Longitudinal Young's modulus at 25 deg. C. (GPa) | Longitudinal stress at break at 25 deg. C. (MPa) | Longitudinal heat shrinkage ratio at 105 deg. C. (%) |
|---|---|---|---|---|---|---|---|---|---|
| Comparative Example 101 | — | — | — | 125 | — | — | — | — | — |
| Comparative Example 102 | Yes | 76 | 0.35 | 125 | 300 | 9.0 | 0.37 | 61 | 3.3 |
| Comparative Example 103 | — | — | — | 125 | — | — | — | — | — |
| Comparative Example 104 | — | — | — | 125 | — | — | — | — | — |
| Comparative Example 105 | Yes | 71 | 0.75 | 126 | ∞ | ∞ | 1.6 | 125 | 2.1 |
| Comparative Example 106 | — | — | — | 118 | — | — | — | — | — |
| Comparative Example 107 | — | — | — | 118 | — | — | — | — | — |
| Comparative Example 108 | No | 0 | 0.92 | 118 | ∞ | ∞ | 2.0 | 160 | 3.1 |
| Comparative Example 109 | — | — | — | 121 | — | — | — | — | — |
| Comparative Example 110 | Yes | 73 | 0.67 | 121 | ∞ | ∞ | 1.1 | 122 | 4.3 |
| Comparative Example 111 | — | — | — | 121 | — | — | — | — | — |

TABLE 4-continued

|  | β-Crystal activity | β-Crystal content (%) | Specific gravity | Tmc (deg. C.) | Gurley air permeability (sec/100 ml) | Liquid paraffin permeating time (sec/25 μm) | Longitudinal Young's modulus at 25 deg. C. (GPa) | Longitudinal stress at break at 25 deg. C. (MPa) | Longitudinal heat shrinkage ratio at 105 deg. C. (%) |
|---|---|---|---|---|---|---|---|---|---|
| Comparative Example 112 | Yes | 76 | 0.65 | 121 | ∞ | ∞ | 1.1 | 120 | 4.8 |
| Comparative Example 113 | — | — | — | 110 | — | — | — | — | — |
| Comparative Example 114 | — | — | — | 120 | — | — | — | — | — |
| Comparative Example 115 | Yes | 55 | 0.64 | 120 | ∞ | ∞ | 1.1 | 118 | 4.5 |
| Comparative Example 116 | — | — | — | 124 | — | — | — | — | — |
| Comparative Example 117 | Yes | 64 | 0.42 | 124 | 450 | 12.0 | 0.71 | 91 | 4.3 |
| Comparative Example 118 | — | — | — | 125 | — | — | — | — | — |
| Comparative Example 119 | Yes | 66 | 0.48 | 125 | ∞ | ∞ | 0.78 | 98 | 4.5 |

∞ in Gurley air permeability means that the Gurley air permeablity exceeds 1000 sec/100 ml.
∞ in liquid paraffin permeating time means that the Liquid paraffin permeating time exceeds 60 sec/25 mm.

As shown in Tables 1 to 4, the microporous polypropylene film of the first aspect comprises a polypropylene with the Trouton ratio of not less than 30, and/or consists of a polypropylene with the Trouton ratio of not less than 6, and/or comprises a polypropylene having a long chain branch, and have a β-crystal activity, and thereby, film formability could be significantly improved. In addition, the film can be formed without breakage even when stretched in the longitudinal direction at a low temperature and to a high ratio, and together with this, the specific gravity could further be reduced. Furthermore, the permeability thereof could be controlled by the layer construction of the film, the raw material composition and the conditions for film formation, and in addition, the permeability could be significantly improved.

Figure 7:
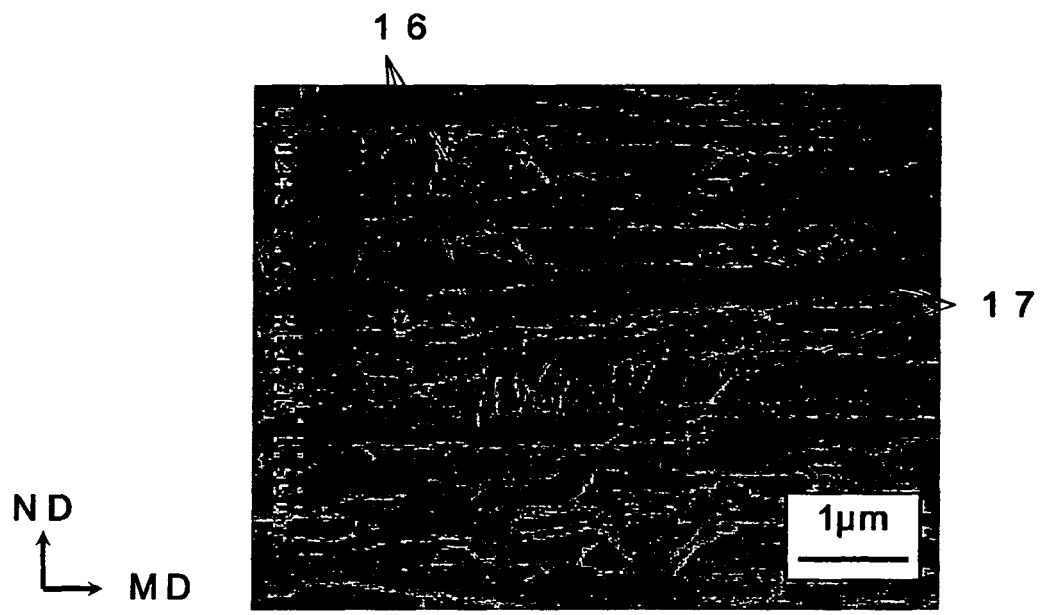
FIG. 7 is a diagram showing an SEM image obtained when a cross section of the film of Example 103 was observed using a scanning electron microscope (SEM)
Figure 8:
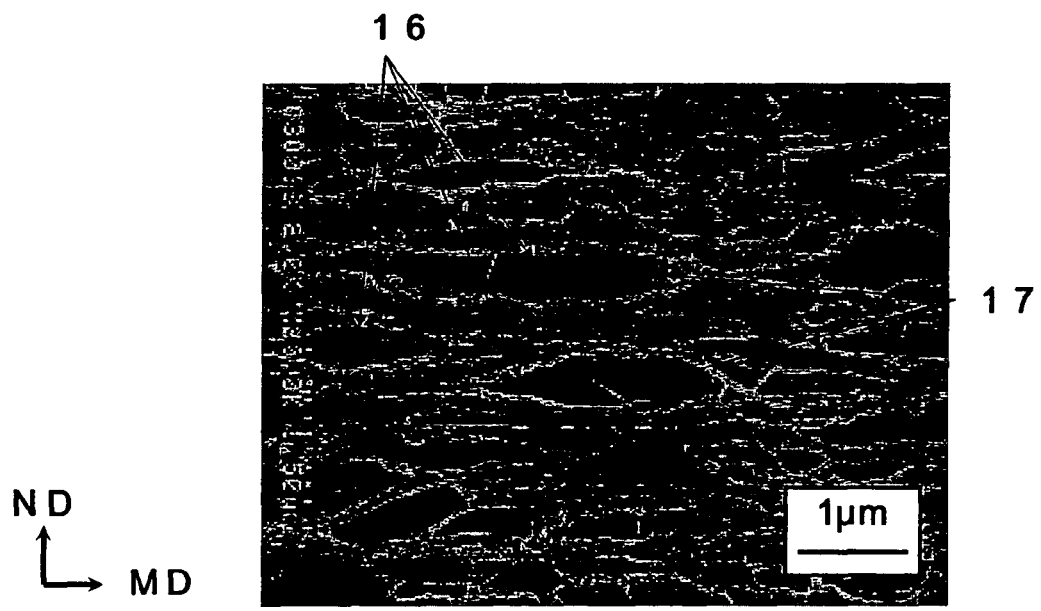
FIG. 8 is a diagram showing an SEM image obtained when a cross section of the film of Comparative Example 102 that was sampled in the same manner as in FIG. 7 was observed using a SEM.

In addition, FIGS. 7 and 8 show SEM images obtained when the cross sections of the films of Example 103 and Comparative Example 102 were observed, respectively, with a scanning electron microscope (SEM). Pores (symbol 16 in FIGS. 7 and 8) were observed in both cross sections, and microfibrils were observed in the pores (symbol 17 in FIGS. 7 and 8). Surprisingly, no substantial enlargement or non-uniformity of pores was observed in Example 103 even though the film was longitudinally stretched at a low temperature and to a high ratio in comparison with Comparative Example 102. More surprisingly, in Example 103, more microfibrils with a size of the nanometer order were observed, and it was confirmed that the pore structure was miniaturized in comparison with Comparative Example 102. In this manner, it was found that the film comprises a polypropylene with the Trouton ratio of not less than 30, and/or is consists of a polypropylene with the Trouton ratio of not less than 6, and/or comprises a polypropylene having a long chain branch, and have a β-crystal activity, and thereby, the pore structure can be controlled. This is assumed to be because the structure is miniaturized in comparison with conventional microporous polypropylene films due to the effects of uniformly propagating the above-described stretching stress. In addition, the same phenomena were observed in the below-described microporous polypropylene films according to the second invention.

Next, the second aspect is described. Here, all films that could be sampled from among the films of the examples and the films of the comparative examples were confirmed to be biaxially oriented in accordance with the above-described measuring method (21).

Example 201

A polypropylene resin with the below-described composition was prepared.
polypropylene: polypropylene WF836DG3, manufactured by Sumitomo Chemical Co., Ltd. (melt flow rate (MFR: 7 g/10 min)••94.95 wt %
high melt strength polypropylene having long chain branch with the melt strength of 20 cN (HMS-PP): HMS-PP PF-814, manufactured by Basell (MFR: 3 g/10 min)••5 wt %
β-crystal nucleating agent: N,N'-dicyclohexyl-2,6-naphthalene dicarboxamide (NU-100, manufactured by New Japan Chemicals Co., Ltd.)••0.05 wt %
[Here, the MS of the above-described HMS-PP is a value measured under the conditions with the taking-up rate of 5 m/min]
0.15 Weight parts of IRGANOX 1010, manufactured by Ciba-Geigy Ltd., as an antioxidant, and 0.1 weight part of IRGAFOS 168, manufactured by Ciba-Geigy Ltd., as a thermal stabilizer, were added to 100 weight parts of the above-described resin composition. This is supplied into a twin-screw extruder and melt-mixed at 300° C., and after that, extruded into a gut form and passed through a water bath at 20° C. so as to be cooled, and cut into a length of 5 mm with a chip cutter, and then, dried for two hours at 100° C. The obtained raw material chip was supplied into a single-screw extruder so as to be melt-mixed at 220° C., passed through a single plate filtration filter with a gauge standard of 200 mesh, and after that, extruded from a slit-die that was heated to 200° C., cast onto a drum (casting drum or cast drum) with the surface temperature of 120° C., formed into a sheet, which was made close contact with the drum using an air knife from the non-drum sheet surface with hot air heated to 140° C. blown, and thus, an unstretched sheet was obtained. Here, the contacting time on this metal drum was 40 seconds at this time.

The obtained unstretched sheet was passed through a group of rolls which were kept at 100° C. so as to be preheated, passed between rolls with a difference in the rotating speed which were kept at 100° C., and stretched to 4 times the original length in the longitudinal direction and then cooled to 90° C. Subsequently, the both edges of this longitudinally stretched film were gripped with clips, and the sheet was introduced into a tenter and preheated to 135° C., and thus, the film was stretched to 8 times the original length in the transverse direction at 135° C. Next, a relaxation of 5% was provided in the transverse direction within the tenter, and the film was heat set at 155° C. and gradually and uniformly cooled, and after that, cooled to room temperature and winded up, so that a microporous polypropylene film with a thickness of 25 μm was obtained.

The composition of the raw material and the results of evaluation of the film properties of the resultant microporous film are shown in Tables 5, 7 and 8, respectively. The resultant microporous film was excellent in film formability and had a high porosity and an excellent permeability. In addition, the Young's modulus and the stress at break in the longitudinal direction were high and the dimensional stability was excellent.

Example 202

A microporous polypropylene film with a thickness of 25 μm produced under the same conditions as in Example 201, except that the longitudinal stretching ratio was increased to 5, was provided as Example 202.

The results are shown in Tables 5, 7 and 8. The resultant microporous film was excellent in film formability and had a high porosity and an excellent permeability. In addition, the Young's modulus and the stress at break in the longitudinal direction were high and the dimensional stability was excellent.

Example 203

A microporous polypropylene film with a thickness of 25 μm produced under the same conditions as in Example 201, except that the longitudinal stretching ratio was increased to 6, was provided as Example 203.

The results are shown in Tables 5, 7 and 8. The resultant microporous film was excellent in film formability and had a high porosity and an excellent permeability. In addition, the Young's modulus and the stress at break in the longitudinal direction were high and the dimensional stability was excellent.

Example 204

A microporous polypropylene film with a thickness of 25 μm produced under the same conditions as in Example 202, except that the amount of addition of a polypropylene having a long chain branch was 12 wt % and the film was stretched to 5 times the original length in the longitudinal direction and stretched to 7 times the original length in the transverse direction, was provided as Example 204.

The results are shown in Tables 5, 7 and 8. The resultant microporous film was excellent in film formability and had a high porosity and an excellent permeability. In addition, the Young's modulus and the stress at break in the longitudinal direction were high and the dimensional stability was excellent.

Example 205

A polypropylene resin with the following composition was prepared.
  HMS-PP having a long chain branch with the MS of 20 cN: HMS-PP PF-814, manufactured by Basell (MFR: 3 g/10 min)••5 wt %
  Polypropylene comprising β-crystal nucleating agent: "BEPOL," manufactured by SUNOCO (type B022-SP, MFR: 1.8 g/10 min)••95 wt %
0.15 Weight parts of IRGANOX 1010, manufactured by Ciba-Geigy Ltd., as an antioxidant, and 0.1 weight part of IRGAFOS 168, manufactured by Ciba-Geigy Ltd., as a thermal stabilizer, were added to 100 weight parts of the above-described resin composition. This is supplied into a twin-screw extruder and extruded into a gut form at 300° C. and passed through a water bath at 20° C. so as to be cooled, and cut into a length of 5 mm with a chip cutter, and then, dried for two hours at 100° C. The obtained raw material chip was supplied into a single-screw extruder so as to be melt-mixed at 220° C., passed through a single plate filtration filter with a gauge standard of 200 mesh, and after that, extruded from a slit-die that was heated to 200° C., cast onto a drum with the surface temperature of 120° C., formed into a sheet, which was made close contact with the drum using an air knife from the non-drum sheet surface with hot air heated to 140° C. blown, and thus, an unstretched sheet was obtained. Here, the contacting time on this metal drum was 40 seconds at this time.

The resultant unstretched sheet was passed through a group of rolls which were kept at 110° C. so as to be preheated, passed between rolls with a difference in the rotating speed which were kept at 110° C., and stretched to 6 times the original length in the longitudinal direction and then cooled to 100° C. Subsequently, the both edges of this longitudinally stretched film were gripped with clips, and the sheet was introduced into a tenter and preheated to 135° C., and thus, the film was stretched to 8 times the original length in the transverse direction at 135° C. Next, a relaxation of 5% was provided in the transverse direction within the tenter, and the film was heat set at 155° C. and gradually and uniformly cooled, and after that, cooled to room temperature and winded up, so that a microporous polypropylene film with a thickness of 25 μm was obtained.

The results are shown in Tables 5, 7 and 8. The resultant microporous film was excellent in film formability and had a high porosity and an excellent permeability. In addition, the Young's modulus and the stress at break in the longitudinal direction were high and the dimensional stability was excellent.

Example 206

A microporous polypropylene film with a thickness of 25 μm produced under the same conditions as in Example 203, except that the amount of addition of β-crystal nucleating agent was 0.2 wt % and the temperature of the cast drum (casting temperature) was 110° C., was provided as Example 206.

The results are shown in Tables 5, 7 and 8. The resultant microporous film was excellent in film formability and had a high porosity and an excellent permeability. In addition, the Young's modulus and the stress at break in the longitudinal direction were high and the dimensional stability was excellent.

Example 207

A microporous polypropylene film with a thickness of 25 μm produced under the same conditions as in Example 206, except that the casting temperature was 100° C., was provided as Example 207.

The results are shown in Tables 5, 7 and 8. The resultant microporous film was excellent in film formability and had a high porosity and an excellent permeability. In addition, the Young's modulus and the stress at break in the longitudinal direction were high and the dimensional stability was excellent.

Example 208

A microporous polypropylene film with a thickness of 25 µm produced under the same conditions as in Example 203, except that a polypropylene resin with the below-described composition was melt-mixed with a twin-screw extruder and stretched to 5 times the original length in the longitudinal direction and 9 times the original length in the transverse direction, was provided as Example 208.

polypropylene: polypropylene HC318BF, manufactured by Borealis (MFR: 3.2 g/10 min)••94.95 wt %

HMS-PP having long chain branch with the MS of 20 cN: HMS-PP PF-814, manufactured by Basell (MFR: 3 g/10 min)••5 wt %

β-crystal nucleating agent: N,N'-dicyclohexyl-2,6-naphthalene dicarboxamide (NU-100, manufactured by New Japan Chemicals Co., Ltd.)••0.05 wt %

The results are shown in Tables 5, 7 and 8. The resultant microporous film was excellent in film formability and had a high porosity and an excellent permeability. In addition, the Young's modulus and the stress at break in the longitudinal direction were high and the dimensional stability was excellent.

Example 209

A microporous polypropylene film with a thickness of 25 µm produced under the same conditions as in Example 202, except that the amount of addition of β-crystal nucleating agent was 0.005 wt % and the longitudinal preheating and stretching temperature was 110° C., was provided as Example 209.

The results are shown in Tables 5, 7 and 8. The resultant microporous film was excellent in film formability and had a high porosity. In addition, the Young's modulus and the stress at break in the longitudinal direction were high and the dimensional stability was excellent.

Example 210

A microporous polypropylene film with a thickness of 25 µm produced under the same conditions as in Example 202, except that the amount of addition of a polypropylene having a long chain branch was 2 wt %, was provided as Example 210.

The results are shown in Tables 5, 7 and 8. The resultant microporous film was excellent in film formability and had a high porosity and an excellent permeability. In addition, the Young's modulus and the stress at break in the longitudinal direction were high and the dimensional stability was excellent.

Example 211

The raw material chip supplied to a single-screw extruder in Example 201 was supplied as a core layer (layer A) raw material to a single-screw extruder (a) and melt-mixed at 220° C., and passed through a single plate filtration filter with a gauge standard of 200 mesh, and after that, introduced into a slit-die that was heated to 200° C. Meanwhile, a polypropylene (ethylene-propylene copolymer) FM401G, manufactured by Sumitomo Chemical Co., Ltd. (MFR: 7 g/10 min) and a polypropylene F107DV, manufactured by Mitsui Chemicals, Inc. (MFR: 7 g/10 min), were supplied as a skin layer (layer B) raw material to a single-screw extruder (b) and uniaxial extruder (c), respectively, and melt-mixed at 260° C., and then, introduced into the above-described slit-die together. Next, the melted polymers from extruder (b) and extruder (c) were respectively laminated on one side of the melted polymer from extruder (a) so as to be co-extruded into a sheet within the slit-die, and then cast onto a cast drum with the surface temperature of 110° C., and the sheet was made contact with the drum with a cool air of 40° C. blowing using an air knife from the non-drum sheet surface so as to be formed into a sheet, and thus, an unstretched sheet was obtained. Here, the contacting time on the metal drum at this time was 40 seconds. In addition, the sheet was extruded from the slit-die, so that the layer C made contact with the metal drum.

The obtained unstretched laminated (layer B/layer A/layer C) sheet was passed through a group of rolls which were kept at 110° C. so as to be preheated, and passed between rolls with a difference in the rotating speed which were kept at 110° C. so as to be stretched to 5 times the original length in the longitudinal direction at 110° C., and cooled to 90° C. Subsequently, the both edges of this longitudinally stretched film were gripped with clips, and the sheet was introduced into a tenter and preheated to 140° C., and thus, the film was stretched to 8 times the original length in the transverse direction at 140° C. Next, a relaxation of 5% was provided in the transverse direction within the tenter, and the film was heat set at 155° C. and gradually and uniformly cooled, and after that, cooled to room temperature and winded up, so that a laminated microporous polypropylene film with a thickness of 25 µm was obtained. The thickness construction of the resultant laminated microporous polypropylene film was layer B/layer A/layer C=1.5 µm/22 µm/1.5 µm.

The results are shown in Tables 5, 7 and 8. The resultant microporous film was excellent in film formability and had a high porosity. In addition, the Young's modulus and the stress at break in the longitudinal direction were high and the dimensional stability was excellent.

Comparative Example 201

Film formation was attempted to perform under the same conditions as in Example 201, except that a polypropylene resin composition, to which HMS-PP having a long chain branch with the MS of 20 cN was not added, was used as the resin that was melt-mixed with a twin-screw extruder (Comparative Example 201).

Polypropylene: polypropylene WF836DG3, manufactured by Sumitomo Chemical Co., Ltd. (MFR: 7 g/10 min) ••99.95 wt %

β-crystal nucleating agent: N,N'-dicyclohexyl-2,6-naphthalene dicarboxamide (NU-100, manufactured by New Japan Chemicals Co., Ltd.)••0.05 wt %

The raw material properties of the resultant microporous film and the results of evaluation of the film properties are shown in Tables 6, 7 and 8, respectively. Film breakages occurred many times at the transverse stretching process, and therefore, a satisfactory film could not be be obtained by any means, and the film could not be industrially manufactured.

Comparative Example 202

A microporous polypropylene film with a thickness of 25 µm produced under the same conditions as in Comparative Example 201, except that the longitudinal preheating and stretching temperature was 120° C., was provided as Comparative Example 202.

The results are shown in Tables 6, 7 and 8. The resultant microporous film had a low porosity and insufficient permeability in comparison with the microporous films obtained in Examples 201 to 211.

Comparative Example 203

Film formation was attempted to perform under the same conditions as in Comparative Example 202, except that the longitudinal stretching ratio was increased to 5 (Comparative Example 203).

The results are shown in Tables 6, 7 and 8. Film breakages occurred sporadically at the transverse stretching process, and therefore, a satisfactory film could not be obtained, and the film could not be industrially manufactured.

Comparative Example 204

Film formation was attempted to perform under the same conditions as in Comparative Example 203, except that the longitudinal stretching ratio was increased to 6 (Comparative Example 204).

The results are shown in Tables 6, 7 and 8. Film breakages occurred sporadically at the longitudinal stretching and transverse stretching process, and therefore, a satisfactory film could not be obtained by any means, and the film could not be industrially manufactured.

Comparative Example 205

Film formation was attempted to perform under the same conditions as in Comparative Example 202, except that a polypropylene resin, to which HMS-PP having a long chain branch with the MS of 20 cN was not added, where polypropylene HC318BF, manufactured by Borealis Corporation (MFR: 3.2 g/10 min), was used as the polypropylene instead of polypropylene WF836DG3, manufactured by Sumitomo Chemical Co., Ltd., was melt-mixed with a twin-screw extruder (Comparative Example 205).

The results are shown in Tables 6, 7 and 8. Film breakages occurred sporadically at the longitudinal stretching and transverse stretching process, and therefore, a satisfactory film could not be obtained by any means, and the film could not be industrially manufactured.

Comparative Example 206

A polypropylene resin with the below-described composition was prepared.
Polypropylene: polypropylene FS2011C, manufactured by Sumitomo Chemical Co., Ltd. (MFR: 1.3 g/10 min)••99.8 wt %
β-crystal nucleating agent: N,N'-dicyclohexyl-2,6-naphthalene dicarboxamide (NU-100, manufactured by New Japan Chemicals Co., Ltd.)••0.2 wt %
0.15 Weight parts of IRGANOX 1010, manufactured by Ciba-Geigy Ltd., as an antioxidant, and 0.1 weight part of IRGAFOS 168, manufactured by Ciba-Geigy Ltd., as a thermal stabilizer, were added to 100 weight parts of the above-described resin composition. This was supplied into a twin-screw extruder and melt-mixed, and after that, extruded into a gut form at 280° C. and passed through a water bath at 20° C. so as to be cooled, and cut into a length of 5 mm with a chip cutter, and then, dried for two hours at 100° C. A resin composition where 15 wt % of polycarbonate ("TARFLON" A 1700) manufactured by Idemitsu Petrochemicals Co., Ltd., was added as a void initiator to 85 wt % of the obtained raw material chip was supplied into a single-screw extruder so as to be melt-mixed at 280° C., passed through a single plate filtration filter with a gauge standard of 200 mesh, and after that, extruded from a slit-die that was heated to 260° C., cast onto a drum with the surface temperature of 90° C., formed into a sheet and made close contact with the drum using an air knife from the non-drum sheet surface with a cool air of 40° C. blown, and thus, an unstretched sheet was obtained. Here, the contacting time on this metal drum was 40 seconds at this time.

The obtained unstretched sheet was passed through a group of rolls which were kept at 132° C. so as to be preheated, passed between rolls with a difference in the rotating speed which were kept at 135° C., and stretched to 5 times the original length in the longitudinal direction and then immediately cooled to room temperature. Subsequently, the both edges of this longitudinally stretched film were gripped with clips, and the sheet was introduced into a tenter was and preheated to 165° C., and thus, the film was stretched to 9 times the original length in the transverse direction at 150° C. Next, a relaxation of 8% was provided in the transverse direction within the tenter, and the film was heat set at 160° C., and after that, cooled and winded up, so that a cavitated polypropylene film with a thickness of 25 μm was obtained.

The results are shown in Tables 6, 7 and 8. Here, the MS, the MFR, the II and the mmmm of the polypropylene constituting the film were measured for the polypropylene before polycarbonate was added. The resultant microporous film was excellent in film formability, but the porosity was extremely low and did not have any permeability at all. (Comparative Example 207)

Film formation was attempted to perform under the same conditions as in Example 202, except that no β-crystal nucleating agent was added (Comparative Example 207).

The results are shown in Tables 6, 7 and 8. The sheet remained adhered to the cast drum and could not be taken off at the casting process, and thus, the sheet could not be fed continuously to the stretching process, and therefore, the film could not be industrially manufactured.

Comparative Example 208

Film formation was attempted to perform under the same conditions as in Comparative Example 207, except that the temperature of the single-screw extruder and the slit-die was 240° C. and the casting temperature was 40° C. (Comparative Example 208).

The results are shown in Tables 6, 7 and 8. Film breakages occurred frequently at the longitudinal stretching and transverse stretching process, and therefore, a satisfactory film could not be obtained by any means, and the film could not be industrially manufactured.

Comparative Example 209

A biaxially stretched polypropylene film with a thickness of 25 μm produced under the same conditions as in Comparative Example 208, except that the longitudinal preheating and stretching temperature were 132° C. and 137° C., respectively, and the transverse stretching ratio, the transverse preheating temperature, the transverse stretching temperature and the transverse heat-set temperature were 10, 165° C., 160° C. and 160° C., respectively, was provided as Comparative Example 209.

The results are shown in Tables 6, 7 and 8. Though the resultant film was excellent in film formability, the porosity was substantially 0, and it was assumed from this value and transparent appearance that voids and pores were substantially nonexistent, and the film did not have any permeability.

Comparative Example 210

Film formation was attempted to perform under the same conditions as in Example 205, except that a polypropylene resin composition with 100 wt % of "BEPOL," manufactured by SUNOCO (type B022-SP, MFR: 1.8 g/10 min), to which HMS-PP having a long chain branch with the MS of 20 cN was not added, was used and melt-mixed with a twin-screw extruder (Comparative Example 210).

The results are shown in Tables 6, 7 and 8. Film breakages occurred frequently at the longitudinal stretching and transverse stretching process, and therefore, a satisfactory film could not be obtained by any means, and the film could not be industrially manufactured.

Comparative Example 211

A microporous polypropylene film with a thickness of 25 µm produced under the same conditions as in Comparative Example 210, except that the longitudinal stretching ratio was lowered to 4, and the longitudinal preheating and stretching temperature was 120° C., was provided as Comparative Example 211.

The results are shown in Tables 6, 7 and 8. The resultant microporous film had a low porosity and substantially no permeability in comparison with the microporous films obtained in Examples 201 to 211.

Comparative Example 212

Film formation was attempted to perform under the same conditions as in Example 201, except that a homopolypropylene WF836DG3 (MFR: 7 g/10 min), manufactured by Sumitomo Chemical Co., Ltd., was used as the polypropylene, and melt-mixed with a twin-screw extruder (Comparative Example 212).

The results are shown in Tables 6, 7 and 8. The sheet remained adhered to the cast drum and could not be taken off at the casting process, and thus, the sheet could not be fed sequentially to the stretching process, and therefore, the film could not be industrially manufactured.

Comparative Example 213

Film formation was attempted to perform under the same conditions as in Example 210, except that a polypropylene resin composition with the following resin composition, to which HMS-PP having a long chain branch with the MS of 20 cN was not added, was used was and melt-mixed with a twin-screw extruder (Comparative Example 213).
- polypropylene: polypropylene WF836DG3, manufactured by Sumitomo Chemical Co., Ltd. (MFR: 7 g/10 min) ••99.995 wt %
- β-crystal nucleating agent: N,N'-dicyclohexyl-2,6-naphthalene dicarboxamide (NU-100, manufactured by New Japan Chemicals Co., Ltd.)••0.005 wt %

The results are shown in Tables 6, 7 and 8. Film breakage occurred frequently at the longitudinal stretching and transverse stretching process, and therefore, a satisfactory film could not be obtained by any means, and the film could not be industrially manufactured.

Comparative Example 214

A microporous polypropylene film with a thickness of 25 µm produced under the same conditions as in Comparative Example 213, except that the longitudinal stretching ratio was lowered to 4, and the longitudinal preheating and stretching temperature was 125° C., was provided as Comparative Example 214.

The results are shown in Tables 6, 7 and 8. The resultant microporous film had a high specific gravity and substantially no permeability in comparison with the microporous films obtained in Examples 201 to 211.

Comparative Example 215

Film formation was attempted to perform under the same conditions as in Example 211, except that raw material chips, which were supplied to a single-screw extruder as a core layer (layer A) raw material in Comparative Example 201, were supplied to a single-screw extruder (a) (Comparative Example 215).

The results are shown in Tables 6, 7 and 8. Film breakages occurred frequently at the transverse stretching process, and therefore, a satisfactory film could not be obtained by any means, and the film could not be industrially manufactured.

Comparative Example 216

A microporous polypropylene film with a thickness of 25 µm and a thickness construction of layer B/layer A/layer B=1.5 µm/22 µm/1.5 µm produced under the same conditions as in Comparative Example 215, except that the longitudinal stretching ratio was lowered to 4, and the longitudinal preheating and stretching temperature was 125° C., was provided as Comparative Example 216.

The results are shown in Tables 6, 7 and 8. The resultant microporous film had a low porosity in comparison with the microporous films obtained in Examples 201 to 211.

Comparative Example 217

Film formation was attempted to perform under the same conditions as in Example 203, except that a polypropylene resin composition, to which HMS-PP having a long chain branch with the MS was 20 cN was not added, where 5 wt % of METABLEN type A (A-3000) as acrylic-modified polytetrafluoroethylene with a high molecular weight, manufactured by Mitsubishi Rayon Co., Ltd., was added to 95 wt % of the same raw material chips as those used in Comparative Example 201, was supplied to a single-screw extruder (Comparative Example 217).

The results are shown in Tables 6, 7 and 8. Here, the MS, the MFR, the II and the mmmm of the polypropylene constituting the film were measured before METABLEN was added to the polypropylene. Separating-out in gel form were observed in the unstretched sheet, and film breakages occurred frequently at the longitudinal stretching and transverse stretching process, and therefore, a satisfactory film could not be obtained by any means, and the film could not be industrially manufactured.

TABLE 5

| zebra | Characteristics of polypropylene resin | | | | | | | | |
|---|---|---|---|---|---|---|---|---|---|
| | Characteristics of HMS-PP resin | | | | | | MS of PP as a whole (cN) | MFR of PP as a whole (g/10 min) | log (MS) |
| | MS (cN) | MFR (g/10 ft) | log (MS) | −0.61log (MFR) +0.52 | formula (1) satisfied? | Content (wt %) | | | |
| Example 201 | 20 | 3.0 | 1.3 | 0.53 | Yes | 5 | 1.0 | 7.4 | 0 |
| Example 202 | 20 | 3.0 | 1.3 | 0.53 | Yes | 5 | 1.0 | 7.4 | 0 |
| Example 203 | 20 | 3.0 | 1.3 | 0.53 | Yes | 5 | 1.0 | 7.4 | 0 |
| Example 204 | 20 | 3.0 | 1.3 | 0.53 | Yes | 12 | 1.3 | 6.9 | 0.11 |
| Example 205 | 20 | 3.0 | 1.3 | 0.53 | Yes | 5 | 1.7 | 3.8 | 0.23 |
| Example 206 | 20 | 3.0 | 1.3 | 0.53 | Yes | 5 | 1.0 | 3.8 | 0 |
| Example 206 | 20 | 3.0 | 1.3 | 0.53 | Yes | 5 | 1.0 | 7.4 | 0 |
| Example 207 | 20 | 3.0 | 1.3 | 0.53 | Yes | 5 | 1.0 | 7.4 | 0 |
| Example 208 | 20 | 3.0 | 1.3 | 0.53 | Yes | 5 | 1.9 | 3.5 | 0.28 |
| Example 209 | 20 | 3.0 | 1.3 | 0.53 | Yes | 1 | 1.0 | 7.6 | 0 |
| Example 210 | 20 | 3.0 | 1.3 | 0.53 | Yes | 2 | 0.8 | 7.6 | −0.10 |
| Example 211 | 20 | 3.0 | 1.3 | 0.53 | Yes | 5 | 1.0 | 7.4 | 0 |

| zebra | Characteristics of polypropylene resin | | | | Composition of β-crystal | |
|---|---|---|---|---|---|---|
| | −0.9log (MFR) +0.6 | formula (2) satisfied? | II of PP as a whole (%) | mmmm of PP as a whole (%) | β-crystal nucleating agent or PP comprising β-crystal nucleating | Content (wt %) |
| Example 201 | −0.18 | Yes | 96 | 93.2 | NU-100 | 0.05 |
| Example 202 | −0.18 | Yes | 96 | 93.2 | NU-100 | 0.05 |
| Example 203 | −0.18 | Yes | 96 | 93.2 | NU-100 | 0.05 |
| Example 204 | −0.16 | Yes | 96 | 93.5 | NU-100 | 0.05 |
| Example 205 | 0.081 | Yes | 96.3 | 95.1 | BEPOL | 95 |
| Example 206 | 0.08 | Yes | 96 | 93.2 | NU-100 | 0.2 |
| Example 206 | −0.18 | Yes | 96 | 93.2 | NU-100 | 0.2 |
| Example 207 | −0.18 | Yes | 96 | 93.2 | NU-100 | 0.2 |
| Example 208 | 0.11 | Yes | 97 | 97.7 | NU-100 | 0.05 |
| Example 209 | −0.19 | Yes | 96 | 93.04 | NU-100 | 0.005 |
| Example 210 | −0.19 | Yes | 96 | 93.1 | NU-100 | 0.05 |
| Example 211 | −0.18 | Yes | 96 | 93.2 | NU-100 | 0.05 |

PP: Polypropylene, MS: Melt strength, MFR: Melt flow rate, II: Isotactic index

TABLE 6

| zebra | Characteristics of polypropylene resin | | | | | | | | |
|---|---|---|---|---|---|---|---|---|---|
| | Characteristics of HMS-PP resin | | | | | | MS of PP as a whole (cN) | MFR of PP as a whole (g/10 min) | log (MS) |
| | MS (cN) | MFR (g/10 ft) | log (MS) | −0.61log (MFR) +0.52 | formula (1) satisfied? | Content (wt %) | | | |
| Comparative Example 201 | — | — | — | — | — | — | 0.4 | 7.7 | −0.40 |
| Comparative Example 202 | — | — | — | — | — | — | 0.4 | 7.7 | −0.40 |
| Comparative Example 203 | — | — | — | — | — | — | 0.4 | 7.7 | −0.40 |
| Comparative Example 204 | — | — | — | — | — | — | 0.4 | 7.7 | −0.40 |
| Comparative Example 205 | — | — | — | — | — | — | 0.9 | 3.5 | −0.046 |
| Comparative Example 206 | — | — | — | — | — | — | 2.1 | 1.4 | 0.32 |
| Comparative Example 207 | 20 | 3.0 | 1.3 | 0.53 | Yes | 5 | 1.0 | 7.4 | 0 |
| Comparative Example 208 | 20 | 3.0 | 1.3 | 0.53 | Yes | 5 | 1.0 | 7.4 | 0 |
| Comparative Example 209 | 20 | 3.0 | 1.3 | 0.53 | Yes | 5 | 1.0 | 7.4 | 0 |
| Comparative Example 210 | — | — | — | — | — | — | 1.5 | 2.3 | 0.18 |
| Comparative Example 211 | — | — | — | — | — | — | 1.5 | 2.3 | 0.18 |
| Comparative Example 212 | — | — | — | — | — | — | 0.4 | 7.7 | −0.40 |
| Comparative Example 213 | — | — | — | — | — | — | 0.4 | 7.7 | −0.40 |
| Comparative Example 214 | — | — | — | — | — | — | 0.4 | 7.7 | −0.40 |
| Comparative Example 215 | — | — | — | — | — | — | 0.4 | 7.7 | −0.40 |

TABLE 6-continued

| | | | | | | | 0.4 | 7.7 | −0.40 |
|---|---|---|---|---|---|---|---|---|---|
| Comparative Example 216 | — | — | — | — | — | — | 0.4 | 7.7 | −0.40 |
| Comparative Example 217 | — | — | — | — | — | — | 0.4 | 7.7 | −0.40 |

| | Characteristics of polypropylene resin | | | | Composition of β-crystal nucleating agent | |
|---|---|---|---|---|---|---|
| zebra | −0.9log (MFR) +0.6 | formula (2) satisfied? | II of PP as a whole (%) | mmmm of PP as a whole (%) | β-crystal nucleating agent or PP comprising β-crystal nucleating agent | Content (wt %) |
| Comparative Example 201 | −0.20 | No | 96 | 93.0 | NU-100 | 0.05 |
| Comparative Example 202 | −0.20 | No | 96 | 93.0 | NU-100 | 0.05 |
| Comparative Example 203 | −0.20 | No | 96 | 93.0 | NU-100 | 0.05 |
| Comparative Example 204 | −0.20 | No | 96 | 93.0 | NU-100 | 0.05 |
| Comparative Example 205 | 0.11 | No | 97 | 97.7 | NU-100 | 0.05 |
| Comparative Example 206 | 0.46 | No | 96 | 93.5 | NU-100 | 0.2 |
| Comparative Example 207 | −0.18 | Yes | 96 | 93.2 | — | — |
| Comparative Example 208 | −0.18 | Yes | 96 | 93.2 | — | — |
| Comparative Example 209 | −0.18 | Yes | 96 | 93.2 | — | — |
| Comparative Example 210 | 0.27 | No | 96.3 | 95.0 | BEPOL | 100 |
| Comparative Example 211 | 0.27 | No | 96.3 | 95.0 | BEPOL | 100 |
| Comparative Example 212 | −0.20 | No | 96 | 93.0 | — | — |
| Comparative Example 213 | −0.20 | No | 96 | 93.0 | NU-100 | 0.005 |
| Comparative Example 214 | −0.20 | No | 96 | 93.0 | NU-100 | 0.005 |
| Comparative Example 215 | −0.20 | No | 96 | 93.0 | NU-100 | 0.05 |
| Comparative Example 216 | −0.20 | No | 96 | 93.0 | NU-100 | 0.05 |
| Comparative Example 217 | −0.20 | No | 96 | 93.0 | NU-100 | 0.05 |

PP: Polypropylene, MS: Melt strength, MFR: Melt flow rate, II: Isotactic index

TABLE 7

| | Temperature of CD (deg. C.) | Stretching ratio [longitudinal × transverse] | Film formability <Occurrence of film breakage> |
|---|---|---|---|
| Example 201 | 120 | 4 × 8 | A <0 times> |
| Example 202 | 120 | 5 × 8 | A <0 times> |
| Example 203 | 120 | 6 × 8 | B <1 time> |
| Example 204 | 120 | 5 × 7 | B <1 time> |
| Example 205 | 120 | 6 × 8 | A <0 times> |
| Example 206 | 110 | 6 × 8 | A <0 times> |
| Example 207 | 100 | 6 × 8 | B <1 time> |
| Example 208 | 120 | 5 × 9 | B <1 time> |
| Example 209 | 120 | 5 × 8 | B <1 time> |
| Example 210 | 120 | 5 × 8 | A <0 times> |
| Example 211 | 110 | 5 × 8 | A <0 times> |
| Comparative Example 201 | 120 | (4 × -) | D <12 times> |
| Comparative Example 202 | 120 | 4 × 8 | B <1 time> |
| Comparative Example 203 | 120 | (5 × 8) | D <4 times> |
| Comparative Example 204 | 120 | (6 × -) | D <20 times> |
| Comparative Example 205 | 120 | (4 × -) | D <7 times> |
| Comparative Example 206 | 90 | 5 × 9 | A <0 times> |
| Comparative Example 207 | 120 | — | — |
| Comparative Example 208 | 40 | (5 × -) | D <20 times> |
| Comparative Example 209 | 40 | 5 × 10 | A <0 times> |
| Comparative Example 210 | 120 | (6 × 8) | D <20 times> |
| Comparative Example 211 | 120 | 4 × 8 | B <1 time> |
| Comparative Example 212 | 120 | — | — |
| Comparative Example 213 | 120 | (5 × -) | D <10 times> |
| Comparative Example 214 | 120 | 4 × 8 | B <1 time> |
| Comparative Example 215 | 110 | (5 × -) | D <18 times> |
| Comparative Example 216 | 110 | 4 × 8 | B <1 time> |
| Comparative Example 217 | 120 | (6 × -) | D <20 times> |

CD: Casting drum

TABLE 8

| | β-Crystal activity | β-Crystal content (%) | Porosity (%) | Gurley air permeability (sec/100 ml) | Liquid paraffin permeating time (sec/25 μm) | Longitudinal Young's modulus at 25 deg. C. (GPa) | Longitudinal stress at break at 25 deg. C. (MPa) | Longitudinal heat shrinkage ratio at 105 deg. C. (%) |
|---|---|---|---|---|---|---|---|---|
| Example 201 | Yes | 58 | 70 | 270 | 8.4 | 0.40 | 62 | 3.3 |
| Example 202 | Yes | 58 | 72 | 190 | 5.6 | 0.39 | 62 | 3.2 |

TABLE 8-continued

TABLE 8

|  | β-Crystal activity | β-Crystal content (%) | Porosity (%) | Gurley air permeability (sec/100 ml) | Liquid paraffin permeating time (sec/25 μm) | Longitudinal Young's modulus at 25 deg. C. (GPa) | Longitudinal stress at break at 25 deg. C. (MPa) | Longitudinal heat shrinkage ratio at 105 deg. C. (%) |
|---|---|---|---|---|---|---|---|---|
| Example 203 | Yes | 58 | 80 | 70 | 3.5 | 0.41 | 65 | 3.9 |
| Example 204 | Yes | 52 | 73 | 200 | 6.0 | 0.42 | 65 | 3.7 |
| Example 205 | Yes | 59 | 66 | 290 | 8.8 | 0.53 | 68 | 4.1 |
| Example 206 | Yes | 66 | 70 | 180 | 3.8 | 0.40 | 61 | 3.6 |
| Example 207 | Yes | 66 | 61 | 220 | 4.2 | 0.57 | 71 | 4.6 |
| Example 208 | Yes | 62 | 78 | 100 | 4.0 | 0.45 | 68 | 1.8 |
| Example 209 | Yes | 36 | 36 | 890 | 28.0 | 0.90 | 107 | 4.7 |
| Example 210 | Yes | 62 | 80 | 90 | 3.0 | 0.43 | 60 | 3.0 |
| Example 211 | Yes | 50 | 58 | ∞ | ∞ | 0.67 | 78 | 4.3 |
| Comparative Example 201 | — | — | — | — | — | — | — | — |
| Comparative Example 202 | Yes | 76 | 63 | 300 | 9.0 | 0.37 | 61 | 3.3 |
| Comparative Example 203 | — | — | — | — | — | — | — | — |
| Comparative Example 204 | — | — | — | — | — | — | — | — |
| Comparative Example 205 | — | — | — | — | — | — | — | — |
| Comparative Example 206 | Yes | 71 | 25 | ∞ | ∞ | 1.6 | 125 | 2.1 |
| Comparative Example 207 | — | — | — | — | — | — | — | — |
| Comparative Example 208 | — | — | — | — | — | — | — | — |
| Comparative Example 209 | No | 0 | 0 | ∞ | ∞ | 2.0 | 160 | 3.1 |
| Comparative Example 210 | — | — | — | — | — | — | — | — |
| Comparative Example 211 | Yes | 76 | 30 | ∞ | ∞ | 1.1 | 120 | 4.8 |
| Comparative Example 212 | — | — | — | — | — | — | — | — |
| Comparative Example 213 | — | — | — | — | — | — | — | — |
| Comparative Example 214 | Yes | 55 | 28 | ∞ | ∞ | 1.1 | 118 | 4.5 |
| Comparative Example 215 | — | — | — | — | — | — | — | — |
| Comparative Example 216 | Yes | 66 | 32 | ∞ | ∞ | 0.78 | 98 | 4.5 |
| — | — | — | — | — | — | — | — | — |

∞ in Gurley air permeability means that the Gurley air permeablity exceeds 1000 sec/100 ml.

It is found from Tables 5 to 8 that the microporous polypropylene film of the second aspect comprises a polypropylene satisfying the following formula (1), and/or consists of a polypropylene with the MS is less than 5 cN which satisfies the following formula (2), and has a β-crystal activity, and thereby, film formability can be significantly improved:

$$\log (MS) > -0.61 \log (MFR) + 0.82 \quad (1)$$

$$\log (MS) > -0.9 \log (MFR) + 0.6 \quad (2)$$

In addition, the film can be stably formed without breakage even when stretched in the longitudinal direction at a low temperature and to a high ratio, and together with this, the porosity can further be reduced. Furthermore, the permeability thereof could be controlled by the layer construction of the film, the raw material composition and the conditions for film formation, and in addition, the permeability could be significantly improved.

Next, the examples of the third aspect are described. Here, on the basis of the above described measuring method (21) that the film of Comparative Example 308 was confirmed to be uniaxially oriented in the longitudinal direction. Meanwhile, the films that could be sampled from among the films of the examples and the films of the comparative examples were confirmed to be biaxially oriented.

Examples 301 to 303

The same microporous polypropylene films as those of Examples 101, 102 and 103 were provided as Examples 301, 302 and 303, respectively.

The results of the evaluation of the film properties of the resultant microporous films are shown in Table 9. The resultant microporous films had excellent film formability, a low specific gravity and the excellent permeability. In addition, the Young's modulus and the stress at break in the longitudinal direction were high and the dimensional stability was excellent.

Example 304

A polypropylene resin with the below-described composition was prepared.
  polypropylene: polypropylene WF836DG3, manufactured by Sumitomo Chemical Co., Ltd. (melt flow rate (MFR: 7 g/10 min)••93.95 wt % polypropylene having long chain branch: polypropylene PF-814, manufactured by Basell (MFR: 3 g/10 min)••3 wt %

β-crystal nucleating agent: N,N'-dicyclohexyl-2,6-naphthalene dicarboxamide (NU-100, manufactured by New Japan Chemicals Co., Ltd.)••0.05 wt % polyolefin-based resin: "ENGAGE" 8411, manufactured by DuPont Dow Elastomers Japan••3 wt %

0.15 Weight parts of IRGANOX 1010, manufactured by Ciba-Geigy Ltd., as an antioxidant, and 0.1 weight part of IRGAFOS 168, manufactured by Ciba-Geigy Ltd., as a thermal stabilizer, were added to 100 weight parts of the above-described resin composition. This is supplied into a twin-screw extruder and melt-mixed at 300° C., and after that, extruded into a gut form and passed through a water bath at 20° C. so as to be cooled, and cut into a length of 3 mm with a chip cutter, and then, dried for two hours at 100° C. The obtained raw material chip was supplied into a single-screw extruder so as to be melt-mixed at 220° C., passed through a single plate filtration filter with a gauge standard of 200 mesh, and after that, extruded from a slit-die that was heated to 200° C., cast onto a drum (casting drum or cast drum) with the surface temperature of 120° C., formed into a sheet, which was made close contact with the drum using an air knife from the non-drum sheet surface with hot air heated to 140° C. blown, and thus, an unstretched sheet was obtained. Here, the contacting time on this metal drum was 40 seconds at this time.

The obtained unstretched sheet was passed through a group of rolls which were kept at 95° C. so as to be preheated, passed between rolls with a difference in the rotating speed which were kept at 95° C., and stretched to 5 times the original length in the longitudinal direction at 95° C. and then cooled to 75° C. Subsequently, the both edges of this longitudinally stretched film were gripped with clips, and the sheet was introduced into a tenter was and preheated to 135° C., and thus, the film was stretched to 8 times the original length in the transverse direction at 135° C. Next, a relaxation of 5% was provided in the transverse direction within the tenter, and the film was heat set at 155° C. and gradually and uniformly cooled, and after that, cooled to room temperature and winded up, so that a microporous polypropylene film with a thickness of 20 μm was obtained.

The results are shown in Table 9. The resultant microporous film was excellent in film formability and had a low specific gravity and an excellent permeability (A: 0 occurrences of film breakage). In addition, the Young's modulus and the stress at break in the longitudinal direction were high and the dimensional stability was excellent.

Example 305

A microporous polypropylene film with a thickness of 20 μm produced under the same conditions as in Example 304 except that the amount of the addition of "ENGAGE" was 1.5 wt %, was provided as Example 305.

The results are shown in Table 9. The resultant microporous film was excellent in film formability (A: 0 occurrences of film breakage) and had a low specific gravity and an excellent permeability. In addition, the Young's modulus and the stress at break in the longitudinal direction were high and the dimensional stability was excellent.

Example 306

A microporous polypropylene laminated film produced under the same conditions as in Example 113 except that the thickness was 35 μm, was provided as Example 306. Here, the thickness construction of the resultant microporous polypropylene laminated film was layer B/layer A/layer C=2 μm/31 μm/2 μm.

The results are shown in Table 9. The resultant microporous film was excellent in film formability (A: 0 occurrences of film breakage) and had a low specific gravity and an excellent permeability. In addition, the Young's modulus and the stress at break in the longitudinal direction were high and the dimensional stability was excellent.

Example 307

A microporous polypropylene laminated film with a thickness of 35 μm produced under the same conditions as in Example 306 except that the same raw material as that supplied to a single-screw extruder in Example 304 was used as the raw material for layer A, was provided as Example 307. Here, the thickness construction of the resultant microporous polypropylene laminated film was layer B/layer A/layer C=2 μm/31 μm/2 μm.

The results are shown in Table 9. The resultant microporous film was excellent in film formability (A: 0 occurrences of film breakage) and had a low specific gravity and an excellent permeability. In addition, the Young's modulus and the stress at break in the longitudinal direction were high and the dimensional stability was excellent.

Example 308

The raw material chip supplied to a single-screw extruder in Example 108 was supplied as a core layer (layer A) raw material to a single-screw extruder (a), melt-mixed at 220° C., and passed through a single plate filtration filter with a gauge standard of 200 mesh, and after that, introduced into a slit-die that was heated to 200° C. Meanwhile, a resin with the following composition was prepared as the raw material for a skin layer (layer B).

Polypropylene (ethylene/propylene copolymer) FM401G, manufactured by Sumitomo Chemical Co., Ltd. (MFR: 7 g/10 min)••49.8 wt %

Polypropylene F107DV, manufactured by Mitsui Chemicals, Inc. (MFR: 7 g/10 min)••50 wt %

MA 1002 "Epostar MA" (crosslinked methyl polymethacrylate particles with an average particle diameter of approximately 2 μm), manufactured by Nippon Shokubai Co., Ltd.••0.2 wt %

This resin was supplied to a single-screw extruder (b), and melt-mixed at 260° C., and then, introduced into the above-described slit-die together. Next, the melted polymer from extruder (b) was laminated on the both surfaces of the melted polymer from extruder (a) so as to be co-extruded into a sheet within the slit-die, and then cast onto a cast drum with the surface temperature of 105° C., and the sheet was made close contact with the drum with a cool air of 40° C. blowing using an air knife from the non-drum sheet surface side, and thus, an unstretched laminated (layer B/layer A/layer B) sheet was obtained. Here, the contacting time on the metal drum at this time was 20 seconds.

The obtained unstretched layered sheet was passed through a group of rolls which were kept at 118° C. so as to be preheated, and passed between rolls with a difference in the rotating speed which were kept at 118° C. so as to be stretched to 5 times the original length in the longitudinal direction at 118° C., and cooled to 70° C. Subsequently, the both edges of this longitudinally stretched film were gripped with clips, and the sheet was introduced into a tenter and preheated to 145°

C., and thus, the film was stretched to 8 times the original length in the transverse direction at 145° C. Next, a relaxation of 5% was provided in the transverse direction within the tenter, and the film was heat set at 160° C. and gradually and uniformly cooled, and after that, cooled to room temperature and winded up so that a laminated microporous polypropylene film with a thickness of 35 μm was obtained. The thickness construction of the resultant laminated microporous polypropylene film was layer B/layer A/layer B=2 μm/31 μm/2 μm.

The results are shown in Table 9. The resultant microporous film was excellent in film formability (A: 0 occurrences of film breakage) and had a low specific gravity. In addition, the Young's modulus and the stress at break in the longitudinal direction were high and the dimensional stability was excellent.

Example 309

A microporous polypropylene film with a thickness of 35 μm produced under the same conditions as in Example 306 except that the longitudinal stretching ratio was increased to 6, was provided as Example 309. Here, the thickness construction of the resultant microporous polypropylene laminated film was layer Bilayer A/layer C=2 μm/31 μm/2 μm.

The results are shown in Table 9. The resultant microporous film was excellent in film formability (B: I occurrence of film breakage) and had a low specific gravity. In addition, the Young's modulus and the stress at break in the longitudinal direction were high and the dimensional stability was excellent.

Comparative Example 301

The same microporous polypropylene film as that of Comparative Example 102 was provided as Comparative Example 301.

The results of the evaluation of the film properties of the resultant microporous film are shown in Table 9. The resultant microporous film had a low longitudinal orientation of the crystalline molecular chains, a high specific gravity and an insufficient permeability in comparison with the microporous films of Examples 301 to 309.

Comparative Example 302

A microporous polypropylene laminated film produced under the same conditions as in Comparative Example 119 except that the thickness was 35 μm, was provided as Comparative Example 302. Here, the thickness construction of the resultant microporous polypropylene laminated film was layer B/layer A/layer C=2 μm/31 μm/2 μm.

The results are shown in Table 9. The resultant microporous film had a low longitudinal orientation of the crystalline molecular chains and a high specific gravity in comparison with the microporous films of Examples 301 to 309.

Comparative Example 303

Film formation was attempted to perform under the same conditions as in Example 304, except that a polypropylene resin with the following composition, to which polypropylene having a long chain branch was not added, was melt-mixed with a twin-screw extruder (Comparative Example 303).

Polypropylene: polypropylene WF836DG3, manufactured by Sumitomo Chemical Co., Ltd. (melt flow rate (MFR: 7 g/10 min)••96.95 wt %
β-crystal nucleating agent: N,N'-dicyclohexyl-2,6-naphthalene dicarboxamide (NU-100, manufactured by New Japan Chemicals Co., Ltd.)••0.05 wt %
Polyolefin-based resin: "ENGAGE" 8411, manufactured by DuPont Dow Elastomers Japan••3 wt %

The results are shown in Table 9. Film breakages occurred frequently at the transverse stretching process (D: 19 occurrences of film breakage), and thus, a satisfactory film could not be obtained by any means, and the film could not be industrially manufactured.

Comparative Example 304

Film formation was attempted to perform under the same conditions as in Comparative Example 303, except that the longitudinal preheating and stretching temperature was 120° C. (Comparative Example 304).

The results are shown in Table 9. Film breakages occurred sporadically at the transverse stretching process (D: 6 occurrences of breaking), and thus, a satisfactory film could not be obtained, and the film could not be industrially manufactured.

Comparative Example 305

A microporous polypropylene film with a thickness of 20 μm produced under the same conditions as in Comparative Example 304 except that the stretching ratio was lowered to 4, was provided as Comparative Example 305.

The results are shown in Table 9. The resultant microporous film had a low longitudinal orientation of crystalline molecular chains in comparison with the microporous films of Examples 301 to 309. In particular, the specific gravity was high, most probably because the longitudinal stretching temperature was sufficiently higher than the melting point of "ENGAGE", and "ENGAGE" did not effectively work in accelerating the generation of pores (A: 0 occurrences of breakage).

Comparative Example 306

A polypropylene resin with the following composition, to which polypropylene having a long chain branch was not added, was prepared.

Polypropylene: polypropylene WF836DG3, manufactured by Sumitomo Chemical Co., Ltd. (melt flow rate (MFR: 7 g/10 min)••99.8 wt %
β-crystal nucleating agent: N,N'-dicyclohexyl-2,6-naphthalene dicarboxamide (NU-100, manufactured by New Japan Chemicals Co., Ltd.)••0.2 wt %

0.15 Weight parts of IRGANOX 1010, manufactured by Ciba-Geigy Ltd., as an antioxidant, and 0.1 weight part of IRGAFOS 168, manufactured by Ciba-Geigy Ltd., as a thermal stabilizer, were added to 100 weight parts of the above-described resin composition. This is supplied into a twin-screw extruder and melt-mixed at 300° C., and after that, extruded into a gut form and passed through a water bath at 20° C. so as to be cooled, and cut into a length of 3 mm with a chip cutter, and then, dried for two hours at 100° C. Film formation was attempted to perform under the same conditions as in Example 308, except that the above-described raw material chips were supplied to a single-screw extruder (a) as the raw material for layer A (Comparative Example 306).

The results are shown in Table 9. Film breakages occurred frequently at the transverse stretching process (D: 13 occurrences of film breakage), and thus, a satisfactory film could not be obtained by any means, and the film could not be industrially manufactured.

Comparative Example 307

A microporous polypropylene layered film with a thickness of 35 μm produced under the same conditions as in Comparative Example 306 except that the longitudinal stretching ratio was lowered to 4 and the longitudinal preheating and stretching temperature was 125° C., was provided as Comparative Example 307. Here, the thickness construction of the resultant microporous polypropylene laminated film was layer B/layer A/layer B=2 μm/31 μm/2 μm.

The results are shown in Table 9. The resultant microporous film had a low longitudinal orientation of the crystalline molecular chains and a high specific gravity in comparison with the microporous films of Examples 301 to 309 (B: 1 occurrence of film breakage).

Comparative Example 308

A commercially available "Celgard" 2500, manufactured by Celgard, was provided as Comparative Example 308. Here, "Celgard" 2500 is a microporous polypropylene film produced in accordance with a lamella stretching technique.

The results are shown in Table 9. The obtained microporous film was a uniaxially oriented film with a high specific gravity in comparison with the microporous films of Examples 301 to 309. In addition, the longitudinal orientation of the crystalline molecular chains was too high, and thus, the obtained microporous film had properties easily torn in the longitudinal direction.

The resultant microporous polypropylene films had an extremely high I (MD)/I (TD) in comparison with the conventional microporous polypropylene films shown in the comparative examples, and therefore, crystalline molecular chains are oriented in the longitudinal direction and the mechanical properties in the longitudinal direction are high, though the specific gravity is low. As described above, the mechanical properties in the longitudinal direction are high, though the relative gravity is equal or lower in comparison with the conventional microporous polypropylene films, and therefore, the films do not get elongated, do not get wrinkled, barely break and are excellent in handling properties in the film forming process and the subsequent converting process, for example slitting, winding, coating, vapor depositing, printing, laminating or the like. Accordingly, a low specific gravity, the high permeability accompanying this, and excellent handling properties could all be achieved to a high degree, due to the high I (MD)/I (TD) of the resultant microporous film. In addition, the resultant microporous films had a low specific gravity and a high permeability. Furthermore, this permeability could be improved using a different type of polymer that is added in order to accelerate the generation of pores. Moreover, I (MD)/I (TD) could be controlled by means of the stretching conditions, typically the longitudinal stretching ratio. In addition, film formability could be maintained by controlling the composition of raw materials, and at the same time, microporous films with excellent performance, as described above, can be manufactured, though basically, film formability tended to deteriorate when stretched in the longitudinal direction to a high ratio as described above.

Industrial Applicability

The microporous polypropylene films of the first and second aspects are excellent in film formability with little film breakage at the stretching process in comparison with microporous polypropylene films produced in accordance with the conventional β-crystal technique. Furthermore, the microporous polypropylene films of the first and second aspects can be formed without breakage at the transverse stretching process, even when, for example, stretched in the longitudinal direction at a low temperature and to a high ratio, and the line speed can be increased, and the productivity is excellent in comparison with the conventional β-crystal technique. In addition, the specific gravity can be reduced and the stress at break in the longitudinal direction can be increased through stretching in the longitudinal direction to a high ratio

TABLE 9

| | I(MD)/I(TD) | β-Crystal activity | β-Crystal content (%) | Specific gravity | Gurley air permeability (sec/100 ml) | Liquid paraffin permeating time (sec/25 μm) | Longitudinal Young's modulus at 25 deg. C. (GPa) | Longitudinal stress at break at 25 deg. C. (MPa) | Longitudinal heat shrinkage ratio at 105 deg. C. (%) |
|---|---|---|---|---|---|---|---|---|---|
| Example 301 | 0.91 | Yes | 60 | 0.30 | 260 | 8.5 | 0.39 | 60 | 3.1 |
| Example 302 | 1.70 | Yes | 60 | 0.24 | 170 | 5.3 | 0.39 | 61 | 3.4 |
| Example 303 | 4.45 | Yes | 60 | 0.20 | 80 | 3.2 | 0.40 | 63 | 3.7 |
| Example 304 | 2.48 | Yes | 58 | 0.22 | 130 | 4.9 | 0.40 | 58 | 2.3 |
| Example 305 | 2.39 | Yes | 60 | 0.22 | 100 | 4.8 | 0.40 | 62 | 1.5 |
| Example 306 | 1.81 | Yes | 54 | 0.39 | ∞ | ∞ | 0.67 | 80 | 3.8 |
| Example 307 | 1.92 | Yes | 52 | 0.42 | ∞ | ∞ | 0.63 | 76 | 3.0 |
| Example 308 | 1.61 | Yes | 56 | 0.56 | ∞ | ∞ | 1.0 | 110 | 4.1 |
| Example 309 | 4.89 | Yes | 54 | 0.32 | ∞ | ∞ | 0.68 | 85 | 4.4 |
| Comparative Example 301 | 0.45 | Yes | 76 | 0.35 | 300 | 9.0 | 0.37 | 61 | 3.3 |
| Comparative Example 302 | 0.40 | Yes | 67 | 0.50 | ∞ | ∞ | 0.80 | 101 | 4.5 |
| Comparative Example 303 | — | — | — | — | — | — | — | — | — |
| Comparative Example 304 | — | — | — | — | — | — | — | — | — |
| Comparative Example 305 | 0.43 | Yes | 71 | 0.39 | 410 | 9.7 | 0.37 | 67 | 3.0 |
| Comparative Example 306 | — | — | — | — | — | — | — | — | — |
| Comparative Example 307 | 0.44 | Yes | 69 | 0.62 | ∞ | ∞ | 1.0 | 118 | 4.1 |
| Comparative Example 308 | 8.96 | No | 0 | 0.41 | 230 | 3.0 | 0.69 | 95 | 2.1 |

∞ in Gurley air permeability means that the Gurley air permeablity exceeds 1000 sec/100 ml.
∞ in liquid paraffin permeating time means that the Liquid paraffin permeating time exceeds 60 sec/25 mm.

in comparison with the conventional β-crystal technique. At the same time, the permeability can be significantly improved.

The crystalline molecular chains are highly oriented in the longitudinal direction of the film in the microporous polypropylene film of the third aspect, in comparison with the microporous polypropylene film produced in accordance with the conventional β-crystal technique. As a result, the mechanical properties in the longitudinal direction become excellent, and thus, handling properties becomes excellent at the converting process. Furthermore, the mechanical properties in the longitudinal direction are excellent even when the specific gravity of the film is reduced, and therefore, the permeability can be significantly improved while maintaining handling properties.

The microporous polypropylene films also have excellent dimensional stability, and therefore, the excellent properties thereof can be used in various fields of application, for example, synthetic paper, receiving sheets for thermal transfer recording, optical elements, building materials, separation membranes (filters), moisture permeable waterproof materials including wound dressing materials and the like, moisture permeable waterproof materials for clothing and the like, absorbing articles for diapers, sanitary products and the like, separators for batteries, electrolytic capacitors and the like, ink receiving sheets, oil or fat absorbing materials, blood sugar test kits, and protein separating membranes.

The invention claimed is:

1. A microporous polypropylene film consisting essentially of not less than 97 wt % polypropylene with respect to a total amount of monomers of all polymers in the film, said polypropylene comprising polypropylene having a Trouton ratio of not less than 30, said film having 1) β-crystal activity, 2) a specific gravity of 0.2 to 0.4, 3) a liquid paraffin permeating time of 0.1 seconds/25 μm to 60 seconds/25 μm, 4) a heat shrinkage ratio at 105° C. in a longitudinal direction of the film of no greater than 5%, 5) a Trouton ratio of not less than 6 and 6) a Gurley air permeability of 50 sec/100 ml to 300 sec/100 ml.

2. A microporous polypropylene film consisting essentially of not less than 97 wt % polypropylene with respect to a total amount of monomers of all polymers in the film, said film having a Trouton ratio of not less than 6, said film having β-crystal activity, a specific gravity of 0.2 to 0.4, a liquid paraffin permeating time of 0.1 seconds/25 μm to 60 seconds/ 25 μm, a heat shrinkage ratio at 105° C. in a longitudinal direction of the film of no greater than 5% and a Gurley air permeability of 50 sec/100 ml to 300 sec/100 ml.

3. A microporous polypropylene film consisting essentially of not less than 97 wt % polypropylene with respect to a total amount of monomers of all polymers in the film, said polypropylene having a long chain branch in a main chain, said film having β-crystal activity, a specific gravity of 0.2 to 0.4, a liquid paraffin permeating time of 0.1 seconds/25 μm to 60 seconds/25 μm and a heat shrinkage ratio at 105° C. in a longitudinal direction of the film of no greater than 5%.

4. The microporous polypropylene film according to claim 3, wherein a Gurley air permeability is 10 sec/100 ml to 300 sec/100 ml.

5. The microporous polypropylene film according to any of claims 1 to 3, wherein the temperature of crystallizing from the melt (Tmc) of the film is 120° C. to 135° C.

6. A microporous polypropylene film consisting essentially of not less than 97 wt % polypropylene with respect to a total amount of monomers of all polymers in the film, said polypropylene comprising polypropylene, wherein the relationship between melt strength (MS) and melt flow rate (MFR), measured at 230° C., of the polypropylene is represented by formula (1), said film having β-crystal activity, a porosity of 60% to 85%, a liquid paraffin permeating time of 0.1 seconds/25 μm to 60 seconds/25 μm and a heat shrinkage ratio at 105° C. in a longitudinal direction of the film of no greater than 5%

$$\log(MS) > -0.61 \log(MFR) + 0.82 \quad (1).$$

7. A microporous polypropylene film consisting essentially of not less than 97 wt % polypropylene with respect to a total amount of monomers of all polymers in the film, wherein melt strength (MS) of the film is less than 5 cN measured at 230° C., and a relationship between the MS and melt flow rate (MFR) of the film is represented by formula (2), and said film having β-crystal activity, a porosity of 60% to 85%, a liquid paraffin permeating time of 0.1 seconds/25 μm to 60 seconds/25 μm and a heat shrinkage ratio at 105° C. in a longitudinal direction of the film of no greater than 5%

$$\log(MS) > -0.9 \log(MFR) + 0.6 \quad (2).$$

8. The microporous polypropylene film according to claim 6 or 7, wherein a Gurley air permeability is 10 sec/100 ml to 300 sec/100 ml.

9. The microporous polypropylene film according to claim 6 or 7, wherein the isotactic pentad fraction (mmmm) is 90% to 99.5%.

10. A microporous polypropylene film consisting essentially of not less than 97 wt % polypropylene with respect to a total amount of monomers of all polymers in the film, wherein formula (3) is satisfied in an in-plane intensity distribution profile scanned in a direction of an azimuthal angle for (−113) plane of the film in accordance with X-ray diffraction method, said film has β-crystal activity, a specific gravity of 0.2 to 0.4, a liquid paraffin permeating time of 0.1 seconds/ 25 μm to 60 seconds/29 μm and a heat shrinkage ratio at 105° C. in a longitudinal direction of the film of no greater than 5%

$$0.5 \leq I(MD)/I(TD) \leq 8 \quad (3)$$

(where, I (MD) is the integral intensity in the longitudinal direction and I (TD) is the integral intensity in the transverse direction.

11. The microporous polypropylene film according to claim 10, wherein a Gurley air permeability is 10 sec/100 ml to 300 sec/100 ml.

12. The microporous polypropylene film according to claim 1, wherein the polypropylene comprises 1) a mixture of a high molecular weight component or a polypropylene having a long chain branch with one or more common polypropylenes or 2) a copolymer or graft polymer of a propylene having a long chain branch and a common polypropylene.

* * * * *

UNITED STATES PATENT AND TRADEMARK OFFICE
CERTIFICATE OF CORRECTION

| | |
|---|---|
| PATENT NO. | : 8,491,991 B2 |
| APPLICATION NO. | : 11/578884 |
| DATED | : July 23, 2013 |
| INVENTOR(S) | : Masuda et al. |

Page 1 of 1

It is certified that error appears in the above-identified patent and that said Letters Patent is hereby corrected as shown below:

In the Specification

<u>In Column 75</u>

At Table 5, column 5, in the subheading, please change "0.52" to --0.82--; and at Table 6, column 5, in the subheading, please change "0.52" to --0.82--.

Signed and Sealed this
Fourth Day of March, 2014

Michelle K. Lee
*Deputy Director of the United States Patent and Trademark Office*